US012509435B2

(12) United States Patent
Prossnitz et al.

(10) Patent No.: US 12,509,435 B2
(45) Date of Patent: Dec. 30, 2025

(54) COMPOUNDS FOR SELECTIVE BINDING TO ESTROGEN RECEPTORS ALPHA/BETA RELATIVE TO GPER/GPR30 AND METHODS OF TREATING DISEASE STATES AND CONDITIONS MEDIATED THROUGH THESE RECEPTORS

(71) Applicants: UNM RAINFOREST INNOVATIONS, Albuquerque, NM (US); ARROWHEAD CENTER INC., Las Cruces, NM (US)

(72) Inventors: Eric R. Prossnitz, Albuquerque, NM (US); Jeffrey B. Arterburn, Las Cruces, NM (US); Cristian Bologa, Albuquerque, NM (US)

(73) Assignees: UNM RAINFOREST INNOVATIONS, Albuquerque, NM (US); ARROWHEAD CENTER, INC, Las Cruces, NM (US)

( * ) Notice: Subject to any disclaimer, the term of this patent is extended or adjusted under 35 U.S.C. 154(b) by 864 days.

(21) Appl. No.: 17/634,293

(22) PCT Filed: Aug. 19, 2020

(86) PCT No.: PCT/US2020/046957
§ 371 (c)(1),
(2) Date: Feb. 10, 2022

(87) PCT Pub. No.: WO2021/041107
PCT Pub. Date: Mar. 4, 2021

(65) Prior Publication Data
US 2023/0039502 A1 Feb. 9, 2023

Related U.S. Application Data

(60) Provisional application No. 62/891,018, filed on Aug. 23, 2019.

(51) Int. Cl.
*C07D 311/94* (2006.01)
(52) U.S. Cl.
CPC ................... *C07D 311/94* (2013.01)
(58) Field of Classification Search
CPC ..................................... C07D 311/94
USPC ........................................ 549/396
See application file for complete search history.

(56) References Cited

U.S. PATENT DOCUMENTS 8,487,100 B2 7/2013 Prossnitz
9,078,888 B2 7/2015 Dalton et al.
2018/0289676 A1 10/2018 Arnatt et al.

FOREIGN PATENT DOCUMENTS

GB 824140 A 11/1959
WO WO2017/106820 A1 6/2017

OTHER PUBLICATIONS

Hamann Lawrence G et al. Structure-activity relationships and sub-type selectivity in an oxabicyclic estrogen receptor ɑ/B agonist scaffold. Bioorganic & medicinal chemistry letters, 2005, 15, pp. 1463-1466. doi:10.1016/j.bmcl.2004.12.077, p. 1465, table 1, compounds 8-30, 31-34,35-36, 37, 39-42, refer 10 (compound 3).
Minutolo Filippo et al. Estrogen receptor B ligands: Recent advances and biomedical applications. Medicinal Research Reviews, 2011, 31(3), pp. 364-, doi: 10.1002/med.20186, p. 405-406, paragraph 13, compounds 166-171, fig. 50, table VIII.
Nakamura M. et al. Versatile method for the synthesis of 4-substituted 6-methyl-3-oxabicyclo[3.3. I]non-6-ene- I-methanol derivatives: Prins-type cyclization reaction catalyzed by hafnium triflate. Tetrahedron Letters, 2009, 50(47), pp. 6462-, doi: 10.1016/j.tetlet. 2009.08.120, compound 5, schemes 1, 2, table 2, compounds 2, 13-16, table 3, compounds 24-29.

*Primary Examiner* — Taofiq A Solola
(74) *Attorney, Agent, or Firm* — Cosud Intellectual Property; Henry D. Coleman

(57) ABSTRACT

The current invention is in the field of molecular biology/pharmacology and provides novel 3-oxabicyclo[3.3.1]nonene compounds and derivatives that modulate the effects of the classical estrogen receptors alpha and beta (ERalpha and ERbeta) with little to no biological or physiological effects on the G protein-coupled estrogen receptor GPER (also known as GPR30). These compounds may function as agonists and/or antagonists of one or more of the disclosed classical estrogen receptors. Diseases that are mediated through one or more of these receptors include cancer (including but not limited to breast (particularly endocrine or anti-hormone resistant, and for the prevention/reduction of endocrine or anti-hormone resistance), reproductive and other hormone-dependent cancers, leukemia, colon cancer, prostate cancer), reproductive (genito-urological) including endometritis, prostatitis, polycystic ovarian syndrome, bladder control, hormone-related disorders, hearing disorders, cardiovascular conditions including hot flashes and profuse sweating, hypertension, stroke, obesity, osteoporosis, hematologic diseases, vascular diseases or conditions such as venous thrombosis, atherosclerosis, among numerous others and disorders of the central and peripheral nervous system, including depression, insomnia, anxiety, multiple sclerosis, neuropathy, neurodegenerative disorders (such as Parkinson's disease and Alzheimer's disease), as well as inflammatory bowel disease, Crohn's disease, coeliac (celiac) disease and related disorders of the intestine, among numerous others as described herein. A contraceptive indication to prevent or reduce the likelihood of pregnancy after intercourse is a further aspect of the present invention.

7 Claims, 24 Drawing Sheets

FIGURE 18

TABLE of Compounds

| Compound name | Structure | ER binding | |
|---|---|---|---|
| | | ERα (K$_i$) | ERβ (K$_i$) |
| AB-1 | | 32 nM | 26 nM |
| AB-1F | | 8.8 nM | 18 nM |
| AB-1F2 | | 26 nM | ND |
| AB-42F | | 1.3 nM | 4.5 nM |
| AB-4232F | | 60 nM | 95 nM |
| AB-85F | | 24 nM | 34 nM |
| AB-94F | | >300 nM | >300 nM |
| AB-127 | | 860 nM | 160 nM |

ND not determined

FIGURE 19

TABLE of Compounds

| Compound name | Structure | ER binding ERα (K$_i$) | ER binding ERβ (K$_i$) | ERE IC$_{50}$ | % ERα Degradation (10 µM cpd) |
|---|---|---|---|---|---|
| AB-22P | | 390 nM | 420 nM | ~10 µM | 38 |
| AB-81P | | 670 nM | 1.2 µM | ~3 µM | 33 |
| AB-82P | | 260 nM | 1.3 µM | ~2 µM | 87 |
| AB-71 | | 110 nM | 660 nM | ND | -35 |
| AB-83 | | 72 nM | ~1 µM | ND | 64 |
| ABFM-4C2 | | 7.6 nM | 30 nM | ND | 26 |
| ABFM-5C2 | | 78 nM | 600 nM | ND | 14 |
| AB-155F | | 16 nM | 100 nM | ND | -33 |
| AB-835C2 | | 44 nM | 530 nM | ND | 80 |

ND = not determined

COMPOUNDS FOR SELECTIVE BINDING TO ESTROGEN RECEPTORS ALPHA/BETA RELATIVE TO GPER/GPR30 AND METHODS OF TREATING DISEASE STATES AND CONDITIONS MEDIATED THROUGH THESE RECEPTORS

The present application is a United States national phase patent application based upon international patent application number PCT/US20/46957 of international filing date Aug. 19, 2020, which claims the benefit of priority of U.S. provisional application Ser. No. 62/891,018, filed Aug. 23, 2019 of identical title, the entire contents of which are incorporated by reference herein.

This invention was made with government support under grant numbers CA194496, CA163890, CA127731, CA118743, CA116662 and AI036357 awarded by the National Institutes of Health. The government has certain rights in the invention.

FIELD OF THE INVENTION

The present invention relates to compounds that modulate one or more of ERalpha/beta to the exclusion of GPER/GPR30, to pharmaceutical compositions based upon those compounds and to methods of treating disease states and conditions mediated through these receptors and related methods thereof.

RELATED APPLICATIONS AND GRANT SUPPORT

The present application claims the benefit of priority of United States provisional application serial number U.S. 62/891,018, filed Aug. 23, 2019 of identical title, the entire contents of which are incorporated by reference herein.

BACKGROUND AND OVERVIEW OF THE INVENTION

Estrogens mediate multiple complex physiological responses throughout the body. The responses are in turn mediated through the binding of estrogen to numerous receptors. The classical receptors for steroids, such as estrogen, are soluble cytoplasmic/nuclear proteins that function primarily as transcription factors. These receptors are known as estrogen receptor alpha and beta (two closely related proteins, including numerous splice variants of each) that mediate transcriptional activity as well as rapid cellular signaling. GPER is a 7-transmembrane G protein-coupled receptor (GPCR) that mediates estrogen-dependent signal transduction.

The current invention is in the field of molecular biology/pharmacology and provides compounds that modulate the effects of the classical estrogen receptors alpha and beta (ERalpha and ERbeta), while exhibiting little to no cross-reactivity towards GPER. These compounds may function as agonists and/or antagonists of one or more of the disclosed estrogen receptors. Diseases that are mediated through one or more of these receptors include cancer (particularly breast, reproductive and other hormone-dependent cancers, leukemia, colon cancer, prostate cancer), reproductive (genito-urological) including endometritis, prostatitis, polycystic ovarian syndrome, bladder control, hormone-related disorders, hearing disorders, cardiovascular conditions including hot flashes and profuse sweating, hypertension, stroke, obesity, osteoporosis, hematologic diseases, vascular diseases or conditions such as venous thrombosis, atherosclerosis, among numerous others and disorders of the central and peripheral nervous system, including depression, insomnia, anxiety, neuropathy, multiple sclerosis, neurodegenerative disorders such as Parkinson's disease and Alzheimer's disease, as well as inflammatory bowel disease, Crohn's disease, coeliac (celiac) disease and related disorders of the intestine, among numerous others. Compounds according to the present invention may also be used as contraceptive agents to prevent or decrease the likelihood that a woman will become pregnant as a consequence of intercourse.

The invention relates to compounds that have been identified as being agonists or antagonists (including inverse, partial and biased agonists, receptor modulators and receptor downregulators) to one or more of these receptors and represent compounds that may be used to treat any one or more diseases or conditions that are mediated through these receptors. These compounds, due to their ability to bind to one or both classical estrogen receptors (alpha and beta) are useful for the treatment or prevention (including the likelihood of the occurrence) of the diseases that are mediated through one or both of the alpha and beta estrogen receptors, among other diseases.

BRIEF DESCRIPTION OF THE INVENTION

The present invention is directed to novel 3-oxabicyclo[3.3.1]nonene derivatives of formula (I) exhibiting selective binding interactions with the estrogen receptor alpha and/or beta related to GPER. The invention includes: 1) the design of 3-oxabicyclo[3.3.1]nonene derivatives that modulate the activity of ER as agonists or antagonists for therapeutic and analytical applications; 2) 3-oxabicyclo[3.3.1]nonene derivatives labeled with fluorescent dyes for in vitro and in vivo applications; 3) 3-oxabicyclo[3.3.1]nonene derivatives that are directly labeled with stable isotope or radionuclides for analytical, diagnostic and/or therapeutic applications; 4) 3 oxabicyclo[3.3.1]-nonene derivatives possessing chelating ligands or other functionality that enables labeling with radionuclides for diagnostic and/or therapeutic applications.

In an embodiment, the invention relates to novel bicycle [3.3.1] nonane derivatives of formula (I):

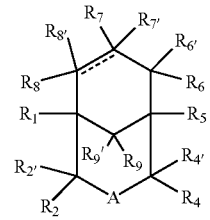

I

Where A is $C(R^3)(R^{3'})$, O, N—$R^1$ or S;
$R^1$ is H or a $C_1$-$C_3$ alkyl group optionally substituted with one or two hydroxyl groups or up to 3 halo (F, Cl, Br, I, preferably F) groups;
$R^3$ and $R^{3'}$ are each independently H or a $C_1$-$C_3$ alkyl group, optionally substituted with one or two hydroxyl groups or up to 3 halo groups;
$R^1$ and $R^5$ are each independently H, a $C_1$-$C_4$ optionally substituted alkyl or alkene group (preferably substituted with one or two hydroxyl groups or up to three halo (preferably fluoro) groups, $(CH_2)_n$—$CO_2H$, $(CH_2)_n$—$C(O)O(C_1$-$C_6)$alkyl, $(CH_2)_p$—$OC(O)(C_1$-$C_6)$alkyl, $(CH_2)_n$—$C(O)NR^{1a}R^{2a}$, where $R^{1a}$ and $R^{2a}$ are each independently H or a $C_1$-$C_3$ alkyl group optionally substituted with 1 or 2 hydroxyl groups or up to three halo (preferably, fluoro) groups, an optionally substituted $(CH_2)_n$—$C(O)H$, $(C_1$-$C_6)$ether, $(C_2$-$C_4)$acetal with each oxygen of the acetal group independently substituted with a $C_1$-$C_3$ alkyl group, $(C_3$-$C_7)$ketal with each oxygen of the ketall group independently substituted with a $C_1$-$C_3$ alkyl group, $(CH_2)_n$ sulfonic acid, a borate $((HO)_2B(CH_2)_n))$ group, an optionally substituted $(CH_2)_nC(O)$—$(C_1$-$C_6)$, $(CH_2)_nCN$, or a $(CH_2)_n$ $NR^{1a}R^{2a}$; where $R^{1a}$ and $R^{2a}$ are the same as above;

$R_2$ is H, an optionally substituted $C_1$-$C_{12}$ (preferably $C_1$-$C_6$) alkyl, including a cycloalkyl group, aryl, or heterocyclic group, preferably substituted with one or two hydroxyl groups or up to 5 halo (preferably F) groups;

$R_{2'}$ is H, $C_1$-$C_{12}$ optionally substituted alkyl group, preferably including a $C_5$-$C_8$ (often $C_5$-$C_6$) cycloalkyl group, an aryl group, preferably a phenyl group which is optionally substituted, preferably substituted with at least one optionally substituted $C_1$-$C_6$ alkyl group, up to three halogen (preferably F) groups and 1 or 2 hydroxyl groups or a borate $((HO)_2B(CH_2)_n))$ group (preferably, the alkyl group is a $C_1$-$C_3$ alkyl, which is optionally substituted), or $R_{2'}$ is a $C_5$-$C_6$ optionally substituted lactam or lactone group, a $C_5$-$C_7$ optionally substituted cyclic imide (the amine being optionally substituted with a $C_1$-$C_3$ alkyl group itself optionally substituted), a $C_5$-$C_7$ optionally substituted cyclic urea (preferably, the two nitrogen groups of the urea are each optionally substituted with a $C_1$-$C_3$ alkyl group optionally substituted with one or two hydroxyl groups or 1-3 halo groups), a $C_5$-$C_7$ optionally substituted cyclic carbamate (amine group is optionally substituted with a $C_1$-$C_3$ alkyl group which is optionally substituted with one or two hydroxyl groups or 1-3 halo groups) or a $C_5$-$C_7$ optionally substituted cyclic carbonate group, or an optionally substituted borate $((HO)_2 B(CH_2)_n))$ group;

$R_4$ and $R_{4'}$ are each independently H, or a $C_1$-$C_4$ optionally substituted alkyl group;

$R_6$ and $R_{6'}$ are each independently H, or a $C_1$-$C_3$ alkyl group optionally substituted with 1 or 2 hydroxyl groups or 1-3 halo (preferably fluoro) groups;

$R_7$ and $R_{7'}$ are each independently H (often, $R_{7'}$ and $R_{8'}$ are absent such that the carbon atoms substituted with $R_7$ and $R_8$ form a double bond), a $C_1$-$C_{20}$ optionally substituted alkyl group (often a $C_1$-$C_3$ alkyl group which is optionally substituted), a $C_3$-$C_{20}$, often a $C_3$-$C_{12}$ optionally substituted cycloalkyl group (often a $C_5$-$C_7$ optionally substituted cycloalkyl group), a $C_3$-$C_{20}$, often a $C_3$-$C_{12}$ optionally substituted heterocyclic group (often a $C_5$-$C_6$ optionally substituted heterocyclic group), a $C_2$-$C_{20}$ optionally substituted alkene group, often a $C_2$-$C_{12}$ optionally substituted alkene group (including an alkene group substituted with one, two or three ether groups and/or one or two optionally substituted amide groups and/or one, two or three optionally substituted amine groups); a $C_1$-$C_{20}$ alkylene amide group, often a $C_1$-$C_{12}$ alkylene amide group (the amide group is unsubstituted or substituted with one or two optionally substituted $C_1$-$C_6$ alkyl groups or optionally substituted phenyl groups); a $C_1$-$C_{20}$ alkylene sulfide, often a $C_1$-$C_{12}$ alkylene sulfide which is optionally substituted, a $C_1$-$C_{20}$ alkylene sulfoxide, often a $C_1$-$C_{12}$ alkylene sulfoxide which is optionally substituted or $C_1$-$C_{20}$ alkylene sulfone, often a $C_1$-$C_{12}$ alkylene sulfone which is optionally substituted (the sulfide, sulfoxide and sulfone being integral with the alkylene chain), a $(CH_2)_m$—$S(O)_2$—$(CH_2)_mC(O)$ $NR^{1b}R^{2b}$ group where each m is 0-10 and $R^{1b}$ and $R^{2b}$ are each independently H or $C_1$-$C_6$ alkyl which is optionally substituted often with 1-3 halogen groups or 1 or 2 hydroxyl groups, a $(CH_2)_m$—$S(O)_2$—$(CH_2)_m$ $C_3$-$C_{12}$-cyloalkyl, heterocyclic, aryl, or heteroaryl group where each m is 0-10, or $R_7$ together with $R_8$ and the carbon atoms to which they are attached form a $C_5$-$C_7$ optionally substituted cyclic group wherein said optionally substituted cyclic groups are substituted with up to five $(R^{1b-5b})$ groups where $R^{1b}$-$R^{5b}$ often are each independently H or $C_1$-$C_6$ alkyl which are optionally substituted;

$R_8$ and $R_{8'}$ are each independently H, a $C_1$-$C_{20}$, often a $C_{1-12}$ optionally substituted alkyl group, a $C_1$-$C_{20}$, often a $C_{1-12}$ optionally substituted cycloalkyl group, a $C_1$-$C_{20}$, often a $C_1$-12 optionally substituted heterocyclic group, a $C_2$-$C_{20}$, often a $C_{2-12}$ optionally substituted alkene group (including an alkene group substituted with one, two or three ether groups and/or one or two optionally substituted amide groups, a carboxylic group, up to 3 halogen groups and 1 or 2 hydroxyl groups) and/or one, two or three optionally substituted amine groups; a $C_1$-$C_{20}$, often a $C_{1-12}$ alkylene amide group which is optionally substituted (the amide group is unsubstituted or often is substituted with one or two optionally substituted $C_1$-$C_6$ alkyl groups or optionally substituted phenyl groups); a $C_1$-$C_{20}$, often a $C_{1-12}$ alkylene sulfide which is optionally substituted (preferably with a $C_1$-$C_8$ alkyl group which is optionally substituted with at least one halogen (Br or F), a $C_1$-$C_3$ alkyl sulfoxide, an azide or an amine). a $C_1$-$C_{20}$, often a $C_{1-12}$ alkylene sulfoxide which is optionally substituted, a $C_1$-$C_{20}$, often a $C_{1-12}$ alkylene sulfone or a $C_1$-$C_{20}$, often a $C_1$-$C_{12}$ alkylene sulfonic ester which is optionally substituted with a $C_1$-$C_4$ alkyl group or a phenyl group each of which alkyl or phenyl groups are optionally substituted with at least one halogen group and 1 or 2 hydroxyl groups (the sulfide, sulfoxide, sulfone and sulfonic ester being preferably integral with the alkylene chain), a $(CH_2)_m$—$S(O)_2$—$(CH_2)_mC$ $(O)NR^{1b}R^{2b}$ group where each m is 0-10 and $R^{1b}$ and $R^{2b}$ are each independently H or $C_1$-$C_6$ alkyl, a $(CH_2)_m$ —$S(O)_2$—$(CH_2)_m$ $C_3$-$C_{12}$-cyloalkyl, heterocyclic, aryl, or heteroaryl where each m is 0-10, or $R_8$ together with $R_7$ and the carbon atoms to which they are attached form a $C_5$-$C_7$ optionally substituted cyclic group wherein said optionally substituted cyclic group is optionally substituted with up to five $(R^{1b-5b})$ groups where $R^{1b}$-$R^{5b}$ often are each independently H or $C_1$-$C_6$ alkyl which are optionally substituted; or $R_{7'}$ and $R_{8'}$ are both absent when the bond between the $R_7$-substituted and $R_8$-substituted carbon atoms is a double bond (in embodiments where $R_{7'}$ and $R_{8'}$ are present, often $R_{7'}$ and $R_{8'}$ are H or a $C_1$-$C_3$ alkyl group which is optionally substituted with up to three halogen groups and 1 or 2 hydroxyl groups);

$R^9$ and $R^{9'}$ are each independently H or a $C_1$-$C_3$ alkyl group, optionally substituted with one or two hydroxyl groups or up to 3 halo groups; and n is 0-6 (0, 1, 2, 3, 4, 5 or 6);

p is 1-6 (1, 2, 3, 4, 5, 6) or a pharmaceutically acceptable salt, stereoisomer, solvate or polymorph thereof.

In embodiments of compound I, above and compounds IA, IAA, IAACYC and II, $R_7$, $R_{7A}$, $R_8$ or $R_{8A}$, often $R_8$ or $R_{8A}$ is:

a $C_1$-$C_{12}$ alkyl optionally substituted with an amide group $C(O)NR^{3a}R^{4a}$ or $N(R^{3a})_C(O)R^{4a}$ where $R^{3a}$ and $R^{4a}$ are each independently H or a $C_1$-$C_6$ (often $C_1$-$C_4$) alkyl group which is optionally substituted with up to three halogens (often F) and 1 or 2 hydroxyl groups, a sulfide group which is substituted with H (thiol), a $C_1$-$C_8$ alkyl group which is optionally substituted with up to 3 halogen groups (Br, F), 1 or 2 hydroxyl groups, an azide, an amine or a $S(O)C_1$-$C_6$ alkyl group which is optionally substituted with up to 3 halogen groups or 1 or 2 hydroxyl groups), a sulfonic group $OS(O)_2(CH_2)_{SO}R^{SO}$, a sulfonyl group $S(O)_2R^{SO}$, where $R^{SO}$ is H, a $C_1$-$C_8$ alkyl group or a phenyl group wherein said phenyl group is optionally substituted with a $C_1$-$C_3$ alkyl group or said alkyl or phenyl group is optionally substituted with up to 3 halogen groups (often F or Br), 1 or 2 hydroxyl groups, an azide an amine or a $S(O)C_1$-$C_6$ alkyl group (often methyl) which is optionally substituted with up to 3 halogen groups or 1 or 2 hydroxyl groups) or $R^{SO}$ is an alkylene amide group $(CH_2)_{SO}\cdot C(O)NR^{3a}R^{4a}$ or $(CH_2)_{SO}NR^{3a}C(O)R^{4a}$, where $R^{3a}$ and $R^{4a}$ are the same as above, so is 0-8 (0, 1, 2, 3, 4, 5, 6, 7, 8) and so' is 1-8 (1, 2, 3, 4, 5, 6, 7, 8).

In embodiments of compound I, above and compounds IA, IAA, IAACYC and II, $R_7$, $R_{7A}$, $R_8$ or $R_{8A}$, often $R_8$ or $R_{8A}$ is;

—$(CH_2)_9CH_3$;
—$(CH_2)_3CH(CH_3)_2$;
—$(CH_2)_2CH$=$C(CH_3)_2$;
—$(CH_2)_5SO_2C_6H_5$;
—$(CH_2)_2CH$=$CH$—$CO_2H$;
—$(CH_2)_{11}CON(CH_3)CH_2CH_2CH_2CH_3$;
—$(CH_2)_{11}CONH(CH_2)_6NH_2$;
—$(CH_2)_{11}CONH(CH_2)_8NH_2$;
—$(CH_2)_{11}CONH$—$CH_2CH_2$—O—$CH_2CH_2$—O—$CH_2CH_2NH_2$;
—$(CH_2)_{11}CONH$—$CH_2CH_2$—O—$CH_2CH_2$—O—$CH_2CH_2$—O—$CH_2CH_2NH_2$;
—$(CH_2)_5SO_2(CH_2)_5CON(CH_3)CH_2CH_2CH_2CH_3$;
—$(CH_2)_5SO_2(CH_2)_5CONH(CH_2)_6NH_2$;
—$(CH_2)_5SO_2(CH_2)_5CONH(CH_2)_8NH_2$;
—$(CH_2)_5SO_2(CH_2)_5CONH$—$CH_2CH_2$—O—$CH_2CH_2$—O—$CH_2CH_2NH_2$;
—$(CH_2)_5SO_2(CH_2)_5CONH$—$CH_2CH_2$—O—$CH_2CH_2$—O—$CH_2CH_2$—O—$CH_2CH_2NH_2$;
—$(CH_2)_2CH$=$CHCON(CH_3)CH_2CH_2CH_2CH_3$;
—$(CH_2)_2CH$=$CHCONH(CH_2)_6NH_2$;
—$(CH_2)_2CH$=$CHCONH(CH_2)_8NH_2$;
—$(CH_2)_2CH$=$CHCONH$—$CH_2CH_2$—O—$CH_2CH_2$—O—$CH_2CH_2NH_2$;
—$(CH_2)_2CH$=$CHCONH$—$CH_2CH_2$—O—$CH_2CH_2$—O—$CH_2CH_2$—O—$CH_2CH_2NH_2$;
—$(CH_2)_2CH$=$CHCONH$—$CH_2CH_2$—O—$CH_2CH_2$—O—$CH_2CH_2NHCOCH_3$;
—$(CH_2)_2CH$=$CHCH_2NH$—$CH_2CH_2$—O—$CH_2CH_2$—O $CH_2CH_2NHCH_2CH_3$;
—$(CH_2)_5NH$—$CH_2CH_2$—O—$CH_2CH_2$—O—$CH_2CH_2NHCH_2CH_3$;
—$(CH_2)_{11}$—$C(O)N(CH_3)(CH_2)_3CH_3$;
—$(CH_2)_3$—$SO_2$-Phenyl;
—$(CH_2)_5$—$SO_2$-Phenyl;
—$(CH_2)_3$—$SO_2$—$(CH_2)_5$—$C(O)N(CH_3)(CH_2)_3CH_3$;
—$(CH_2)_5$—$SO_2$—$(CH_2)_5$—$C(O)N(CH_3)(CH_2)_3CH_3$;
—$(CH_2)_3$—S—$(CH_2)_5$—$C(O)N(CH_3)(CH_2)_3CH_3$;
—$(CH_2)_5$S—$(CH_2)_5$—$C(O)N(CH_3)(CH_2)_3CH_3$;
—$(CH_2)_3$—$OSO_2$-Toluyl (methyl substituted phenyl);
—$(CH_2)_3$—$S(O)CH_3$;
—$(CH_2)_3$—$SO_2$—$(CH_2)_6$—Br;
—$(CH_2)_3$—S—$(CH_2)_6$—Br;
—$(CH_2)_3$—$SO_2$—$(CH_2)_6$—$S(O)CH_3$;
—$(CH_2)_3$—S—$(CH_2)_6$—$S(O)CH_3$;
—$(CH_2)_3$—$SO_2$—$(CH_2)_6$—$N_3$;
—$(CH_2)_3$—S—$(CH_2)_6$—$N_3$;
—$(CH_2)_3$—$SO_2$—$(CH_2)_6$—$NH_2$; or
—$(CH_2)_3$—S—$(CH_2)_6$—$NH_2$.

In an embodiment where $R_{7'}$ and $R_{8'}$ are absent and A is O, the invention is directed to 3-oxabicyclo[3.3.1]nonene derivatives of formula (IA):

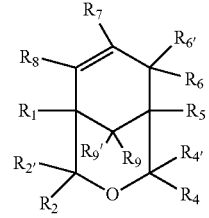

IA

Where $R_1$, $R_2$, $R_{2'}$, $R_4$, $R_{4'}$, $R_5$, $R_6$, $R_{6'}$, $R_7$, $R_8$, $R_9$ and $R_{9'}$ are the same as above for compound I, or a pharmaceutically acceptable salt, stereoisomer, solvate or polymorph thereof.

In embodiments of the compound according to formula IA above:

$R_1$ is H;

$R_2$ is H, or a $C_1$-$C_3$ alkyl group which is optionally substituted with up to 3 halogen groups and one or two hydroxyl groups;

$R_{2'}$ is a phenyl group which is optionally substituted with up to 3 halogen groups (often F), 1 or 2 hydroxyl groups and a borate group $((HO)_2B$;

$R_4$ and $R_{4'}$ are each independently H or a $C_1$-$C_3$ alkyl group which is optionally substituted with up to 3 halogen groups (often F) and 1 or 2 hydroxyl groups;

$R_5$ is H or a $C_1$-$C_3$ alkyl group optionally substituted with up to 3 halogen groups (often F) and and 1 or 2 hydroxyl groups, or an amine group $NR^{1a}R^{2a}$ where $R^{1a}$ and $R^{2a}$ are each independently H or a $C_1$-$C_3$ alkyl group which is optionally substituted with up to three halogen groups (often F) and 1 or 2 hydroxyl groups, or $R_5$ is a carboxylic acid group, a cyano group or a borate group $((HO)_2B$;

$R_6$ is H or a $C_1$-$C_3$ alkyl group which is optionally substituted with up to three halogen groups (often F) and 1 or 2 hydroxyl groups (often $R_6$ is H);

$R_{6'}$ is H;

$R_7$ is H or methyl which is optionally substituted with up to three halogen groups (often F) or 1 or 2 hydroxyl groups ($R_7$ is often H);

$R_8$ is a $C_1$-$C_{12}$ alkyl optionally substituted with an amide group $C(O)NR^{3a}R^{4a}$ or $N(R^{3a})C(O)R^{4a}$, where $R^{3a}$ and $R^{4a}$ are each independently H or a $C_1$-$C_6$ (often $C_1$-$C_4$) alkyl group which is optionally substituted with up to three halogens (often F) and 1 or 2 hydroxyl groups, a sulfide group which is substituted with H (thiol), a $C_1$-$C_8$ alkyl group which is optionally substituted with up to 3 halogen groups (Br, F), 1 or 2 hydroxyl groups, an azide, an amine or a $S(O)C_1$-$C_6$ alkyl group which is optionally substituted with up to 3 halogen groups or 1 or 2 hydroxyl groups), a sulfonic group $OS(O)_2(CH_2)_{SO}R^{SO}$, a sulfonyl group $S(O)_2R^{SO}$, where $R^{SO}$ is H, a $C_1-C_8$ alkyl group or a phenyl group wherein said phenyl group is optionally substituted with a $C_1-C_3$ alkyl group or said alkyl or phenyl group is optionally substituted with up to 3 halogen groups (often F or Br), 1 or 2 hydroxyl groups, an azide an amine or a $S(O)C_1-C_6$ alkyl group (often methyl) which is optionally substituted with up to 3 halogen groups or 1 or 2 hydroxyl groups) or $R^{SO}$ is an alkylene amide group $(CH_2)_{SO'}C(O)NR^{3a}R^{4a}$ or $(CH_2)_{SO'}NR^{3a}C(O)R^{4a}$, where $R^{3a}$ and $R^{4a}$ are the same as above, so is 0-8 (0, 1, 2, 3, 4, 5, 6, 7, 8) and so' is 1-8 (1, 2, 3, 4, 5, 6, 7, 8); and $R_9$ and $R_{9'}$ are each independently H or a methyl group, which is optionally substituted with up to 3 halogen groups and 1 or 2 hydroxyl groups, or a pharmaceutically acceptable salt, stereoisomer, solvate or polymorph thereof In embodiments of compound I where $R_{7'}$ and $R_{8'}$ are absent, the present invention is directed to compounds according to formula IAA:

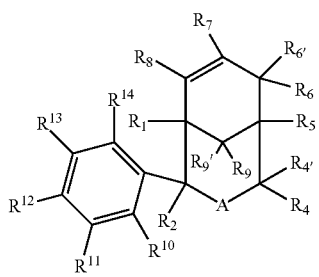

IAA

Wherein A, $R_1$, $R_2$, $R_4$, $R_{4'}$, $R_5$, $R_6$, $R_{6'}$, $R_7$, $R_8$, $R_9$ and $R_{9'}$ are the same as above for compound I or $R_1$, $R_2$, $R_4$, $R_{4'}$, $R_5$, $R_6$, $R_{6'}$, $R_7$, $R_8$, $R_9$ and $R_{9'}$ are the same as above for compound IA; and $R^{10}$, $R^{11}$, $R^{12}$, $R^{13}$ and $R^{14}$ are each independently H, a halo group, a hydroxyl group, a $C_1-C_3$ alkyl optionally substituted with 1-3 halo groups (often F) and 1 or 2 hydroxyl groups, CN, $NO_2$, an amine group $NR^{1a}R_{2a}$ where $R^{1a}$ and $R^{2a}$ are each independently H or a $C_1-C_3$ alkyl group which is optionally substituted with up to three halogen groups (often F) and 1 or 2 hydroxyl groups, an amide group $C(O)NR^{3a}R^{4a}$ or $N(R^{3a})C(O)R^{4a}$, where $R^{3a}$ and $R^{4a}$ are each independently H or a $C_1-C_6$ (often $C_1-C_4$) alkyl group which is optionally substituted with up to three halogens (often F) and 1 or 2 hydroxyl groups, a carboxylic acid group, a $C(O)C_1-C_3$ alkyl group, a $OC(O)C_1-C_3$ alkyl group or a $C(O)OC_1-C_3$ alkyl group wherein each alkyl group is optionally substituted with one or two hydroxyl groups or 1-3 halo groups, a borate $((HO)_2B)$ group or a $CO_2H$ group, or a pharmaceutically acceptable salt, stereoisomer, solvate or polymorph thereof.

In embodiments of compound of formula IAA:

$R_5$ is H or a $C_1-C_3$ alkyl group optionally substituted with up to 3 halogen groups (often F) and and 1 or 2 hydroxyl groups, or an amine group $NR^{1a}R^{2a}$ where $R^{1a}$ and $R^{2a}$ are each independently H or a $C_1-C_3$ alkyl group which is optionally substituted with up to three halogen groups (often F) and 1 or 2 hydroxyl groups, or $R_5$ is a carboxylic acid group, a cyano group or a borate group $((HO)_2B)$;

$R_8$ is a $C_1-C_{12}$ alkyl optionally substituted with an amide group $C(O)NR^{3a}R^{4a}$ or $N(R^{3a})C(O)R^{4a}$, where $R^{3a}$ and $R^{4a}$ are each independently H or a $C_1-C_6$ (often $C_1-C_4$) alkyl group which is optionally substituted with up to three halogens (often F) and 1 or 2 hydroxyl groups, a sulfide group which is substituted with H (thiol), a $C_1-C_8$ alkyl group which is optionally substituted with up to 3 halogen groups (Br, F), 1 or 2 hydroxyl groups, an azide, an amine or a $S(O)C_1-C_6$ alkyl group which is optionally substituted with up to 3 halogen groups or 1 or 2 hydroxyl groups), a sulfonic group $OS(O)_2(CH_2)_{SO}R^{SO}$, a sulfonyl group $S(O)_2R^{SO}$, where $R^{SO}$ is H, a $C_1-C_8$ alkyl group or a phenyl group wherein said phenyl group is optionally substituted with a $C_1-C_3$ alkyl group or said alkyl or phenyl group is optionally substituted with up to 3 halogen groups (often F or Br), 1 or 2 hydroxyl groups, an azide an amine or a $S(O)C_1-C_6$ alkyl group (often methyl) which is optionally substituted with up to 3 halogen groups or 1 or 2 hydroxyl groups) or $R^{SO}$ is an alkylene amide group $(CH_2)_{SO'}C(O)NR^{3a}R^{4a}$ or $(CH_2)_{SO'}NR^{3a}C(O)R^{4a}$, where $R^{3a}$ and $R^{4a}$ are the same as above, so is 0-8 (0, 1, 2, 3, 4, 5, 6, 7, 8) and so' is 1-8 (1, 2, 3, 4, 5, 6, 7, 8); and $R^{10}$, $R^{11}$, $R^{12}$, $R^{13}$ and $R^{14}$ are each independently H, a halo group, a hydroxyl group, a $C_1-C_3$ alkyl optionally substituted with 1-3 halo groups (often F) and 1 or 2 hydroxyl groups, CN, $NO_2$, $C(O)C_1-C_3$ alkyl optionally substituted with one or two hydroxyl groups or 1-3 halo groups, a borate $((HO)_2B)$ group or a $CO_2H$ group.

In embodiments of formula I, the present invention is directed to a compound of formula IAA Cyc:

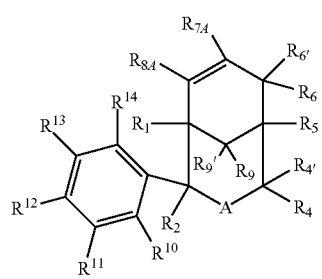

IAACyc

Wherein A, $R_1$, $R_{2'}$, $R_4$, $R_{4'}$, $R_5$, $R_6$, $R_{6'}$, $R_9$, $R_{9'}$ are the same as for compound I, or $R_1$, $R_2$, $R_4$, $R_{4'}$, $R_5$, $R_6$, $R_{6'}$, $R_9$, $R_{9'}$ are the same as for compound IA;

$R^{10}$, $R^{11}$, $R^{12}$, $R^{13}$ and $R^{14}$ are each the same as above for compound IAA;

$R_{7A}$ is H, or a $C_1-C_{20}$ optionally substituted alkyl group, a $C_1-C_{20}$ optionally substituted cycloalkyl group, a $C_1-C_{20}$ optionally substituted heterocyclic group, a $C_2-C_{20}$ optionally substituted alkene group (including an alkene group substituted with one, two or three ether groups and/or one or two optionally substituted amide groups) and/or one, two or three optionally substituted amine groups; a $C_1-C_{20}$ alkylene amide group (the amide group is unsubstituted or substituted with one or two optionally substituted $C_1-C_6$ alkyl groups or optionally substituted phenyl groups); a $C_1-C_{20}$ alkylene sulfide, a $C_1-C_{20}$ alkylene sulfoxide or $C_1-C_{20}$ alkylene sulfone (the sulfide, sulfoxide and sulfone being integral with the alkylene chain), a $(CH_2)_m$—$S(O)_2$—$(CH_2)_mC(O)NR^{1b}R^{2b}$ group where each m is 0-10 and $R^{1b}$ and $R^{2b}$ are each independently H or $C_1$-$C_6$ alkyl, or $R_8$ together with $R_7$ and the carbon atoms to which they are attached form a $C_5$-$C_7$ optionally substituted cyclic group, a $(CH_2)_m$—S(O)$_2$—$(CH_2)_m$ $C_3$-$C_{12}$-cyloalkyl, heterocylic, aryl, or heteroaryl where each m is 0-10, wherein said $C_5$-$C_7$ optionally substituted cyclic group is substituted with H or $C_1$-$C_6$ alkyl (often $C_1$-$C_3$ alkyl), which is optionally substituted with 1-3 halogen (often F) groups and 1 or 2 hydroxyl groups; and $R_{8A}$ is H, or a $C_1$-$C_{20}$ optionally substituted alkyl group, a $C_1$-$C_{20}$ optionally substituted cycloalkyl group, a $C_1$-$C_{20}$ optionally substituted heterocyclic group, a $C_2$-$C_{20}$ optionally substituted alkene group (including an alkene group substituted with one, two or three ether groups and/or one or two optionally substituted amide groups) and/or one, two or three optionally substituted amine groups; a $C_1$-$C_{20}$ alkylene amide group (the amide group is unsubstituted or substituted with one or two optionally substituted $C_1$-$C_6$ alkyl groups or optionally substituted phenyl groups); a $C_1$-$C_{20}$ alkylene sulfide, a $C_1$-$C_{20}$ alkylene sulfoxide or $C_1$-$C_{20}$ alkylene sulfone (the sulfide, sulfoxide and sulfone being integral with the alkylene chain), a $(CH_2)_m$—S(O)$_2$—$(CH_2)_m$C(O)NR$^{1b}$R$^{2b}$ group where each m is 0-10 and $R^{1b}$ and $R^{2b}$ are each independently H or an optionally substituted $C_1$-$C_6$ alkyl, or $R_{8A}$ together $R_{7A}$ and the carbon atoms to which they are attached form a $C_5$-$C_7$ optionally substituted cyclic group, a $(CH_2)_m$—S(O)$_2$—$(CH_2)_m$ $C_3$-$C_{12}$-cyloalkyl, heterocylic, aryl, or heteroaryl where each m is 0-10, and wherein said $C_5$-$C_7$ optionally substituted cyclic group is substituted with H or $C_1$-$C_6$ alkyl (often $C_1$-$C_3$ alkyl), which is optionally substituted with 1-3 halogen (often F) groups and 1 or 2 hydroxyl groups, or a pharmaceutically acceptable salt, stereoisomer, solate or polymorph thereof.

In embodiments, the present invention is also directed to novel 3-oxabicyclo[3.3.1]nonane derivatives of formula (II):

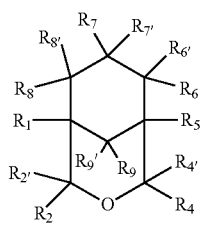

II

Wherein $R_1$, $R_2$, $R_{2'}$, $R_4$, $R_{4'}$, $R_5$, $R_6$, $R_{6'}$, $R_7$, $R_{7'}$, $R_8$, $R_{8'}$, $R_9$ and $R_{9'}$ are the same as for compound I above, or a pharmaceutically acceptable salt, stereoisomer, solvate or polymorph thereof.

Preferred examples of the present compounds that function as agonists (and their associated binding affinities for the ligand binding domain of ERalpha) include the compounds which are presented in FIGS. 16, 17 and 18-19 thereof.

The present invention also relates to pharmaceutical compositions comprising an effective amount of one or more of the above-referenced compounds, optionally in combination with a pharmaceutically acceptable additive, carrier or excipient. In embodiments, the pharmaceutical composition may further comprise an effective amount of a bioactive agent which enhances the biological effect for which the composition is administered to a patient.

In an alternative embodiment according to the present invention, one or more positions or substituents on compounds according to the present invention are derivatized or labeled to link a fluorescent moiety, dye, or optionally substituted chelating ligands or other functionality for labeling with metal (including radionuclide) complexes. In this aspect of the invention, at a position or substituent of a compound according to the present invention, and preferably at $R_1$, $R_2$, $R_{2'}$, (including at $R^{10}$, $R^{11}$, $R^{12}$, $R^{13}$ and/or $R^{14}$ when $R_{2'}$, is a substituted phenyl group), $R_4$, $R_{4'}$, $R_5$, $R_6$, $R_{6'}$, $R_7$, $R_{7'}$, $R_8$, $R_{8'}$, $R_9$ and $R_{9'}$, more preferably at $R_{2'}$ or $R_8$, a dye, preferably a fluorescent dye may be attached to the compound through a chemical linker through carbon (carbon-carbon), carbonyl, amide, ester, ether, or S(O)$_n$ (where n=0, 1 or 2) bonds, among others. Representative fluorescent dyes include fluorescein, Alexa, Bodipy, Cyanin, coumarin, Dansyl, rhodamine and pyrene, among others. Specific florescent dyes to be used in the present invention include Alex® (350, 405, 430, 488, 500, 514, 532, 546, 555, 568, 594, 610, 633, 647, 660, 680, 700 and 750), AMCA-X, Bodipy® (630/650, 650/665, FL, TMR, TR), Cascade Blue®, Dinitrophenyl, fluorescein (FAM), HEX, JOE®, cyan, Marina Blue®, Oregon Green® (488 and 514), Pacific Blue®, Pacific Orange®, Rhodamine Green®, QSY® (7, 9, 21 and 35), ROX, Rhodamine Red®, TET, Tetramethylrhodamine (TAMRA) and Texas Red®, among others, available from suppliers such as Invitrogen, Ltd (UK) and Molecular Probes, Inc. (Eugene, Oregon), among others. One of ordinary skill will readily be able to derivatize compounds according to the present invention and link them through the above-referenced groups to fluorescent moieties provide fluorescent versions of compounds according to the present invention.

In this aspect of the invention, the present compounds are conjugated or linked to one or more of the above-described fluorescent dyes. In one aspect of the invention, compounds according to the present invention may by synthesized which contain or are modified to contain nucleophilic functional groups such as OH, SH, NH$_2$, which are coupled with reactive dyes containing electrophilic functional groups. The result is a conjugated fluorescently labeled compound according to the present invention. In another aspect of the invention, compounds according to the present invention which contain or are modified to contain electrophilic functional groups including aldehydes, ketones, maleimide, epoxide, carboxylic acid or esters, may be coupled with nucleophilic reactive dyes to produce fluorescently labeled compounds according to the present invention. Alternatively, compounds according to the present invention which contain or are modified with or to contain bifunctional linkages such as aminohexanoic acid, succinic acid, etc. are coupled with a reactive dye accordingly to produce fluorescently labeled compounds according to the present invention. This chemistry is well developed in the art.

Examples of Reactive Fluorescent Dyes:
Amine Reactive:
Fluorescein isothiocyanate
[Tetramethylrhodamine-5-(and-6)-isothiocyanate]
[6-(Fluorescein-5-carboxamido)hexanoic acid, succinimidyl ester]
[5-(and-6)-Carboxyrhodamine 6G, succinimidyl ester]
[5-(and-6)-Carboxytetramethylrhodamine, succinimidyl ester]
[6-(Tetramethylrhodamine-5-(and-6)-carboxamido) hexanoic acid, succinimidyl ester]

[5-(and-6)-Carboxyfluorescein, succinimidyl ester]
1-pyrenebutanoic acid succinimidyl ester
7-Hydroxy-4-methylcoumarin-3-acetic acid, succinimidyl ester
7-Methoxycoumarin-3-carboxylic acid, succinimidyl ester
[6-((7-Amino-4-methylcoumarin-3-acetyl)amino)hexanoic acid, succinimidyl ester]
[5-Dimethylaminonaphthalene-1-sulfonyl chloride]
[Tetramethylrhodamine-5-iodoacetamide]
[5-(((((2-Iodoacetyl)amino)ethyl)amino)naphthalene-1-sulfonic acid]
[6-Bromoacetyl-2-dimethylaminonaphthalene]
Thiol Reactive
[N-(7-Dimethylamino-4-methylcoumarin-3-yl)maleimide]
Aldehyde, Ketone (Electrophilic) Reactive
Sulforhodamine 101 hydrazide The present invention also relates to compounds according to the present invention wherein one or more atoms in compounds, including substituents according to the present invention are isotopically labeled, including stable and radioactive isotopes. The substituents located at any substitutable position on compounds according to the present invention may possess isotopes of hydrogen (H-2, H-3), carbon (C-11, C-13, C-14), fluorine (F-18), iodine (I-123, I-125, I-131), bromine (Br-77), nitrogen (N-13, N-15), oxygen (O-15, O-18), phosphorous (P-32), sulfur (S-35), boron (B-10) as well as other stable or radioactive isotopes which do not require a chelate to attach to compounds according to the present invention. These isotopes assist in providing relevant information in bioassays, mechanistic studies and receptor ligand interactions, among others and may be used on compounds according to the present invention with well-known analytical techniques. Synthesis of these compounds may be readily performed using standard chemical synthetic techniques well-known in the art for isotopically labeling compounds.

The present invention also relates to derivatives of compounds (I, IA, IAA, IaaCyc or II) wherein one or more substituents in compounds according to the present invention provide chelating ligands or other functionality for labeling with radionuclide complexes.

The substituents located at any substitutable position on compounds according to the present invention, preferably at or on $R_1$, $R_2$, $R_{2'}$, $R_4$, $R_{4'}$, $R_5$, $R_6$, $R_{6'}$, $R_7$, $R_{7'}$, $R_8$, $R_{8'}$, $R^{10}$, $R^{11}$, $R^{12}$, $R^{13}$ or $R^{14}$ of any of the compounds of the present invention may provide chelating ligands including aminocarboxylates such as diethylenetriaminepentaacetic acid (DTPA), 1,4,7,10-tetraazacyclododecane-1,4,7,10-tetraacetic acid (DOTA), mercaptoacetyltriglycine ($MAG_3$), picolinamine-N-acetic acid, pyridin-2-ylhydrazine-N-acetic acid. Radionuclide complexes include isotopes of bismuth (Bi-213), copper (Cu-64, Cu-67), gallium (Ga-67, Ga-68), indium (In-111), lutetium (Lu-177), palladium (Pd-103), rhenium (Re-186, Re-188), technetium (Tc-99m, Tc-94), and yttrium (Y-90), among others.

In a further embodiment, the present invention also relates to a method of detecting ERalpha and ERbeta receptors in a tissue sample suspected of containing ER receptors comprising exposing said tissue sample to a compound as described above, measuring the binding of said compound to said tissue sample and comparing the results of said measuring step to at least one standard obtained by measuring the binding of said compound to at least one tissue sample known to contain ERalpha and/or beta receptors. In another aspect of the invention, a separate or an additional tissue sample from which a standard is determined may be devoid of ER receptors (in order to test for ER receptors or for non-specific binding).

In yet a further embodiment of the present invention, a method of diagnosing cancer in a tissue sample suspected of being cancerous comprises exposing said tissue to a compound as described above, measuring the binding of said compound to said tissue to produce a first measurement and comparing the first measurement obtained with a standard obtained by measuring the binding of said compound with a tissue sample known to be free of cancer; wherein a first measurement which is substantially greater than said standard is indicative of cancer and a first measurement which is the same or lower than said standard is indicative of the absence of cancer in said tissue sample. In a related method, the first measurement may be compared to the binding of the compound with a similar type of tissue which is known to be cancerous wherein a measurement which is the same or higher than the standard is indicative of cancer in the tested tissue. Alternative embodiments may comprise comparing the first measurement with a standard obtained from both cancerous and non-cancerous tissue of the same type to gauge the presence of cancer in the tissue.

Structures of fluorescent and chelate structures may also be incorporated into compounds according to the present invention, at any substituent, but preferably a fluorescent or chelate structure at $R_8$ and/or $R_{2'}$, is preferred.

Methods of treating disease states and/or conditions which are mediated through ERalpha and/or ERbeta receptors or through other mechanisms represent further embodiments according to the present invention. These disease disease states and/or conditions include cancer (including especially breast, reproductive and other hormone-dependent cancers, leukemia, colon cancer, prostate cancer), reproductive (genito-urological) including endometritis, prostatitis, polycystic ovarian syndrome, bladder control, hormone-related disorders, hearing disorders, cardiovascular conditions including hot flashes and profuse sweating, hypertension, stroke, obesity, osteoporosis, hematologic diseases, vascular diseases or conditions such as venous thrombosis, atherosclerosis, among numerous others and disorders of the central and peripheral nervous system, including depression, insomnia, anxiety, neuropathy, multiple sclerosis, neurodegenerative disorders such as Parkinson's disease and Alzheimer's disease, as well as inflammatory bowel disease, Crohn's disease, coeliac (celiac) disease and related disorders of the intestine, among numerous others as described herein. Compounds according to the present invention may also be used as contraceptive agents to prevent or decrease the likelihood that a woman will become pregnant as a consequence of intercourse.

Additional disease states and/or conditions which may be treated using compounds and/or compositions according to the present include for example, include cancer (particularly breast, reproductive and other hormone-dependent cancers, leukemia, colon cancer, prostate cancer), reproductive (genito-urological) including endometritis, prostatitis, polycystic ovarian syndrome, bladder control, hormone-related disorders, hearing disorders, cardiovascular conditions including hot flashes and profuse sweating, hypertension, stroke, obesity, osteoporosis, hematologic diseases, vascular diseases or conditions such as venous thrombosis, atherosclerosis, among numerous others and disorders of the central and peripheral nervous system, including depression, insomnia, anxiety, neuropathy, multiple sclerosis, neurodegenerative disorders such as Parkinson's disease, Huntington's disease and Alzheimer's disease, as well as inflammatory bowel disease, Crohn's disease, coeliac (celiac) disease and related disorders of the intestine, fibrotic disease and/or conditions including pulmonary fibrosis, pulmonary hypertension, nephropathy (e.g. membranous nephropathy (MN), diabetic nephropathy and hypertensive nephropathy), glomerulonephritis (e.g. membranous glomerulonephritis and membranoproliferative glomerulonephritis (MPGN) such as rapidly progressive glomerulonephritis (RPGN)), interstitial nephritis, lupus nephritis, idiopathic nephrotic syndrome (INS) (e.g. minimal change nephrotic syndrome (MCNS) and focal segmental glomerulosclerosis (FSGS)), obstructive uropathy, polycystic kidney disease (e.g. Autosomal Dominant Polycystic Kidney Disease (ADPKD) and Autosomal Recessive Polycystic Kidney Disease (ARPKD)), liver fibrosis; cardiovascular: atherosclerosis, myocardial infarction, stroke, arterial hypertension, coronary artery disease, restenosis after balloon angioplasty, ischemia/reperfusion injury after myocardial or cerebral infarction, hypertrophic cardiomyopathy, heart failure, heart failure associated with aging (in particular diastolic dysfunction, also known as heart failure with preserved ejection fraction); renal disease states and/or conditions, including chronic kidney disease, glomerulosclerosis, proteinuric renal disease, hypertensive renal disease and nephropathy.

In embodiments, the present invention relates to compounds and their use in the treatment of disease states and/or conditions which include neurodegenerative and neurological disease states and conditions, including schizophrenia, Alzheimer's, ALS, Parkinson's; fibrotic disease and/or conditions including pulmonary fibrosis, pulmonary hypertension, hypertensive nephropathy, diabetic nephropathy, liver fibrosis, cardiovascular: atherosclerosis, myocardial infarction, stroke, arterial hypertension, coronary artery disease, restenosis after balloon angioplasty, ischemia/reperfusion injury after myocardial or cerebral infarction, hypertrophic cardiomyopathy, heart failure, heart failure associated with aging (in particular diastolic dysfunction, also known as heart failure with preserved ejection fraction); renal disease states and/or conditions, including chronic kidney disease, glomerulosclerosis, proteinuric renal disease, hypertensive renal disease, nephropathy; sensory impairment, including ocular disease, hearing loss; chronic inflammation and autoimmune diseases and/or conditions including diabetes, rheumatoid arthritis and lupus; cancer, especially including renal, lung, prostate and breast cancers among numerous others; infectious diseases, including hepatitis, influenza, HIV, septic shock, among others. In one embodiment, the patient in need thereof is suffering from a disease selected from the group consisting of nephropathy (e.g. membranous nephropathy (MlN), diabetic nephropathy and hypertensive nephropathy), glomerulonephritis (e.g. membranous glomerulonephritis and membranoproliferative glomerulonephritis (MPGN) such as rapidly progressive glomerulonephritis (RPGN)), interstitial nephritis, lupus nephritis, idiopathic nephrotic syndrome (INS) (e.g. minimal change nephrotic syndrome (MCNS) and focal segmental glomerulosclerosis (FSGS)), obstructive uropathy, polycystic kidney disease (e.g. Autosomal Dominant Polycystic Kidney Disease (ADPKD) and Autosomal Recessive Polycystic Kidney Disease (ARPKD)), cardiovascular diseases, hypertension, diabetes, and kidney graft rejection (e.g. acute and chronic kidney rejection). In one embodiment, the present invention is directed to the treatment of renal disease states and/or conditions, including renal injury as described herein.

The present invention also is directed to methods of treating obesity and/or diabetes (I or II) and related disease states and/or conditions such as prediabetes, insulin resistance, retinopathy, neuropathy, nephropathy and cardiovascular diseases (coronary artery disease, angina, myocardial infarction, stroke and atherosclerosis). The present is also directed to methods of treat non-alcoholic fatty liver disease (NALFD) and non-alcoholic hepatosteatosis (NASH) using compounds and/or compositions according to the present invention.

Additional embodiments and aspects of the present invention are provided in the detailed description of the invention which is presented herein below.

BRIEF DESCRIPTION OF THE FIGURES

FIGS. 18 and 19 show exemplary compounds according to the present invention along with relevant biological data, where $K_i$ represents the inhibition constant for competitive binding (as in FIG. 9) and ERE $IC_{50}$ represents the inhibition constant for blocking estrogen-mediated transcription of a GFP reporter (as in FIG. 10).

DETAILED DESCRIPTION OF THE INVENTION

Figure 1:
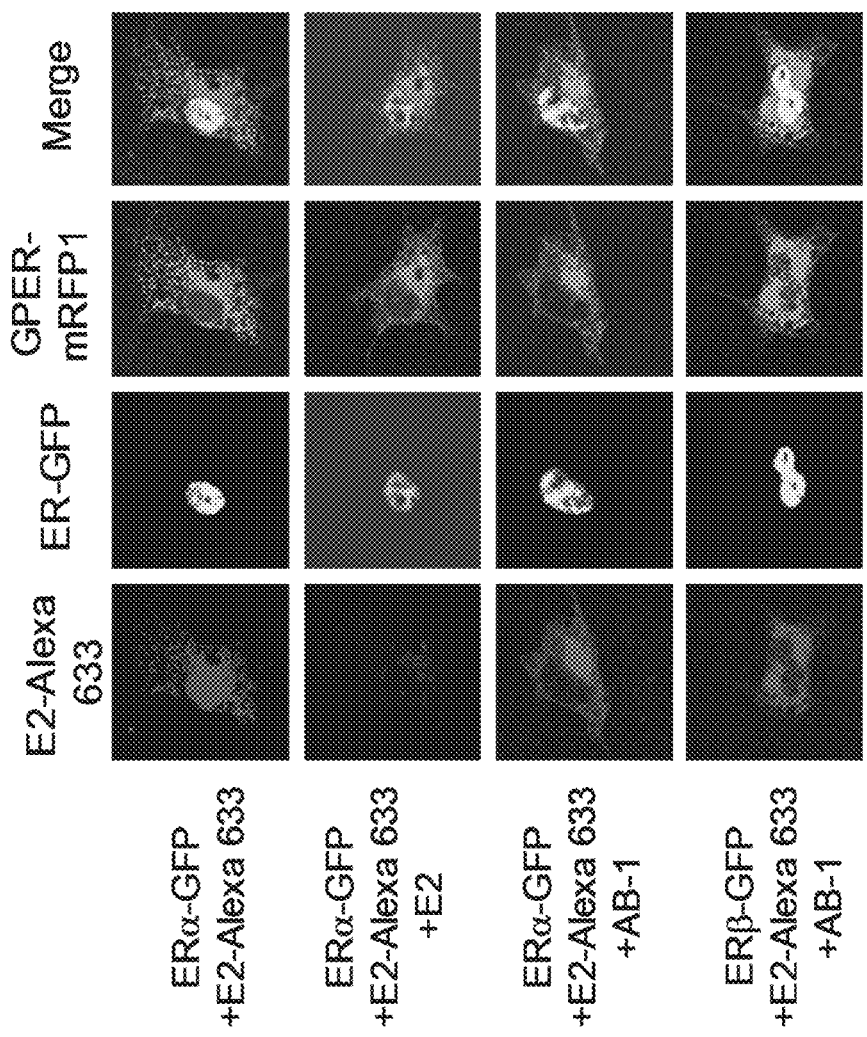
FIG. 1 shows the ligand binding properties of AB-1. COS7 cells co-expressing ERα-GFP or ERβ²-GFP with GPER-mRFP1 were stained with E2-Alexa633 in the presence or absence of unlabeled E2 (100 nM) or AB-1 (1 μM). AB-1 blocks the binding of E2-Alexa633 to ERα and ERβ², but not to GPER.
Figure 2:
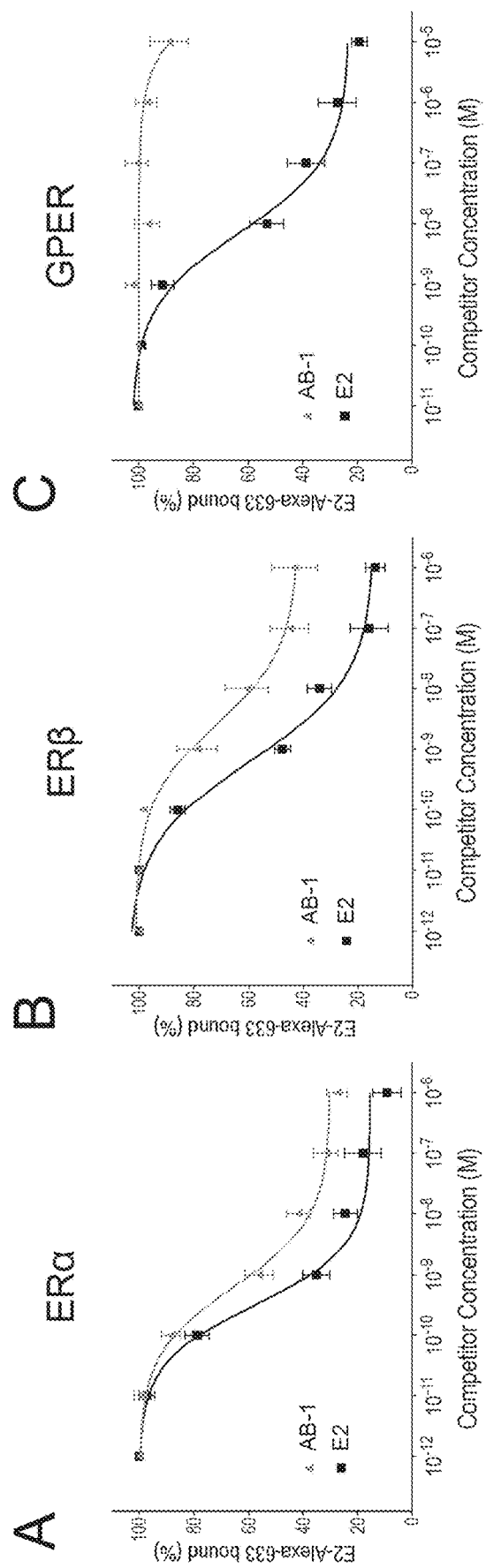
FIG. 2 shows the binding affinities of E2 and AB-1 for ERα, ERβ and GPER. Competitive ligand binding assays were performed using 2 nM E2-Alexa633 and the indicated concentrations of unlabeled E2 (■) or AB-1 (▲) in COS7 cells transfected with either ERα-GFP (A), ERβ-GFP (B) or GPER-GFP (C).
Figure 3:
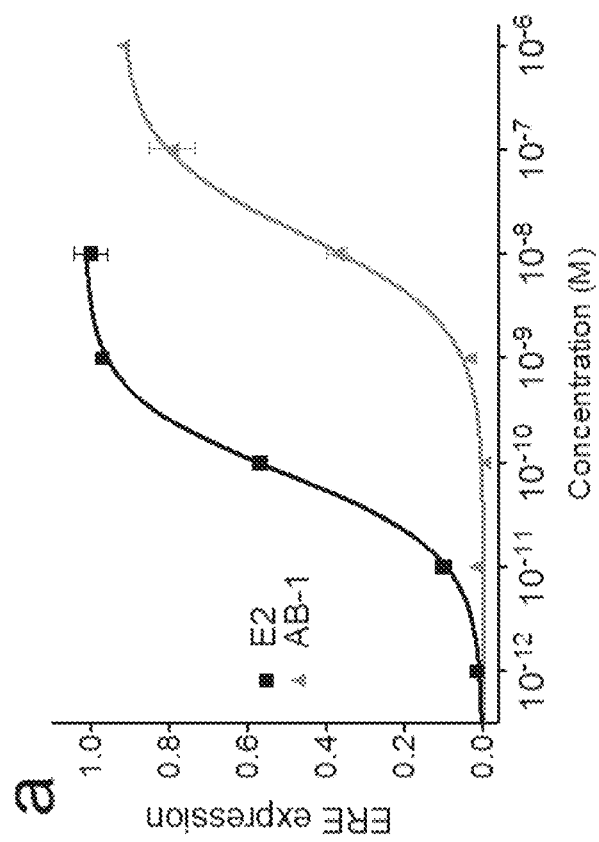
FIG. 3 shows the transcriptional activity of AB-1. Ligand-induced GFP reporter expression in MCF-7 cells stably expressing an ERE-GFP reporter. Cells were stimulated with the indicated concentrations of E2 (■) or AB-1 (▲) and GFP expression was measured by flow cytometry.
Figure 4:
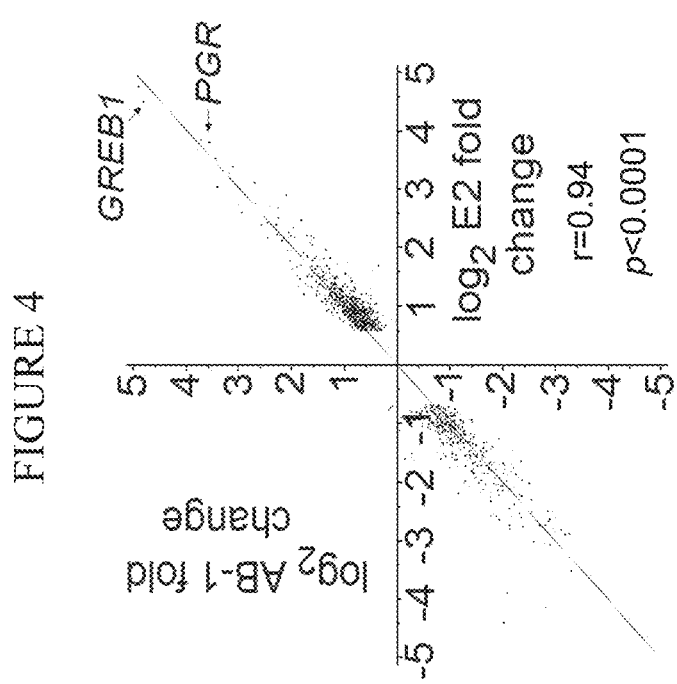
FIG. 4 shows the transcriptional activity of AB-1. Ligand-induced global ER-mediated gene transcription profile. MCF-7 cells were stimulated with 1 nM E2 or 1 μM AB-1 and gene expression was assessed in duplicate. Gene expression changes of 1231 genes (greater than 1.5 fold) are shown as average log 2 fold-change compared to vehicle-treated cells for E2 (x-axis) and AB-1 (y-axis). Expression of GREB1 and PGR are shown with arrows.
Figure 5:
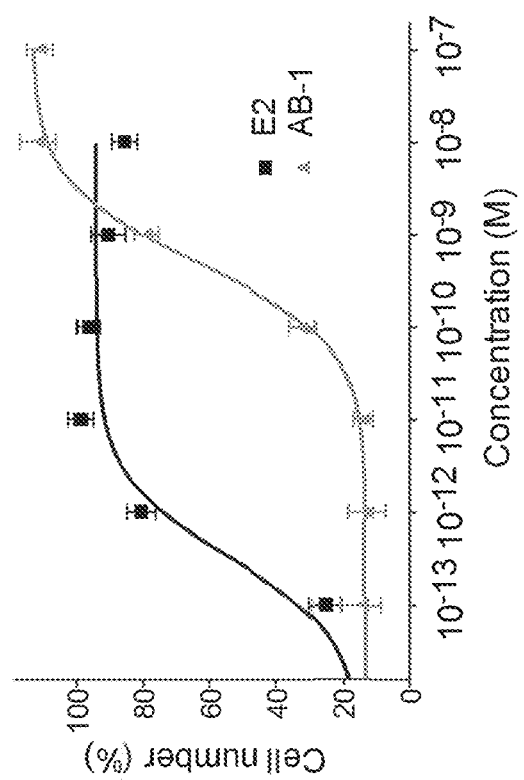
FIG. 5 shows the effect of AB-1 on MCF-7 cell growth. MCF-7 cells were stimulated with the indicated concentrations of E2 (■) or AB-1 (▲) and total cell numbers were determined after 5 days. Cell numbers are shown as percentages relative to E2-treated cells (100%).
Figure 6:
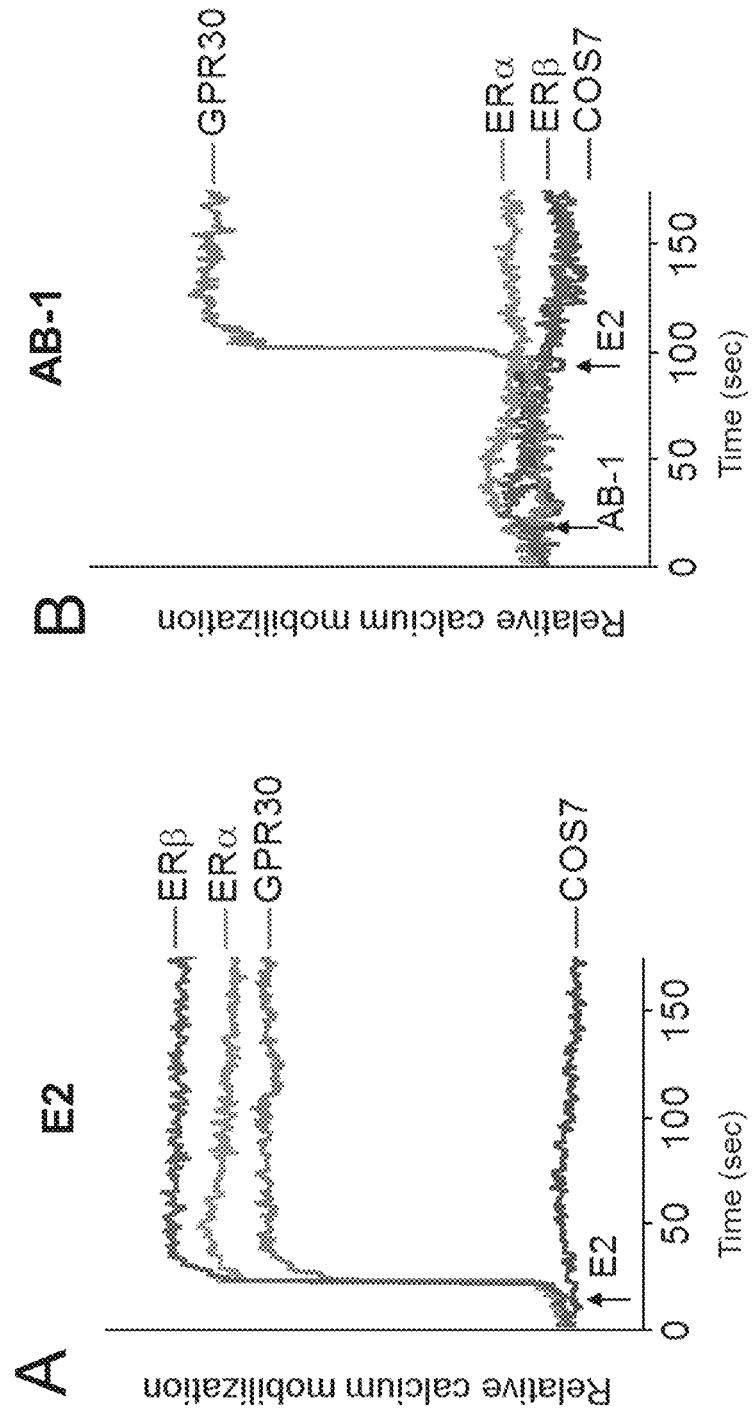
FIG. 6 shows that AB-1 antagonizes classical ER-mediated rapid signaling. Ligand-induced effect on intracellular calcium mobilization through individual ERs. COS7 cells transiently expressing ERα-GFP (red curve), ERβ-GFP (blue curve) or GPER-GFP (green curve) were stimulated with either 1 nM E2 (A) or 1 μM AB-1 followed by 1 nM E2 (B). Intracellular calcium mobilization was evaluated using indol-AM and ligands were added at 20 s or 80 s as indicated. Data is shown as the relative 490 nm/400 nm ratio change (y-axis) compared to mock-transfected COS7 cells (black curve) and re representative of three independent experiments.
Figure 7:
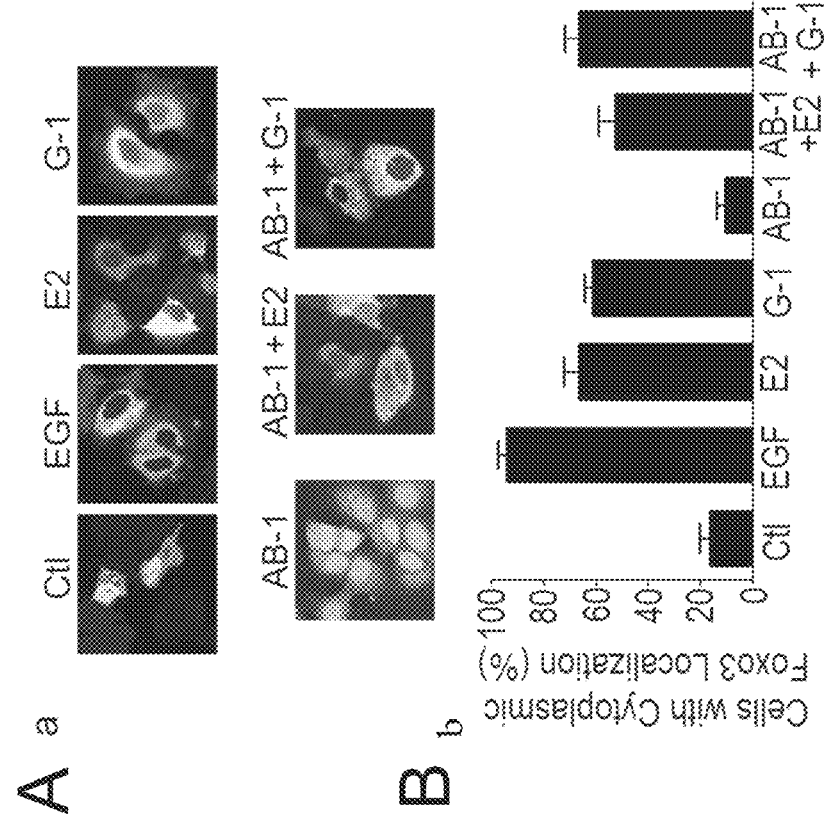
FIG. 7 shows the ligand-induced intracellular translocation of FOXO3a. (A) Intracellular localization of FOXO3a-GFP. MCF-7 cells transiently expressing FOXO3a-GFP were treated with vehicle (Ctl), E2 (10 nM), G-1 (100 nM), AB-1 (1 μM), EGF (50 ng/mL) or a combination of AB-1+E2 or AB-1+G-1 and FOXO3a-GFP localization determined by confocal microscopy. (B) Quantification of data in (A).
Figure 8:
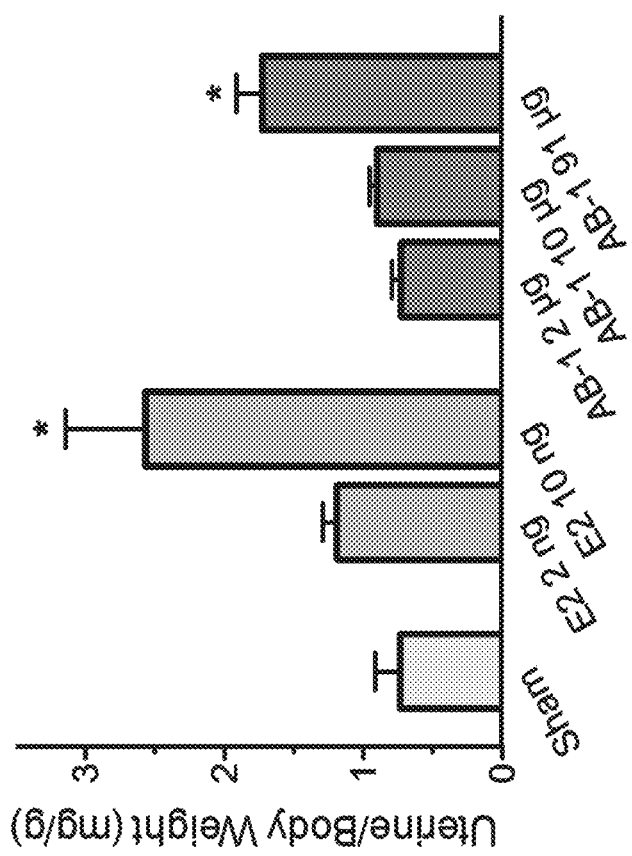
FIG. 8 shows the ligand-induced effect on mouse uterine weight. Ovariectomized mice were treated with vehicle (sham) or the indicated amounts of E2 or AB-1 for 18 h and body weights and uterine wet weights determined. Uterine weights are shown as ratios to total body weights (mean±s.e.m.).
Figure 9:
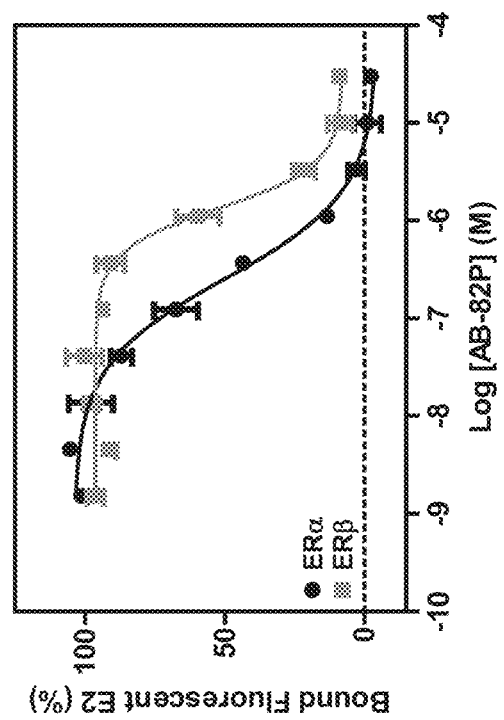
FIG. 9 shows the competition binding curves of AB-82P for ligand binding domain of ERα (•) and ERβ (■). Competitive ligand binding assays were performed using the LanthaScreen TR-FRET Competitive Binding Assay.
Figure 10:
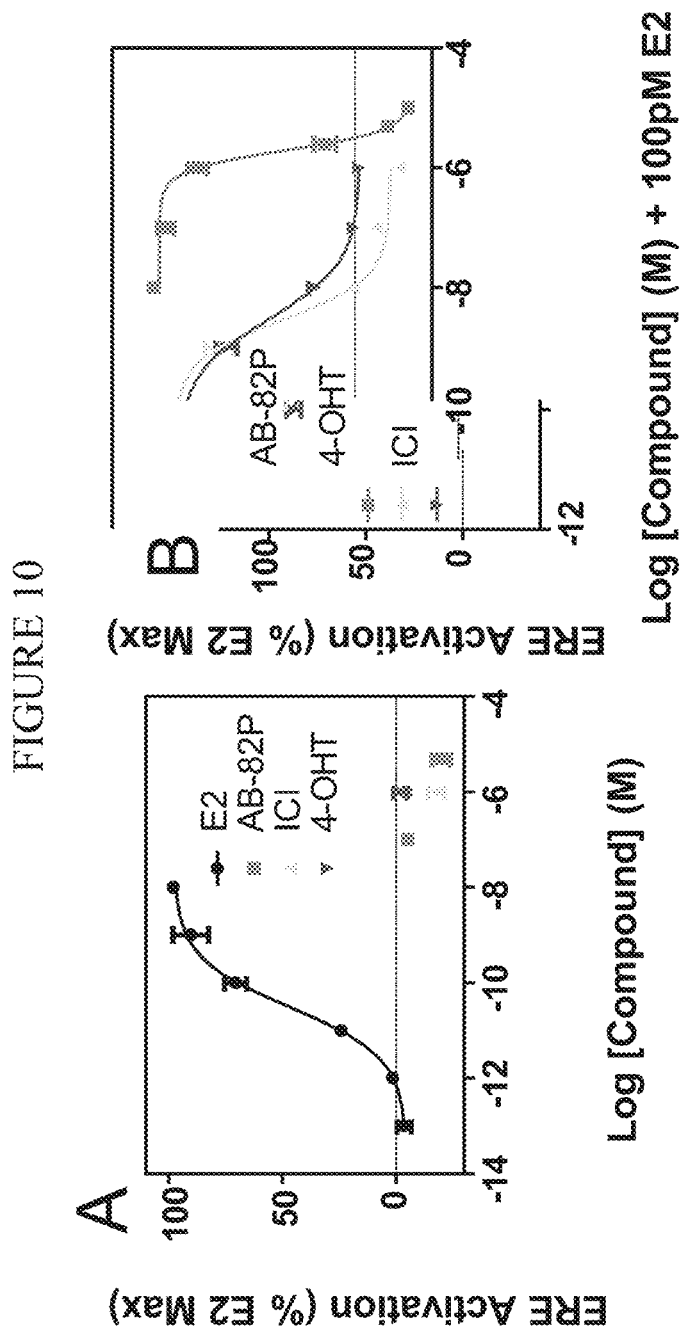
FIG. 10 shows the transcriptional activity of AB-82P. Ligand-induced expression of GFP in MCF-7 cells stably expressing an ERE-GFP reporter. Cells were treated with the indicated concentrations of E2 (•), AB-82P (■), ICI182,780 (▲) or 4-OHT (▼) and in the absence (A) or presence (B) of 100 pM E2 and GFP expression assessed by flow cytometry.
Figure 11:
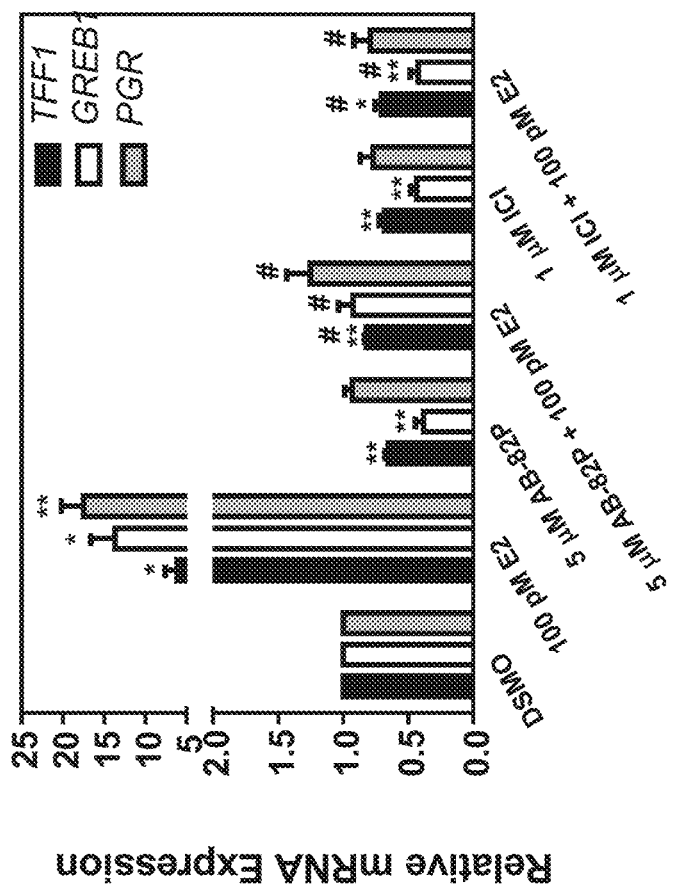
FIG. 11 shows ligand-induced expression of ERα target genes. MCF-7 cells were treated with the indicated compounds and gene expression of TFF1, GREB1 and PGR were determined.
Figure 12:
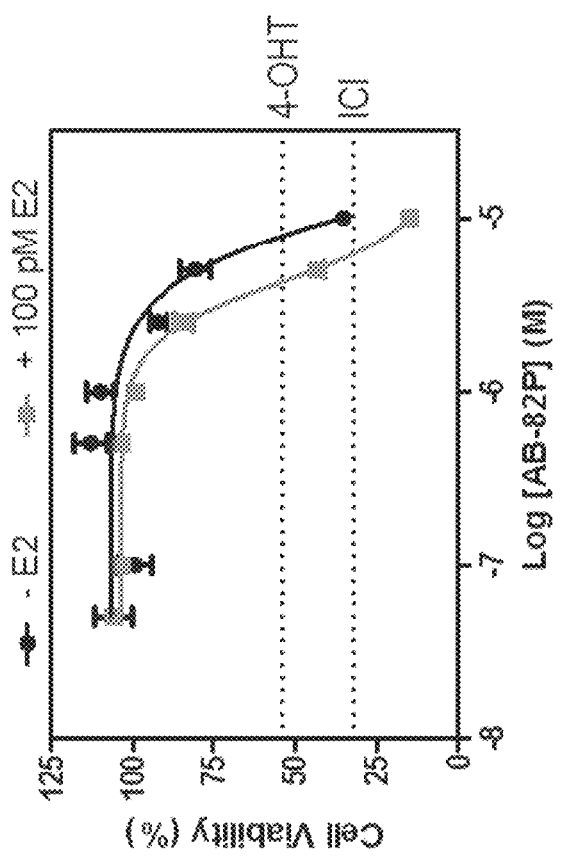
FIG. 12 shows the effect of AB-82P on MCF-7 cell growth. MCF-7 cells were treated with the indicated concentrations of AB-82P in the absence (•) or presence (■) of 100 pM E2. Cell viability was assessed after 5 days and normalized to DMSO-treated cells. Dashed lines indicate inhibitory levels of 1 μM 4-OHT and 1 μM ICI182,780 in the presence of 100 pM E2.
Figure 13:
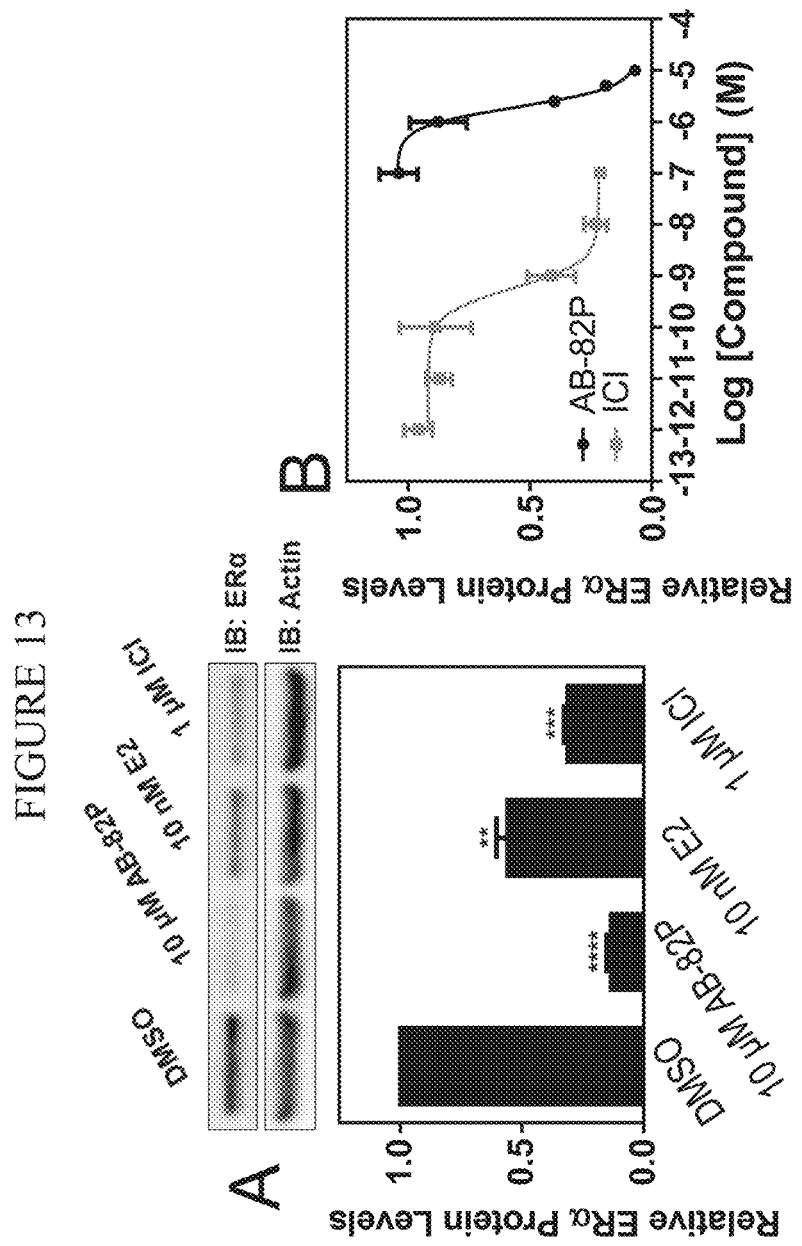
FIG. 13 shows the degradation of ERα. (A) Ligand-induced degradation of ERα. MCF-7 were treated with the indicated compounds and ERα protein levels were assessed by Western blot (top panel). Actin served as a loading control (bottom panel). Quantification of the western blot is shown on the right. (B) Dose-dependent degradation of ERα in MCF-7 cells treated with the indicated concentrations of AB-82P or ICI with ERα protein levels assessed by Western blot.
Figure 14:
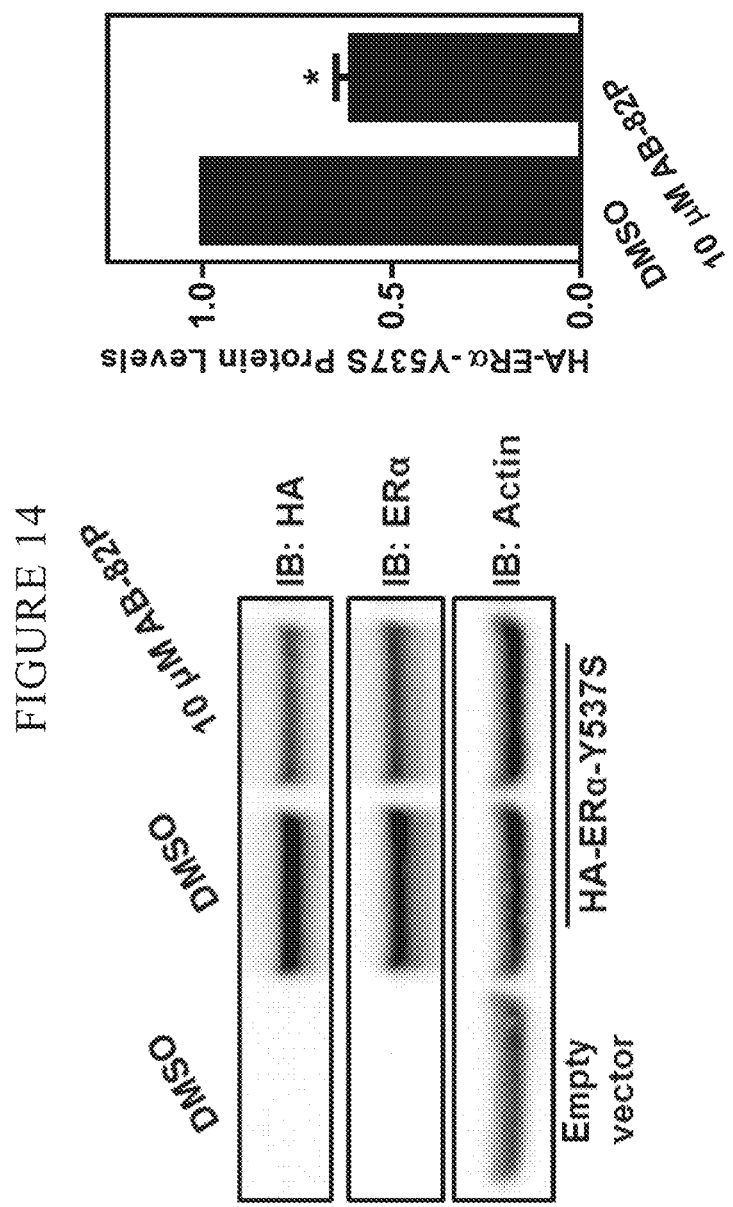
FIG. 14 shows AB-82P-induced degradation of ERα-Y537S (Addgene plasmid #49499), a model of endocrine resistance. HEK293 cells transfected with the HA-ERα-Y537S mutant were stimulated with the indicated compounds and HA-ERα-Y537S protein levels assessed by Western blot (left) and quantitated relative to actin (right).
Figure 15:
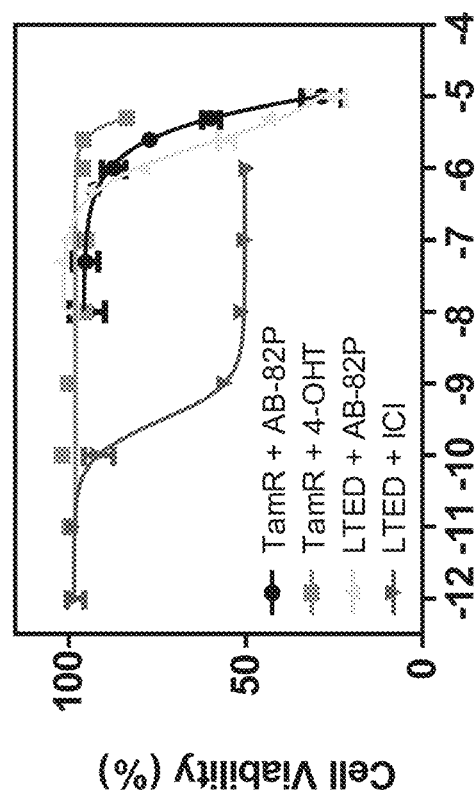
FIG. 15 shows the inhibitory effects of AB-82P in cell line models of endocrine resistance. Tamoxifen-resistant MCF-7 cells (TamR; •, □) and long-term estrogen-deprived MCF-7 cells (LTED; ▲, ▼) were treated with the indicated concentrations of AB-82P (•, ▲), 4-OHT (for TamR MCF-7 cells, ■) or ICI182,780 (for LTED MCF-7 cells, ▼) and cell viability assessed after 5 days, being normalized to DMSO-treated cells. Cells were a gift from Dr. Donald McDonnell (Duke University).

The following terms shall be used throughout the specification to describe the present invention. A term which is otherwise not defined has the same meaning as one of ordinary skill within the context of the use of that term would assign to the term. Note that all terms are used in context to avoid overlap and redundancy where applicable.

As used herein, the term "comprising" or "comprises" is intended to mean that the compositions and methods include the recited elements, but not excluding others. "Consisting essentially of" when used to define compositions and methods, shall mean excluding other elements of essential significance to the combination for the stated purpose, i.e., elements that would materially change the basic and novel characteristics of the combination. Thus, a composition consists essentially of the elements as defined herein would not exclude other materials or steps that do not materially affect the basic and novel characteristic(s) of the claimed invention. "Consisting of" shall mean excluding more than trace elements of other ingredients and substantial method steps. Embodiments defined by each of these transition terms are part of the present invention.

The term "optionally substituted" is used to describe any one or more groups or moieties which may be (or may not be) substituted on a group or moiety as set forth or identified herein. Thus, for example, the term "optionally substituted with up to three halogen groups and 1 or 2 hydroxyl groups" means that a moiety may be optionally substituted with one or more of the aforementioned halogen groups and optionally substituted with 1 or 2 hydroxyl groups, such that the moiety may have 1 or up to 5 substituents.

The term "patient" or "subject" refers to a mammal, preferably a human, in need of treatment or therapy to which compounds according to the present invention are administered in order to treat a condition or disease state modulated through the binding of a compound according to the present invention with a receptor, often estrogen receptor alpha (ERα) and/or (ERβ), among other targets.

The term "modulate" means, with respect to disease states or conditions modulated through selective binding of a compound according to the present invention to estrogen receptor alpha (ERα) and/or estrogen receptor beta (ERβ) to the (relative) exclusion of GPR30/GPER, among other sites of activity, to produce, either directly or indirectly, an improvement or lessening of a condition or disease state which was, prior to administration of a compound according to the present invention, sub-optimal and in many cases, debilitating and even life threatening. Modulation may occur by virtue of agonist activity, antagonist activity or mixed agonist/antagonist activity (depending on the receptor site).

The term "compound", as used herein, unless otherwise indicated, refers to any specific chemical compound disclosed herein and includes in context, tautomers, regioisomers (especially cis/trans), geometric isomers, and where applicable, optical isomers thereof, as well as pharmaceutically acceptable salts, solvates and polymorphs thereof.

Within its use in context, the term compound generally refers to a single compound, but also may include other compounds such as stereoisomers, regioisomers, diastereomers and/or optical isomers (including in some instances, racemic mixtures) as well as specific enantiomers or enantiomerically enriched mixtures of disclosed compounds. The compounds of this invention include all stereoisomers where relevant (e.g., cis and trans isomers) and all optical isomers of the present compounds (eg., R and S enantiomers), as well as racemic, diastereomeric and/or other mixtures of such isomers, as well as all pharmaceutically acceptable salt forms, solvates, polymorphs and prodrug forms of the present compounds, where applicable.

The term "effective" is used herein, unless otherwise indicated, to describe an amount of a compound, composition or component which, when used within the context of its use, produces or effects an intended result, whether that result relates to the prophylaxis and/or therapy of a disease state, especially including cancer or as otherwise described herein. The term effective subsumes all other effective amount or effective concentration terms (including the term "therapeutically effective") which are otherwise described or used in the present application. In embodiments, the administration of at least one compound according to the present invention and at least one additional anticancer agent or a mixture thereof produces a synergistic anticancer effect in the patient. The term "synergistic" is used to describe an effect which is greater than an expected additive effect which occurs from the co-administration of two or more compounds according to the present invention or one or more compounds according to the present invention in combination with at least one additional anti-cancer agent as otherwise described herein.

The terms "ERalpha" and "ERbeta" are used to describe estrogen receptors alpha (ERα) and beta (ERP) which are nuclear transcription factors involved in the regulation of many complex biological processes in humans. Modulation of these receptors by therapeutic agents find use for the prevention and/or treating of a number of disease states and/or conditions including cancer, metabolic and cardiovascular diseases, neurodegeneration, inflammation, and osteoporosis, among others as described in detail herein. The physiological functions of estrogenic compounds are modulated largely by these receptors. These receptors exhibit action in the cell nucleus, regulating transcription of specific target genes by binding to associated DNA regulatory sequences. In humans, both receptor subtypes are expressed in many cells and tissues, and they control key physiological functions in various organ systems, such as reproductive, skeletal, cardiovascular and central nervous systems, as well as in specific tissues (such as breast and sub-compartments of prostate and ovary). ERα is present mainly in mammary gland, uterus, ovary (thecal cells), bone, male reproductive organs (testes and epididymis), prostate (stroma), liver, and adipose tissue. By contrast, ERβ is found mainly in the prostate (epithelium), bladder, ovary (granulosa cells), colon, adipose tissue, and immune system. Both subtypes are markedly expressed in the cardiovascular and central nervous systems. There are some common physiological roles for the two ERs, such as in the development and function of the ovaries, and in the protection of the cardiovascular system. The alpha subtype has a more prominent role on the mammary gland and uterus, as well as on the preservation of skeletal homeostasis and the regulation of metabolism. The beta subtype seems to have a more profound effect on the central nervous and immune systems, and it generally counteracts the ERα-promoted cell hyperproliferation in tissues such as breast and uterus.

The term "disease and/or condition mediated through ERalpha and/or ERbeta" refers to a disease state and/or condition where ERalpha and/or ERbeta plays a significant role in the etiology and/or physiology of a disease state and/or condition. Diseases that are mediated through one or more of these receptors include cancer (including especially breast, reproductive and other hormone-dependent cancers, leukemia, colon cancer, prostate cancer), reproductive (genito-urological) including endometritis, prostatitis, polycystic ovarian syndrome, bladder control, hormone-related disorders, hearing disorders, cardiovascular conditions including hot flashes and profuse sweating, hypertension, stroke, obesity, osteoporosis, hematologic diseases, vascular diseases or conditions such as venous thrombosis, atherosclerosis, among numerous others and disorders of the central and peripheral nervous system, including depression, insomnia, anxiety, neuropathy, multiple sclerosis, neurodegenerative disorders such as Parkinson's disease and Alzheimer's disease, as well as inflammatory bowel disease, Crohn's disease, coeliac (celiac) disease and related disorders of the intestine. Compounds according to the present invention may also be used as contraceptive agents to prevent or decrease the likelihood that a woman will become pregnant as a consequence of intercourse.

Additional disease states and/or conditions which may be treated using compounds and/or compositions according to the present include for example, include cancer (particularly breast, reproductive and other hormone-dependent cancers, leukemia, colon cancer, prostate cancer), reproductive (genito-urological) including endometritis, prostatitis, polycystic ovarian syndrome, bladder control, hormone-related disorders, hearing disorders, cardiovascular conditions including hot flashes and profuse sweating, hypertension, stroke, obesity, osteoporosis, hematologic diseases, vascular diseases or conditions such as venous thrombosis, atherosclerosis, among numerous others and disorders of the central and peripheral nervous system, including depression, insomnia, anxiety, neuropathy, multiple sclerosis, neurodegenerative disorders such as Parkinson's disease and Alzheimer's disease, as well as inflammatory bowel disease, Crohn's disease, coeliac (celiac) disease and related disorders of the intestine, fibrotic disease and/or conditions including pulmonary fibrosis, pulmonary hypertension, nephropathy (e.g. membranous nephropathy (MN), diabetic nephropathy and hypertensive nephropathy), glomerulonephritis (e.g. membranous glomerulonephritis and membranoproliferative glomerulonephritis (MPGN) such as rapidly progressive glomerulonephritis (RPGN)), interstitial nephritis, lupus nephritis, idiopathic nephrotic syndrome (INS) (e.g. minimal change nephrotic syndrome (MCNS) and focal segmental glomerulosclerosis (FSGS)), obstructive uropathy, polycystic kidney disease (e.g.

Autosomal Dominant Polycystic Kidney Disease (ADPKD) and Autosomal Recessive Polycystic Kidney Disease (ARPKD)), liver fibrosis; cardiovascular: atherosclerosis, myocardial infarction, stroke, arterial hypertension, coronary artery disease, restenosis after balloon angioplasty, ischemia/reperfusion injury after myocardial or cerebral infarction, hypertrophic cardiomyopathy, heart failure, heart failure associated with aging (in particular diastolic dysfunction, also known as heart failure with preserved ejection fraction); renal disease states and/or conditions, including chronic kidney disease, glomerulosclerosis, proteinuric renal disease, hypertensive renal disease and nephropathy.

In embodiments, the present invention relates to compounds and/or compositions and their use in the treatment of a disease state and/or condition including neurodegenerative and neurological disease states and conditions, including schizophrenia, Alzheimer's, ALS, Parkinson's; fibrotic disease and/or conditions including pulmonary fibrosis, pulmonary hypertension, hypertensive nephropathy, diabetic nephropathy, liver fibrosis; cardiovascular: atherosclerosis, myocardial infarction, stroke, arterial hypertension, coronary artery disease, restenosis after balloon angioplasty, ischemia/reperfusion injury after myocardial or cerebral infarction, hypertrophic cardiomyopathy, heart failure, heart failure associated with aging (in particular diastolic dysfunction, also known as heart failure with preserved ejection fraction); renal disease states and/or conditions, including chronic kidney disease, glomerulosclerosis, proteinuric renal disease, hypertensive renal disease, nephropathy; sensory impairment, including ocular disease, hearing loss; chronic inflammation and autoimmune diseases and/or conditions including diabetes, rheumatoid arthritis and lupus; cancer, especially including renal, lung, prostate and breast cancers among numerous others; infectious diseases, including hepatitis, influenza, HIV, septic shock, among others. In one embodiment, the patient in need thereof is suffering from a disease selected from the group consisting of nephropathy (e.g. membranous nephropathy (MN), diabetic nephropathy and hypertensive nephropathy), glomerulonephritis (e.g. membranous glomerulonephritis and membranoproliferative glomerulonephritis (MPGN) such as rapidly progressive glomerulonephritis (RPGN)), interstitial nephritis, lupus nephritis, idiopathic nephrotic syndrome (INS) (e.g. minimal change nephrotic syndrome (MCNS) and focal segmental glomerulosclerosis (FSGS)), obstructive uropathy, polycystic kidney disease (e.g. Autosomal Dominant Polycystic Kidney Disease (ADPKD) and Autosomal Recessive Polycystic Kidney Disease (ARPKD)), cardiovascular diseases, hypertension, diabetes, and kidney graft rejection (e.g. acute and chronic kidney rejection). In one embodiment, the present invention is directed to the treatment of renal disease states and/or conditions, including renal injury as described herein.

The present invention also is directed to methods of treating obesity and/or diabetes (I or II) and related disease states and/or conditions such as prediabetes, insulin resistance, metabolic syndrome, retinopathy, neuropathy, nephropathy and cardiovascular diseases (coronary artery disease, angina, myocardial infarction, stroke and atherosclerosis). The present is also directed to methods of treat non-alcoholic fatty liver disease (NALFD) and non-alcoholic hepatosteatosis (NASH) using compounds and/or compositions according to the present invention.

The term "independently" is used herein to indicate that the variable, which is independently applied, varies independently from application to application.

The term "non-existent" or "absent" refers to the fact that a substituent is absent and the group to which such substituent is attached forms an additional bond with an adjacent atom or group.

The term "optionally substituted" means optional substitution with the specified groups, radicals or moieties. It should be noted that any atom with unsatisfied valences in the text, schemes, examples and tables herein is assumed to have the hydrogen atom(s) to satisfy the valences.

The term "modulate" means, with respect to disease states or conditions modulated through binding of a compound according to the present invention to estrogen receptor alpha (ERα) and/or estrogen receptor beta (ERβ) or alternatively to Nox (NADPH) expression modulation to produce, either directly or indirectly, an improvement or lessening of a condition or disease state which was, prior to administration of a compound according to the present invention, suboptimal and in many cases, debilitating and even life threatening.

Modulation may occur by virtue of agonist activity, antagonist activity or mixed agonist/antagonist activity (depending on the receptor site) of the compound used.

The term "cancer" includes any cancer of any origin and is used to describe all cancerous disease states and embraces or encompasses the pathological process associated with malignant hematogenous, ascitic, and solid tumors. The term "cancer" and the term "tumor" used in this application is interchangeable with the term "neoplasia". The term "cancer" shall refer to a proliferation of tumor cells having the unique trait of loss of normal controls, resulting in unregulated growth, lack of differentiation, local tissue invasion, and/or metastasis. Examples of cancers from which the compounds of the present invention may be used to treat include, without limitation, a hematologic cancer, a carcinoma, a sarcoma, a lymphoma, a melanoma, a myeloproliferative disease, a tumor of the central nervous system, a blastoma and a germ cell cancer. More specifically, these cancers include for example, carcinomas (e.g., squamous-cell carcinomas, basal cell carcinomas, adenocarcinomas, hepatocellular carcinomas, and renal cell carcinomas) and carcinomas of the bladder, bone, bowel, breast, cervix, colon (colorectal), esophagus, head, kidney, liver, lung, nasopharyngeal, neck, ovary, pancreas, prostate, and stomach; hematologic cancers, including leukemias, such as acute myelogenous leukemia, acute lymphocytic leukemia, acute promyelocytic leukemia (APL), acute T-cell lymphoblastic leukemia, adult T-cell leukemia, basophilic leukemia, eosinophilic leukemia, granulocytic leukemia, hairy cell leukemia, leukopenic leukemia, lymphatic leukemia, lymphoblastic leukemia, lymphocytic leukemia, megakaryocytic leukemia, micromyeloblastic leukemia, monocytic leukemia, neutrophilic leukemia and stem cell leukemia; benign and malignant lymphomas, particularly Burkitt's lymphoma, Non-Hodgkin's lymphoma and B-cell lymphoma; benign and malignant melanomas; myeloproliferative diseases; sarcomas, particularly Ewing's sarcoma, hemangiosarcoma, Kaposi's sarcoma, liposarcoma, myosarcomas, peripheral neuroepithelioma, and synovial sarcoma; blastomas, including glioblastoma and medulloblastoma (brain tumors), hepatoblastoma (liver tumor), nephroblastoma (kidney tumor), neuroblastoma (neural tumor), osteoblastoma (bone tumor) and retinoblastoma (retinal tumor in the eye), tumors of the central nervous system (e.g., gliomas, astrocytomas, oligodendrogliomas, ependymomas, glioblastomas, neuroblastomas, ganglioneuromas, gangliogliomas, medulloblastomas, pineal cell tumors, meningiomas, meningeal sarcomas, neurofibromas, and Schwannomas); germline (germ cell) tumors (e.g., bowel cancer, breast cancer, prostate cancer, cervical cancer, uterine cancer, lung cancer (e.g., small cell lung cancer, mixed small cell and non-small cell cancer, pleural mesothelioma, including metastatic pleural mesothelioma small cell lung cancer and non-small cell lung cancer), ovarian cancer, testicular cancer, thyroid cancer, astrocytoma, esophageal cancer, pancreatic cancer, stomach cancer, liver cancer, colon cancer, and melanoma); mixed types of neoplasias, particularly carcinosarcoma and Hodgkin's disease; and tumors of mixed origin, such as Wilms' tumor and teratocarcinomas. In certain embodiments, the cancer that is treated is ovarian cancer, breast cancer, lung cancer or colon cancer. In embodiments, the cancer is naïve, chemotherapy drug resistant, including multiple drug resistant, metastatic and recurrent, and may include cancer stem cells. In embodiments, the compounds according to the present invention are effective to treat recurrent cancers and/or metastatic cancers and to inhibit and/or reduce the likelihood that a cancer stem cell will grow and elaborate into a more advanced form of cancer.

Particular cancers which may be treated using compounds according to the present invention include, for example, In certain embodiments, treatment is directed to cancers of the stomach, colon, rectal, liver, pancreatic, lung, breast, cervix uteri, corpus uteri, ovary, prostate, testis, bladder, renal, brain/CNS, head and neck, throat, Hodgkin's disease, non-Hodgkin's lymphoma, multiple myeloma, melanoma, acute leukemia, including lymphocytic leukemia, hairy cell leukemia, and acute myelogenous leukemia, Ewing's sarcoma, small cell lung cancer, choriocarcinoma, rhabdomyosarcoma, Wilms' Tumor, neuroblastoma, mouth/pharynx, oesophagus, larynx, kidney, lymphoma, among others, and in particular, breast, reproductive, ovarian, cervical, uterine, endometrial and other hormone-dependent cancers. Drug-resistant cancers are also treatable using compounds according to the present invention and represent a preferred embodiment of the present invention.

In addition to the treatment of principally ectopic cancers as described above, the present invention also may be used preferably to treat eutopic cancers such as choriocarcinoma, testicular choriocarcinoma, non-seminomatous germ cell testicular cancer, placental cancer (trophoblastic tumor) and embryonal cancer, among others, especially including cancers where estrogen receptors alpha and beta (ERalpha and ERbeta) are highly expressed to the exclusion of GPER/GPR30.

The term "additional anti-cancer agent" is used to describe an additional compound which may be coadministered with one or more compounds according to the present invention as described herein in the treatment of cancer. Such additional agents include, for example, everolimus, trabectedin, abraxane, TLK 286, AV-299, DN-101, pazopanib, GSK690693, RTA 744, ON 0910.Na, AZD 6244 (ARRY-142886) AMN-107, TKI-258, GSK461364, AD 1152, enzastaurnin, vandetanib, ARQ-197, MK-0457, MLN8054, PHA-739358, R-763, AT-9263, a FLT-3 inhibitor, a VEGFR inhibitor, an EGFR TK inhibitor, an aurora kinase inhibitor, a PIK-1 modulator, a Bel-2 inhibitor, an HDAC inhibitor, a c-MET inhibitor, a PARP inhibitor, a Cdk inhibitor, an EGFR TK inhibitor, an IGFR-TK inhibitor, an anti-HGF antibody, a PI3 kinase inhibitors, an AKT inhibitor, a JAK/STAT inhibitor, a checkpoint-1 or 2 inhibitor, a focal adhesion kinase inhibitor, a Map kinase kinase (mek) inhibitor, a VEGF trap antibody, a DNA damaging agent, an agent selected from the group consisting of pemetrexed, erlotinib, dasatanib, nilotinib, decatanib, panitumumab, amrubicin, oregovomab, Lep-etu, nolatrexed, azd2171, batabulin, ofatumumab, zanolimumab, edotecarin, tetrandrine, rubitecan, tesmilifene, oblimersen, ticilimumab, ipilimumab, gossypol, Bio 111, 131-I-TM-601, ALT-110, BIO 140, CC 8490, cilengitide, gimatecan, ILI13-PE38QQR, INO 1001, IPdR$_1$ KRX-0402, lucanthone. LY 317615, neuradiab, vitespan, Rta 744, Sdx 102, talampanel, atrasentan, Xr 311, romidepsin, ADS-100380, sunitinib, 5-fluorouracil, vorinostat, etoposide, gemcitabine, doxorubicin, irinotecan, liposomal doxorubicin, 5'-deoxy-5-fluorouridine, vineristine, temozolomide, ZK-304709, seliciclib PD0325901 AZD-6244, capecitabine, L-Glutamic acid N-[4-[2-(2-amino-4,7-dihydro-4-oxo-1H-pyrrolo[2,3-d]pyrimidin-5-yl)ethyl]benzoyl]-, disodium salt, heptahydrate, camptothecin, PEG-labeled irinotecan, tamoxifen, toremifene citrate, anastrazole, exemestane, letrozole, DES(diethylstilbestrol), estradiol, estrogen, conjugated estrogen, bevacizumab, IMC-IC11, CHIR-258); 3-[5-(methylsulfonylpiperadinemethyl)-indolylj-quinolone, vatalanib, AG-013736, AVE-0005, the acetate salt of [D-Ser(But) 6, Azgly 10](pro-Glu-His-Trp-Ser-Tyr-D-Ser(But)-Leu-Arg-Pro-Azgly-NH$_2$ acetate [C$_{59}$H$_{84}$N$_{18}$Oi$_4$-(C$_2$H$_4$O$_2$)$_X$ where x=1 to 2.4], goserelin acetate, leuprolide acetate, triptorelin pamoate, medroxyprogesterone acetate, hydroxyprogesterone caproate, Megestrol acetate, raloxifene, bicalutamide, flutamide, nilutamide, megestrol acetate, CP-724714; TAK-165, HKI-272, erlotinib, lapatanib, canertinib, ABX-EGF antibody, erbitux, EKB-569, PKI-166, GW-572016, lonafarnib, BMS-214662, tipifarnib; amifostine. NVP-LAQ824, suberoyl analide hydroxamic acid, valproic acid, trichostatin A. FK-228, SU11248, sorafenib, KRN951, aminoglutethimide, amsacrine, anagrelide, L-asparaginase, *Bacillis* Calnmette-Guerin (BCG) vaccine, bleomycin, buserelin, busulfan carboplatin, carmustine, chlorambucil, cisplatin cladribine, clodronate, cyproterone, cytarabine, dacarbazine, dactinomycin, daunorubicin, diethylstilbestrol, epirubicin, fludarabine, fludrocortisone, fluoxymesterone, flutamide, gemcitabine, gleevac, hydroxyurea, idarubicin, ifosfamide, imatinib, leuprolide, levamisole, lomustine, mechlorethamine, melphalan, 6-mercaptopurine, mesna, methotrexate, mitomycin, mitotane, mitoxantrone, nilutamide, octreotide, oxaliplatin, pamidronate, pentostatin, plicamycin, porfimer, procarbazine, raltitrexed, rituximab, streptozocin, teniposide, testosterone, thalidomide, thioguanine, thiotepa, tretinoin, vindesine, 13-cis-retinoic acid, phenylalanine mustard, uracil mustard, estramustine, altretamine, floxuridine, 5-deooxyuridine, cytosine arabinoside, 6-mecaptopurine, deoxycoformycin, calcitriol, valrubicin, mithramycin, vinblastine, vinorelbine, topotecan, razoxin, marimastat, COL-3, neovastat, BMS-275291, squalamine, endostatin, SU5416, SU6668, EMD121974, interleukin 12, IM862, angiostatin, vitaxin, droloxifene, idoxyfene, spironolactone, finasteride, cimitidine, trastuzumab, denileukin diftitox, gefitinib, bortezimib, paclitaxel, irinotecan, topotecan, doxorubicin, docetaxel, vinorelbine, bevacizumab (monoclonal antibody) and erbitux, cremophor-free paclitaxel, epithilone B, BMS-247550, BMS-310705, droloxifene, 4-hydroxytamoxifen, pipendoxifene, ERA-923, arzoxifene, fulvestrant, acolbifene, lasofoxifene, idoxifene, TSE-424, HMR-3339, ZK186619, PTK787/ZK 222584, VX-745, PD 184352, rapamycin, 40-O-(2-hydroxyethyl)-rapamycin, temsirolimus, AP-23573, RAD001, ABT-578, BC-210, LY294002, LY292223, LY292696, LY293684, LY293646, wortmannin, ZM336372, L-779,450, PEG-filgrastim, darbepoetin, erythropoietin, granulocyte colony-stimulating factor, zolendronate, prednisone, cetuximab, granulocyte macrophage colony-stimulating factor, histrelin, pegylated interferon alfa-2a, interferon alfa-2a, pegylated interferon alfa-2b, interferon alfa-2b, azacitidine, PEG-L-asparaginase, lenalidomide, gemtuzumab, hydrocortisone, interleukin-11, dexrazoxane, alemtuzumab, all-transretinoic acid, ketoconazole, interleukin-2, megestrol, immune globulin, nitrogen mustard, methylprednisolone, ibritgumomab tiuxetan, androgens, decitabine, hexamethylmelamine, bexarotene, tositumomab, arsenic trioxide, cortisone, editronate, mitotane, cyclosporine, liposomal daunorubicin, Edwina-asparaginase, strontium 89, casopitant, netupitant, an NK-1 receptor antagonists, palonosetron, aprepitant, diphenhydramine, hydroxyzine, metoclopramide, lorazepam, alprazolam, haloperidol, droperidol, dronabinol, dexamethasone, methylprednisolone, prochlorperazine, granisetron, ondansetron, dolasetron, tropisetron, pegfilgrastim, erythropoietin, epoetin alfa, darbepoetin alfa, ipilumumab, vemurafenib among others among others, including immunotherapy agents such as IDO inhibitors (an inhibitor of indoleamine 2,3-dioxygenase (IDO) pathway) such as Indoximod (NLG-8187), Navoximod (GDC-0919) and NLG802, PDL1 inhibitors (an inhibitor of programmed death-ligand 1) including, for example, nivolumab, durvalumab and atezolizumab, PD1 inhibitors such as pembrolizumab (Merck) and CTLA-4 inhibitors (an inhibitor of cytotoxic T-lymphocyte associated protein 4/cluster of differentiation 152), including ipilimumab and tremelimumab, and mixtures thereof among others.

The term "coadministration" or "combination therapy" is used to describe a therapy in which at least two active compounds in effective amounts are used to treat cancer or another disease state or condition as otherwise described herein at the same time. Although the term coadministration preferably includes the administration of two active compounds to the patient at the same time, it is not necessary that the compounds be administered to the patient at the same time, although effective amounts of the individual compounds will be present in the patient at the same time. Compounds according to the present invention may be administered with one or more anti-cancer agent, including antimetabolites, alkylating agents, topoisomerase I and topoisomerase II inhibitors as well as microtubule inhibitors, among others. Anticancer compounds for use in the present invention include those described above, and mixtures thereof, among others. Coadministration of one of the present compounds with another anticancer agent as otherwise described herein will often result in a synergistic enhancement of the anticancer activity of the other anticancer agent, an unexpected result. One or more of the present compounds may also be coadministered with another bioactive agent (e.g., antiviral agent, antihyperproliferative disease agent, agents which treat chronic inflammatory disease, among others or as otherwise described herein), depending upon the desired therapeutic outcome and the disease state or condition treated.

The term "reproductive disorder" or "genito-uriological disorder" is used to describe diseases or conditions of the genital or urinary tract and include such conditions as benign prostatic hyperplasia, prostatitis, infertility, polycystic ovarian syndrome, sexual dysfunction, endometreitis, vaginal dryness, dyspareunia, as well as kidney and urinary complications, including bladder control, among others. Note that compounds/compositions according to the present invention also may be useful as contraceptive agents, i.e., agents which prevent or reduce the likelihood that a female will become pregnant after intercourse.

The term "hematologic disorder" is used to describe a disease or condition of blood and includes such diseases or conditions as lymphoproliferative disorders (diseases of white blood cells called T cells and B cells); myeloproliferative disorders (diseases in which too many of certain types of blood cells are made in the bone marrow); and includes four other blood disorders-eosinophilia, histiocytosis, paroxysmal nocturnal hemoglobinuria, and systemic mastocytosis, among others. Hematologic disorders are distinguishable from leukemia, which is also treated using compounds according to the present invention.

The treatment of cancer, including malignant tumors comprising administering to a patient an anti-cancer effective amount of one or more these agents is a preferred embodiment of the present invention.

The term "independently" is used herein to indicate that the variable, which is independently applied, varies independently from application to application.

The term "non-existent" or "absent" refers to the fact that a substituent is absent and the group to which such substituent is attached forms an additional bond with an adjacent atom or group.

The term "unsubstituted" shall mean substituted only with hydrogen atoms. The term "substituted" shall mean, within the chemical context of the compound defined, a substituent (each of which substituents may itself be substituted) selected from a hydrocarbyl (which may be substituted itself, preferably with an optionally substituted alkyl or halogen (fluoro) group, among others), preferably an alkyl (generally, no greater than about 12 carbon units in length), an optionally substituted aryl (which also may be heteroaryl and may include an alkylenearyl or alkyleneheteroaryl), an optionally substituted heterocycle (especially including an alkyleneheterocycle), $CF_3$, halogen (especially fluoro), thiol, thioether, borate $((HO)_2B\text{—})$, hydroxyl, carboxyl (carboxylic acid), oxygen (to form a keto group), $C_1$-$C_8$ alkoxy, azide, CN, nitro, an optionally substituted amine (e.g., an alkyleneamine or a $C_1$-$C_6$ monoalkyl or dialkyl amine), $C_1$-$C_8$ acyl, $C_1$-$C_8$ alkylester, $C_1$-$C_5$ alkyleneacyl (keto), $C_1$-$C_8$ alkylene ester, carboxylic acid, alkylene carboxylic acid, $C_1$-$C_8$ thioester, $C_2$-$C_8$ ether, $C_1$-$C_8$ thioether, amide (amido or carboxamido), alkyl or phenyl sulfone, sulfonamide or sulfoxide (wherein the alkyl or phenyl group is optionally substituted with 1-3 halogen groups and 1 or 2 hydroxyl groups), substituted amide (especially mono- or di-alkylamide) or alkyleneamide, an optionally substituted carbamate or urethane group, wherein an alkylene group or other carbon group not otherwise specified contains from 1 to 8 carbon units long (alternatively, about 2-6 carbon units long) and the alkyl group on an ester group is from 1 to 8 carbon units long, preferably up to 4 carbon units long. Various optionally substituted moieties may be substituted with 5 or more substituents, preferably no more than 3 substituents and preferably from 1 to 3 substituents. In cases where a substituent is undefined, it is understood that the undefined substituent is H (in order to provide proper valence to an atom).

The term "hydrocarbon" or "hydrocarbyl" refers to any radical containing carbon and hydrogen, which may be straight, branch-chained or cyclic in nature. Hydrocarbons include linear, branched and cyclic hydrocarbons, including alkyl groups, alkylene groups and unsaturated hydrocarbon groups, which may be optionally substituted. Hydrocarbyl groups may be fully saturated or unsaturated, containing one or more double ("ene") or triple ("yne") bonds.

"Alkyl" refers to a fully saturated monovalent hydrocarbyl radical containing up to 12 carbon atoms and hydrogen, and which may be cyclic, branched or a straight chain. Examples of alkyl groups are methyl, ethyl, n-butyl, n-hexyl, n-heptyl, n-octyl, isopropyl, 2-methylpropyl, cyclopropyl, cyclopropylmethyl, cyclobutyl, cyclopentyl, cyclopentylethyl, cyclohexylethyl and cyclohexyl. Preferred alkyl groups are $C_1$-$C_6$ alkyl groups. Alkene or alkyne refers to a hydrocarbyl radical containing from 2 to 12 carbon atoms (preferably $C_2$-$C_6$) containing at least one carbon-carbon double bond (alkene) or one carbon-carbon triple bond (alkyne). Alkyl, alkene and alkyne groups may be optionally substituted as otherwise described herein.

"Alkylene" refers to a fully saturated hydrocarbon which is divalent (may be linear, branched or cyclic) and which is optionally substituted. Other terms used to indicate substituent groups in compounds according to the present invention are as conventionally used in the art. Thus, the term alkylene aryl includes alkylene phenyl such as a benzyl group or ethylene phenyl group, alkylaryl, includes alkylphenyl such a phenyl group which has alkyl groups as substituents, etc. The bond ===== , when used in chemical structures of the present application refers to a single chemical bond, which may be an optional double bond, in context.

"Aryl" refers to a substituted or unsubstituted monovalent aromatic radical having a single ring (e.g., benzene) or multiple condensed rings (e.g., naphthyl, anthracenyl, phenanthryl) and can be can be bound to compound according to the present invention at any position on the ring(s). Other examples of aryl groups include heterocyclic aromatic ring sys-terms "heteroaryl" having one or more nitrogen, oxygen, or sulfur atoms in the ring, such as imidazole, furyl, pyrrole, pyridyl, indole and fused ring systems, among others, which may be substituted or unsubstituted.

"Alkoxy" as used herein refers to an alkyl group bound through an ether linkage; that is, an "alkoxy" group may be represented as —O-alkyl where alkyl is as defined above.

The term "cyclic" shall refer to a carbocyclic or heterocyclic group, preferably a 5- or 6-membered ring, but may include 4 and 7-membered rings. "Bicyclic" or "bicyclo" refers to bicyclic rings.

The term "heterocycle" or "heterocyclic" shall mean an optionally substituted moiety which is cyclic and contains at least one atom other than a carbon atom, such as a nitrogen, sulfur, oxygen or other atom. A heterocyclic ring shall contain up to four atoms other than carbon selected from nitrogen, sulfur and oxygen. These rings may be saturated or have unsaturated bonds. Fused rings are also contemplated by the present invention. A heterocycle according to the present invention is an optionally substituted imidazole, a piperazine (including piperazinone), piperidine, furan, pyrrole, imidazole, thiazole, oxazole or isoxazole group, among numerous others. Depending upon its use in context, a heterocyclic ring may be saturated and/or unsaturated. In instances where a heterocyclic ring is fully unsaturated, there is overlap with the term "heteroaryl".

The term "geometric isomer" shall be used to signify an isomer of a compound according to the present invention wherein a chemical group or atom occupies different spatial positions in relation to double bonds or in saturated ring systems having at least three members in the ring as well as in certain coordination compounds. Thus "cis" and "trans" isomers are geometric isomers as well as isomers of for example, cyclohexane and other cyclic systems. In the present invention all geometric isomers as mixtures (impure) or pure isomers are contemplated by the present invention. In preferred aspects, the present invention is directed to pure geometric isomers.

The term "optical isomer" is used to describe either of two kinds of optically active 3-dimensional isomers (stereoisomers). One kind is represented by mirror-image structures called enantiomers, which result from the presence of one or more asymmetric carbon atoms. The other kind is exemplified by diastereomers, which are not mirror images and which contain at least two asymmetric carbon atoms. Thus, such compounds have $2^n$ optical isomers, where n is the number of asymmetric carbon atoms. In the present invention all optical isomers in impure (i.e., as mixtures) or pure or substantially pure form (such as enantiomerically enriched or as separated diastereomers) are contemplated by the present invention. In certain aspects, the pure enantiomer or diastereomer is the preferred compound.

The present invention includes the compositions comprising the pharmaceutically acceptable salt. i.e., the acid or base addition salts of compounds of the present invention and their derivatives. The acids which may be used to prepare the pharmaceutically acceptable acid addition salts of the aforementioned base compounds useful in this invention are those which form non-toxic acid addition salts, i.e., salts containing pharmacologically acceptable anions, such as the hydrochloride, hydrobromide, hydroiodide, nitrate, sulfate, bisulfate, phosphate, acid phosphate, acetate, lactate, citrate, acid citrate, tartrate, bitartrate, succinate, maleate, fumarate, gluconate, saccharate, benzoate, methanesulfonate, ethanesulfonate, benzenesulfonate, p-toluenesulfonate and pamoate [i.e., 1,1'-methylene-bis-(2-hydroxy-3 naphthoate)]salts, among others.

Pharmaceutically acceptable base addition salts may also be used to produce pharmaceutically acceptable salt forms of the compounds according to the present invention.

The chemical bases that may be used as reagents to prepare pharmaceutically acceptable base salts of the present compounds that are acidic in nature are those that form non-toxic base salts with such compounds. Such non-toxic base salts include, but are not limited to those derived from such pharmacologically acceptable cations such as alkali metal cations (eg., potassium and sodium) and alkaline earth metal cations (e, calcium and magnesium), ammonium or water-soluble amine addition salts such as N-methylglucamine-(meglumine), and the lower alkanolammonium and other base salts of pharmaceutically acceptable organic amines, among others.

Regardless of the mechanism, the compounds of the present invention may be used to treat disease states or conditions in patients or subjects who suffer from those conditions or disease states or are at risk for those conditions. In this method a compound in an effective amount is administered to a patient in need of therapy to treat the condition(s) or disease state(s). These disease states and conditions include, for example, cancer (particularly breast, reproductive and other hormone-dependent cancers, leukemia, colon cancer, prostate cancer), reproductive and genitourological diseases or conditions including endometritis, prostatitis, polycystic ovarian syndrome, bladder control, hormone-related disorders, hearing disorders, cardiovascular disease and conditions including hot flashes and profuse sweating, hypertension, stroke, ischemia, myocardial infarction, obesity, osteoporosis, restoration of lipid profile, atherosclerosis, symptoms of menopause, inflammation, rheumatoid arthritis and osteoarthritis, hematologic diseases and conditions, including lymphoproliferative disorders, myeloproliferative disorders, eosinophilia, histiocytosis, paroxysmal nocturnal hemoglobinuria, and systemic mastocytosis, vascular diseases or conditions such as venous thrombosis, embolisms, among numerous others, disorders of the central and peripheral nervous system, including depression, insomnia, anxiety, neuropathy, multiple sclerosis, neurodegenerative disorders such as Parkinson's disease and Alzheimer's disease, as well as inflammatory bowel disease, Crohn's disease, coeliac (celiac) disease and related disorders of the intestine. In a contraceptive embodiment, the present compounds may also be used to prevent or reduce the likelihood that a woman will become pregnant after intercourse by administering to said women before or after intercourse an effective amount of one or more compounds according to the present invention.

Compositions according to the present invention may be administered by any conventional means known in the art. Pharmaceutical formulations include those suitable for oral, rectal, nasal, topical (including buccal and sub-lingual), vaginal or parenteral (including intramuscular, sub-cutaneous and intravenous) administration. Compositions according to the present invention may also be presented as a bolus, electuary or paste. Tablets and capsules for oral administration may contain conventional excipients such as binding agents, fillers, lubricants, disintegrants, or wetting agents. The tablets may be coated according to methods well known in the art. Oral liquid preparations may be in the form of, for example, aqueous or oily suspensions, solutions, emulsions, syrups or elixirs, or may be presented as a dry product for constitution with water or other suitable vehicle before use. Such liquid preparations may contain conventional additives such as suspending agents, emulsifying agents, non-aqueous vehicles (which may include edible oils), or preservatives. When desired, the above described formulations may be adapted to provide sustained release characteristics of the active ingredient(s) in the composition using standard methods well-known in the art.

In the pharmaceutical aspect according to the present invention, the compound(s) according to the present invention is formulated preferably in admixture with a pharmaceutically acceptable carrier. In general, it is preferable to administer the pharmaceutical composition orally, but certain formulations may be preferably administered parenterally and in particular, in intravenous or intramuscular dosage form, as well as via other parenteral routes, such as transdermal, buccal, subcutaneous, suppository or other route, including via inhalation or intranasally. Oral dosage forms are preferably administered in tablet or capsule (preferably, hard or soft gelatin) form. Intravenous and intramuscular formulations are preferably administered in sterile saline. Of course, one of ordinary skill in the art may modify the formulations within the teachings of the specification to provide numerous formulations for a particular route of administration without rendering the compositions of the present invention unstable or compromising their therapeutic activity.

Compositions suitable for parenteral injection may comprise physiologically acceptable sterile aqueous or nonaqueous solutions, dispersions, suspensions, or emulsions, or may comprise sterile powders for reconstitution into sterile injectable solutions or dispersions. Examples of suitable aqueous and nonaqueous carriers, diluents, solvents, or vehicles include water, ethanol, polyols (propylene glycol, polyethylene glycol, glycerol, and the like), suitable mixtures thereof, triglycerides, including vegetable oils such as olive oil, or injectable organic esters such as ethyl oleate. Proper fluidity can be maintained, for example, by the use of a coating such as lecithin, by the maintenance of the required particle size in the case of dispersions, and/or by the use of surfactants.

These compositions may also contain adjuvants such as preserving, wetting, emulsifying, and/or dispersing agents. Prevention of microorganism contamination of the compositions can be accomplished by the addition of various antibacterial and antifungal agents, for example, parabens, chlorobutanol, phenol, sorbic acid, and the like. It may also be desirable to include isotonic agents, for example, sugars, sodium chloride, and the like. Prolonged absorption of injectable pharmaceutical compositions can be brought about by the use of agents capable of delaying absorption, for example, aluminum monostearate and/or gelatin.

Solid dosage forms for oral administration include capsules, tablets, powders, and granules. In such solid dosage forms, the active compound is admixed with at least one inert customary excipient (or carrier) such as sodium citrate or dicalcium phosphate or (a) fillers or extenders, as for example, starches, lactose, sucrose, mannitol, or silicic acid; (b) binders, as for example, carboxymethylcellulose, alginates, gelatin, polyvinylpyrrolidone, sucrose, or acacia; (c) humectants, as for example, glycerol; (d) disintegrating agents, as for example, agar-agar, calcium carbonate, potato or tapioca starch, alginic acid, certain complex silicates, or sodium carbonate; (e) solution retarders, as for example, paraffin; (f) absorption accelerators, as for example, quaternary ammonium compounds; (g) wetting agents, as for example, cetyl alcohol or glycerol monostearate; (h) adsorbents, as for example, kaolin or bentonite; and/or (i) lubricants, as for example, talc, calcium stearate, magnesium stearate, solid polyethylene glycols, sodium lauryl sulfate, or mixtures thereof. In the case of capsules and tablets, the dosage forms may also comprise buffering agents.

Solid compositions of a similar type may also be used as fillers in soft or hard filled gelatin capsules using such excipients as lactose or milk sugar, as well as high molecular weight polyethylene glycols, and the like.

Solid dosage forms such as tablets, dragees, capsules, and granules can be prepared with coatings or shells, such as enteric coatings and others well known in the art. They may also contain opacifying agents, and can also be of such composition that they release the active compound or compounds in a delayed manner. Examples of embedding compositions that can be used are polymeric substances and waxes. The active compounds can also be in micro-encapsulated form, if appropriate, with one or more of the above-mentioned excipients.

Liquid dosage forms for oral administration include pharmaceutically acceptable emulsions, solutions, suspensions, syrups, and elixirs. In addition to the active compounds, the liquid dosage form may contain inert diluents commonly used in the art, such as water or other solvents, solubilizing agents and emulsifiers, as for example, ethyl alcohol, isopropyl alcohol, ethyl carbonate, ethyl acetate, benzyl alcohol, benzyl benzoate, propylene glycol, 1,3-butylene glycol, dimethylformamide, oils, in particular, cottonseed oil, groundnut oil, corn germ oil, olive oil, castor oil, sesame seed oil, glycerol, tetrahydrofurfuryl alcohol, polyethylene glycols, fatty acid esters of sorbitan, or mixtures of these substances, and the like.

Besides such inert diluents, the composition can also include adjuvants, such as wetting agents, emulsifying and suspending agents, sweetening, flavoring, and perfuming agents.

Suspensions, in addition to the active compound, may contain suspending agents, as for example, ethoxylated isostearyl alcohols, polyoxyethylene sorbitol or sorbitan esters, microcrystalline cellulose, aluminum metahydroxide, bentonite, agar-agar, or tragacanth, or mixtures of these substances, and the like.

Compositions for rectal or vaginal administration, where applicable, can be prepared by mixing an active agent and any additional compounds with suitable non-irritating excipients or carriers such as cocoa butter, polyethylene glycol or a suppository wax, which are solid at ordinary room temperature, but liquid at body temperature, and therefore, melt in the rectum or vaginal cavity and release the active.

Dosage forms for topical administration include ointments, powders, sprays and inhalants. The compound(s) are admixed under sterile conditions with a physiologically acceptable carrier, and any preservatives, buffers, and/or propellants that may be required. Opthalmic formulations, eye ointments, powders, and solutions are also contemplated as being within the scope of this invention.

Generally, dosages and routes of administration of the pharmaceutical compositions and therapeutic compounds described herein are determined according to the size and condition of the subject, according to standard practice. Dose levels employed can vary widely, and can readily be determined by those of skill in the art. Typically, amounts in the milligram up to gram quantities are employed, depending upon the severity of the disease and the age of the subject.

The dosage administered pursuant to the present invention is an effective amount for producing an intended result and will vary depending upon known factors such as the penetration kinetics and/or pharmacodynamic characteristics of the particular agent and the ability of the agent to penetrate the tissue to which the composition has been administered or applied, as well as the age, health, and weight of the recipient; nature and extent of symptoms, kind of concurrent treatment, frequency of treatment, and the effect desired. Usually a daily dosage of active compound can be about 0.001 to 500 milligrams per kilogram of body weight or more, often 0.1 milligrams to 250 milligrams per kilogram of body weight. Ordinarily, 0.5 to 50, and often 1 to 25 milligrams per kilogram per day is given in divided doses 1 to 6 times a day or in sustained release form (often, transdermal administration) is effective to obtain desired results.

The active compounds may be used at a concentration of 0.01 to 99.9 weight percent of the formulation, or in some cases a concentration of 0.001 to 99.9 weight percent of the formulation. Often the active compound is included the composition in amounts ranging from 0.01 wt % to up to 10 wt % or more, often 0.1 wt % to about 5 wt %. Topical and/or transdermal compositions for application directly to the skin or mucosal membranes are preferably formulated in lotions, creams, salves, liquids or polymeric delivery vehicles (patches). Many of these compositions comprise water-in-oil or oil-in-water emulsions with the active compounds being included therein. The topical formulation dosage will vary with the amount applied to the area of tissue to be treated. In contrast, the pharmaceutical formulation, when used, is preferably in unit dosage form. The unit dosage form can be a capsule or tablet itself, or the appropriate number of any of these. The quantity of active compound in a unit dose of composition may be varied or adjusted from about 0.05 to several grams, often 0.1 to about 1000 milligrams or more or about 1 milligram to 500 milligrams according to the particular treatment involved. Compositions (dosage forms) suitable for internal administration contain from about 1 milligram to about 1000 milligrams of active compound per unit. In these pharmaceutical compositions the active compound will ordinarily be present in an amount of about 0.5-95% by weight based on the total weight of the composition.

Treatment Using the Present Compounds

Treatment, as defined herein, is the amelioration of the symptoms associated with disease. Symptoms may be reduced either by decreasing the level of the condition itself, or by decreasing the symptoms associated with the condition. In most instances, favorable treatment results in ameliorating or favorably influencing the symptoms of the disease state and/or condition treating with compounds and/or compositions according to the present invention. The subject of the treatment is preferably a mammal, such as a domesticated farm animal (e.g., cow, horse, pig, or a domesticated pet (e.g., dog, cat). More preferably, the subject is a human.

Chemical Synthesis

Examples of specific compounds demonstrated according to the present invention are illustrated in FIGS. 16, 17 and 18-19 hereof. Detailed descriptions of the experimental methodology for synthesis, purification and structural characterization data of selected compounds are provided according to the presentation herein below. Compounds are synthesized by analogy using synthetic methods which are available in the art and followed by the skilled practitioner.

General Chemical Methods.

All compounds were synthesized in an efficient fumehood. All other commercially available solvents and reagents were purchased and used without further purification.

Preparative chromatography was performed by medium pressure column chromatography using AnaLogix SuperFlash pre-packed columns. H NMR spectra were acquired using Varian Oxford 300 MHz, Varian Unity 400 MHz, and 500 MHz spectrometers and $^{13}$C NMR were acquired using Varian Oxford 75 MHz, Varian Unity 100 MHz and 125 MHz spectrometers at ambient temperatures (20±2° C.). $^1$H NMR spectra in CDCl$_3$ and acetone-d$_6$ were referred to TMS. Mass spectra were obtained using an Orbitrap Fusion Mass Spectrometer (Thermo Fisher, San Jose, CA).

General considerations for the synthesis of the oxabicyclo [3.3.1]non-7-ene compounds. In this application the oxabicyclo[3.3.1]non-7-ene serves as a core structural scaffold for positioning specific substituents that determine the structure-activity relationships of binding affinities for estrogen receptor alpha (ERα) and/or estrogen receptor beta (ERβ) to the (relative) exclusion of GPER/GPR30, and the corresponding modulation of receptor-mediated activity that may occur by virtue of agonist activity, antagonist activity or mixed agonist/antagonist activity (depending on the receptor site). An archetypal example of the Prins-type cyclization forming an oxabicyclo[3.3.1]non-7-ene structure from the reaction of an aldehyde with a 3-cyclohexenylmethyl alcohol is shown below. A variety of acids are capable of catalyzing Prins-type cyclization reactions, however, multiple side reactions and formation of byproducts compete with the desired cyclization. The identification of effective catalyst and individualized optimization of reaction conditions are required to efficiently synthesize specific substituted compounds with the structural classes encompassed by this invention.

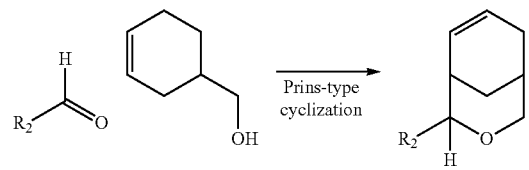

The overall synthetic approach for the compounds of focus, as illustrated here, involves three key chemical transformations (A-C). The first step (A) involves a Diels-Alder cycloaddition of a conjugated diene with a conjugated acrylate or enone dienophile, that are prepared from aldol condensation of formaldehyde with the enol/enolate of an activated α-methylene carbonyl compound, to produce a 1-carbonyl-4-methylcyclohex-3-ene derivative. The second step (B) involves conversion of the carbonyl derivative from step A to a 1-hydroxyalkyl-4-methylcyclohex-3-ene derivative. The third step (C) involves the acid-catalyzed Prins-type reaction of a 4-hydroxybenzaldehyde substrate with the compound prepared in step B to produce the 4-(8-methyl- 3-oxabicyclo[3.3.1]non-7-en-2-yl)phenol scaffold. Additional functional group transformations may be required for specific analogues.

Figure 16:
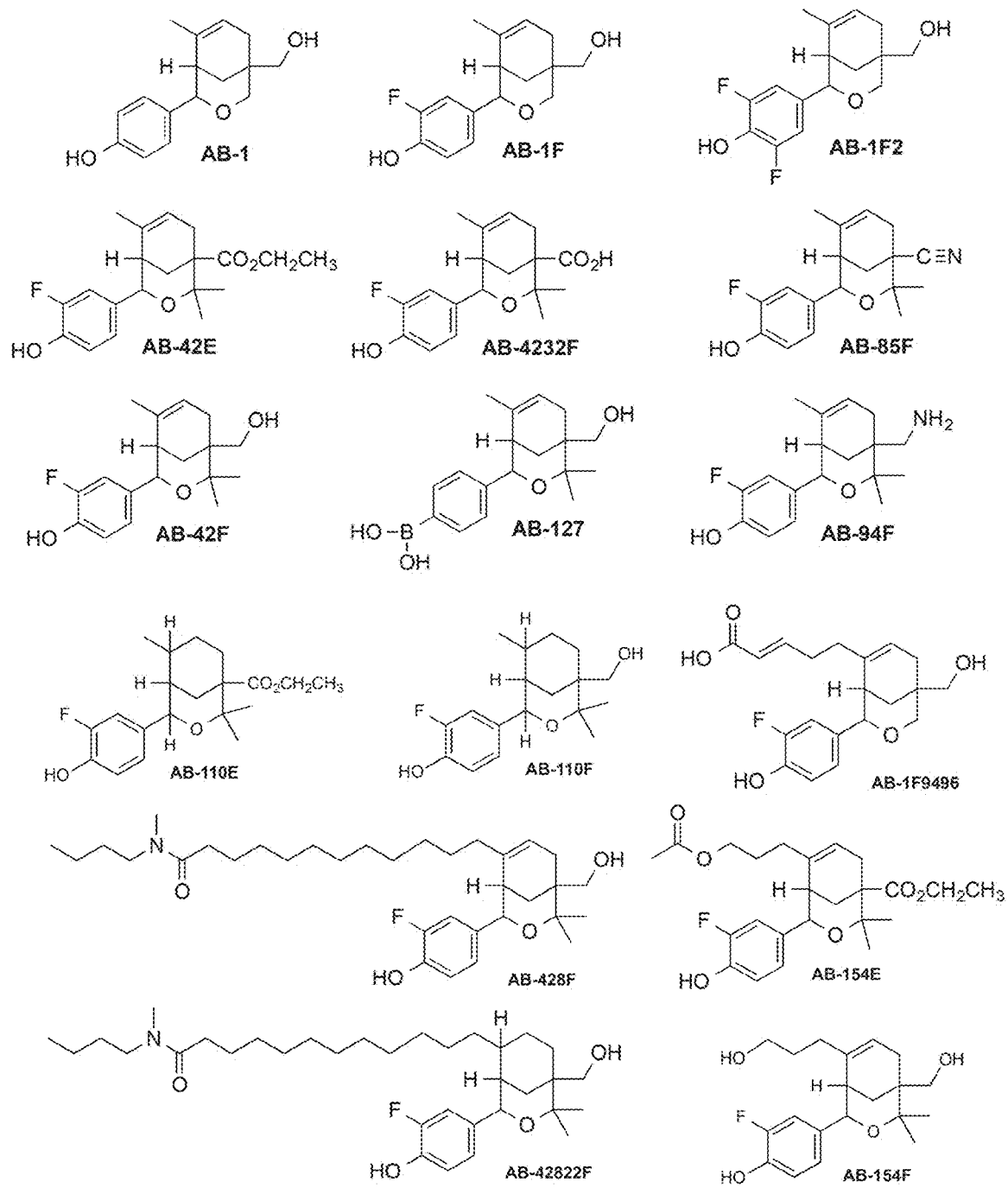
FIG. 16 shows exemplary compounds according to the present invention.
Figure 16:
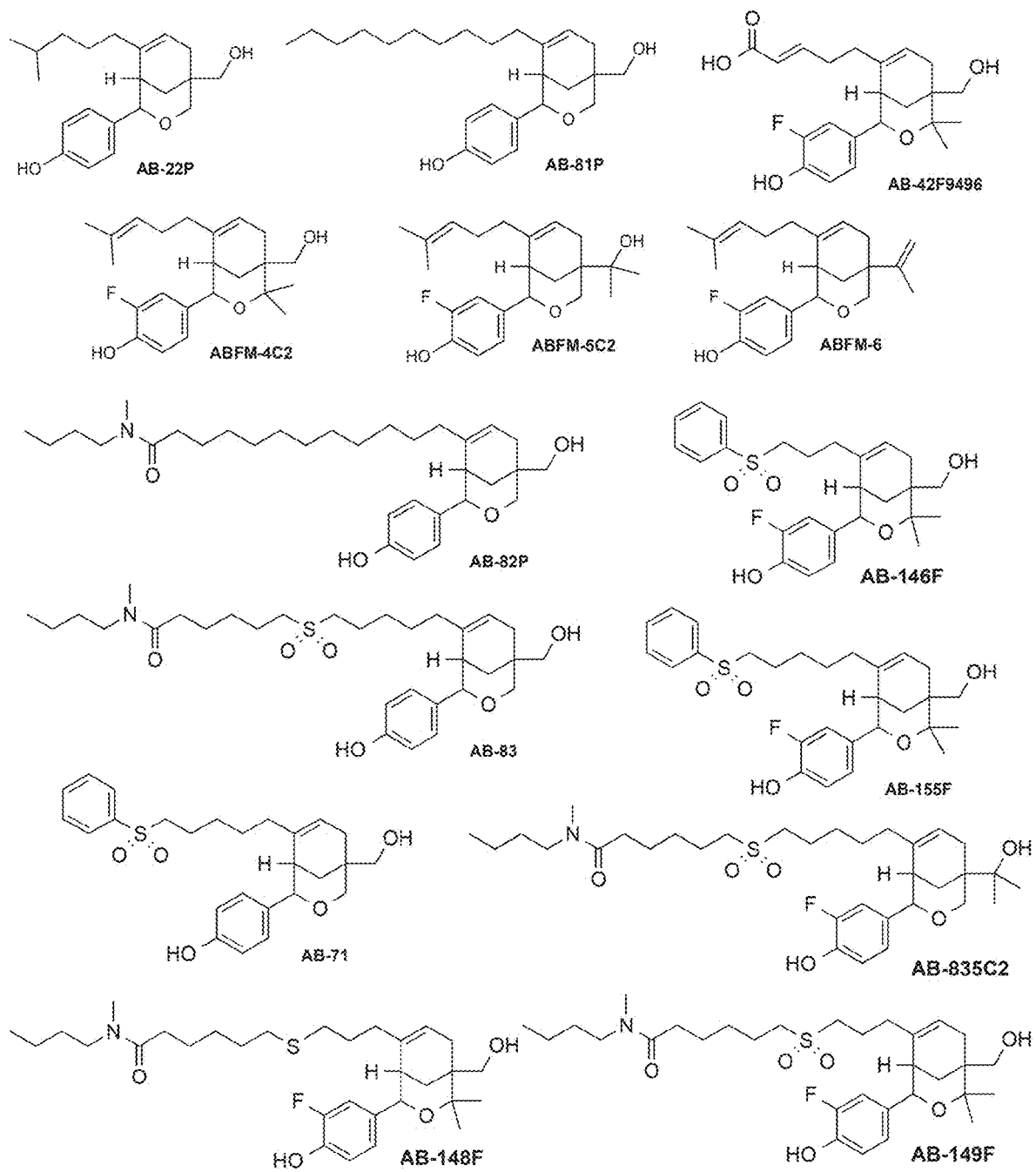
Figure 16:
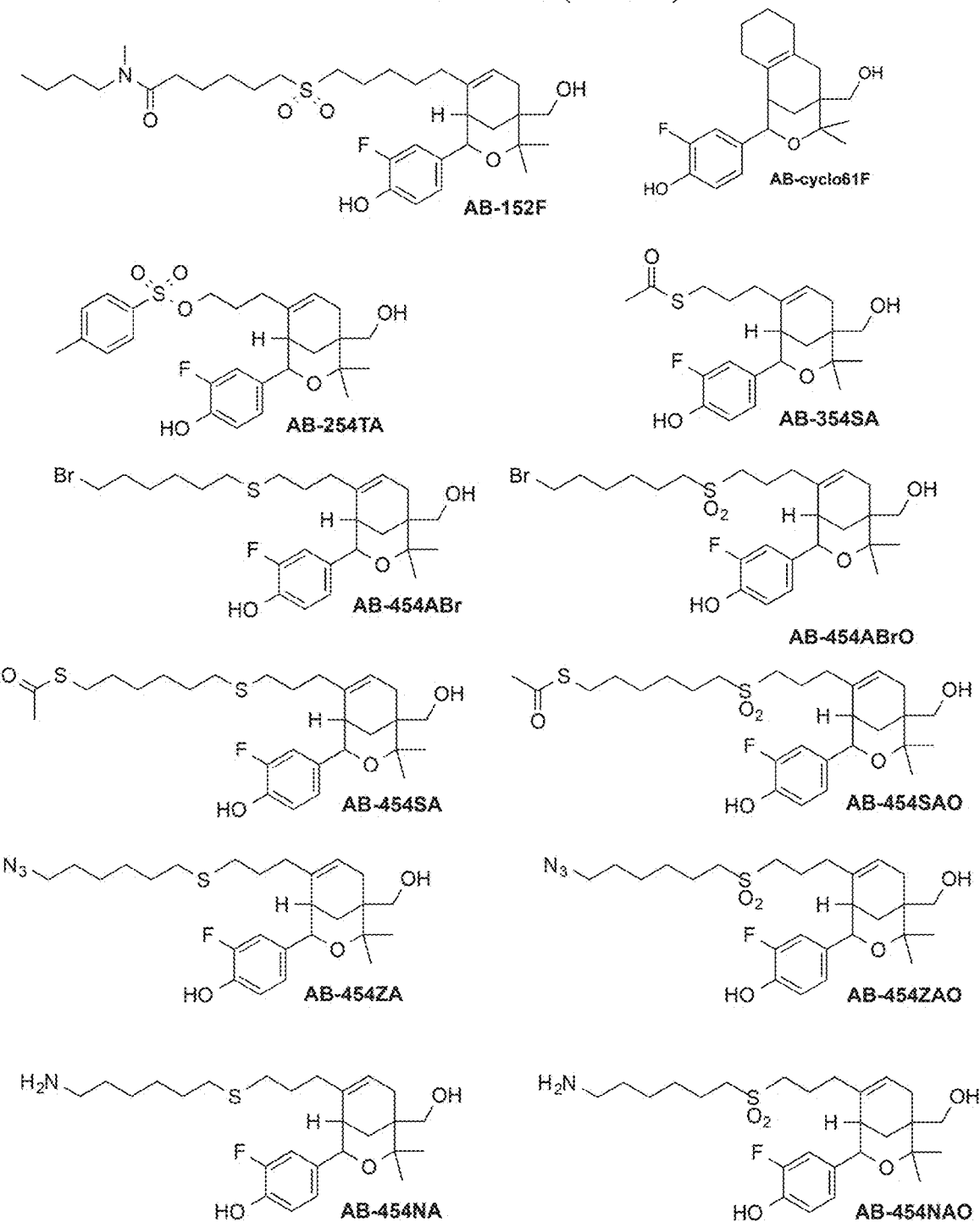

The application of this general approach and detailed experimental procedure for the synthesis of the lead compound AB-1 are demonstrated in the following section. The first step A was optimized as a multi-component reaction using zinc(II)chloride to catalyze the formation of the enone dienophile from formaldehyde and an activated α-methylene carbonyl compound, and the Diels-Alder cycloaddition with isoprene (2-methyl-1,3-butadiene) was also catalyzed by $ZnCl_2$. This experimental modification is an important advance because the class of enones required for this application are not commercially available, and this procedure enables use of available reagents. The reduction of the ester group to a primary alcohol in the second step (B) employs the standard reagent lithium aluminum hydride. The Prins-type reaction in the third step (C) was found to be optimally catalyzed by Lewis acids, including scandium(III) trifluoromethanesulfonate, and preferentially hafnium(IV) trifluoromethanesulfonate. This procedure is generally applicable for preparation of related analogues, and a series of representative compounds with structures containing $R^8$=methyl (—$CH_3$) series were synthesized and are shown in FIG. 16: AB-1, AB-1F, AB-1F2, AB-42E, AB-4232F, AB-85F, AB-42F, AB-127, AB-94F, AB-110E, AB-110F.

Detailed Chemical Synthesis of AB-1

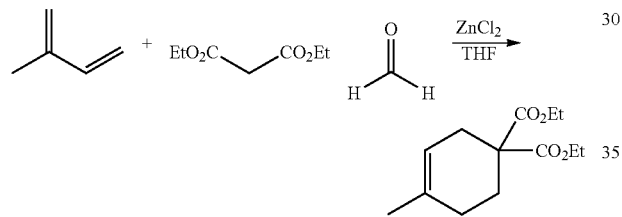

Step A Multi-component Diels-Alder cyclization: diethyl 4-methylcyclohex-3-ene-1,1-dicarboxylate. A sealed tube containing a diethylmalonate (0.800 g, 5.0 mmol), paraformaldehyde (0.450 g, 15.0 mmol), 2-methyl-1,3-butadiene (0.408 g, 6.0 mmol) and zinc chloride (0.09 g, 0.66 mmol, 7.5 mol %) in dry tetrahydrofuran (2.5 mL) was stirred at 70° C. for 24 h. The reaction mixture was concentrated under reduced pressure, diluted with dichloromethane (45 mL) and washed successively with saturated aqueous $NaHCO_3$, and $H_2O$ (25 mL each), dried over $Na_2SO_4$, evaporated in vacuo, and purified by silica gel column chromatography eluting with ethyl acetate/hexanes (1:99) to obtain the pure product as a colorless oil (0.668 g, 57%). $^1H$ NMR (300 MHz, $CDCl_3$) δ 5.37-5.35 (m, 1H), 4.18 (q, J=7.23 Hz, 4H), 2.53-2.51 (m, 2H), 2.16-2.12 (m, 2H), 2.02-1.94 (m, 2H), 1.63 (bs, 3H), 1.23 (t, J=7.40 Hz, 6H); FT-IR (Neat), 2960, 1731, 1210, 1151, 503 $cm^1$).

Step B Ester Reduction: (4-Methylcyclohex-3-ene-1,1-diyl)dimethanol

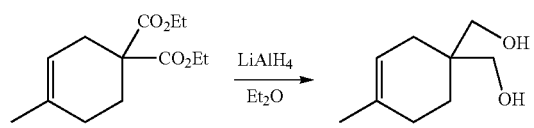

A solution of diethyl 4-methylcyclohex-3-ene-1,1-dicarboxylate (0.68 g, 2.83 mmol) in dry diethylether (5 mL) was added dropwise to a cooled (0° C.) suspension of lithium aluminum hydride (0.240 g, 6.32 mmol) in dry diethylether (1 mL) and allowed to warm to ambient temperature with magnetic stirring under a nitrogen atmosphere for 3 h. The reaction mixture was cooled in an ice-bath, and worked up by successive slow addition of water, 10% sodium hydroxide, and three additional portions of water (240 µL each) to yield tractable aluminum salt precipitates that were filtered, and the filtrate was concentrated and dried under vacuum to provide the product (0.327 g, 74% mp 103-108° C.). $^1H$ NMR (300 MHz, $CDCl_3$) δ 5.30-5.27 (m, 1H), 3.61 (d, J=5.47 Hz, 4H), 2.13 (t, J=5.47 Hz, 2H), 1.96-1.91 (m, 2H), 1.81-1.77 (m, 2H), 1.66-1.64 (bs, 3H), 1.60 (t, J=6.64 Hz, 2H); FT-IR (Neat) 3300, 1610, 1518, 1269, 1071 $cm^1$.

Step C Prins-Type Cyclization: 4-(5-(hydroxymethyl)-8-methyl-3-oxabicyclo[3.3.1]non-7-en-2-yl))-phenol [AB-1]

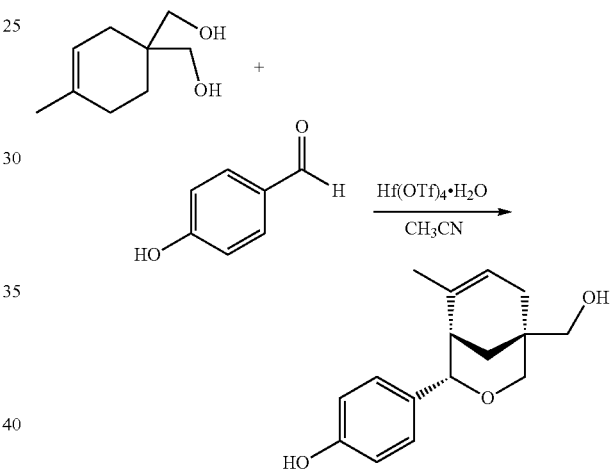

Figure 20:
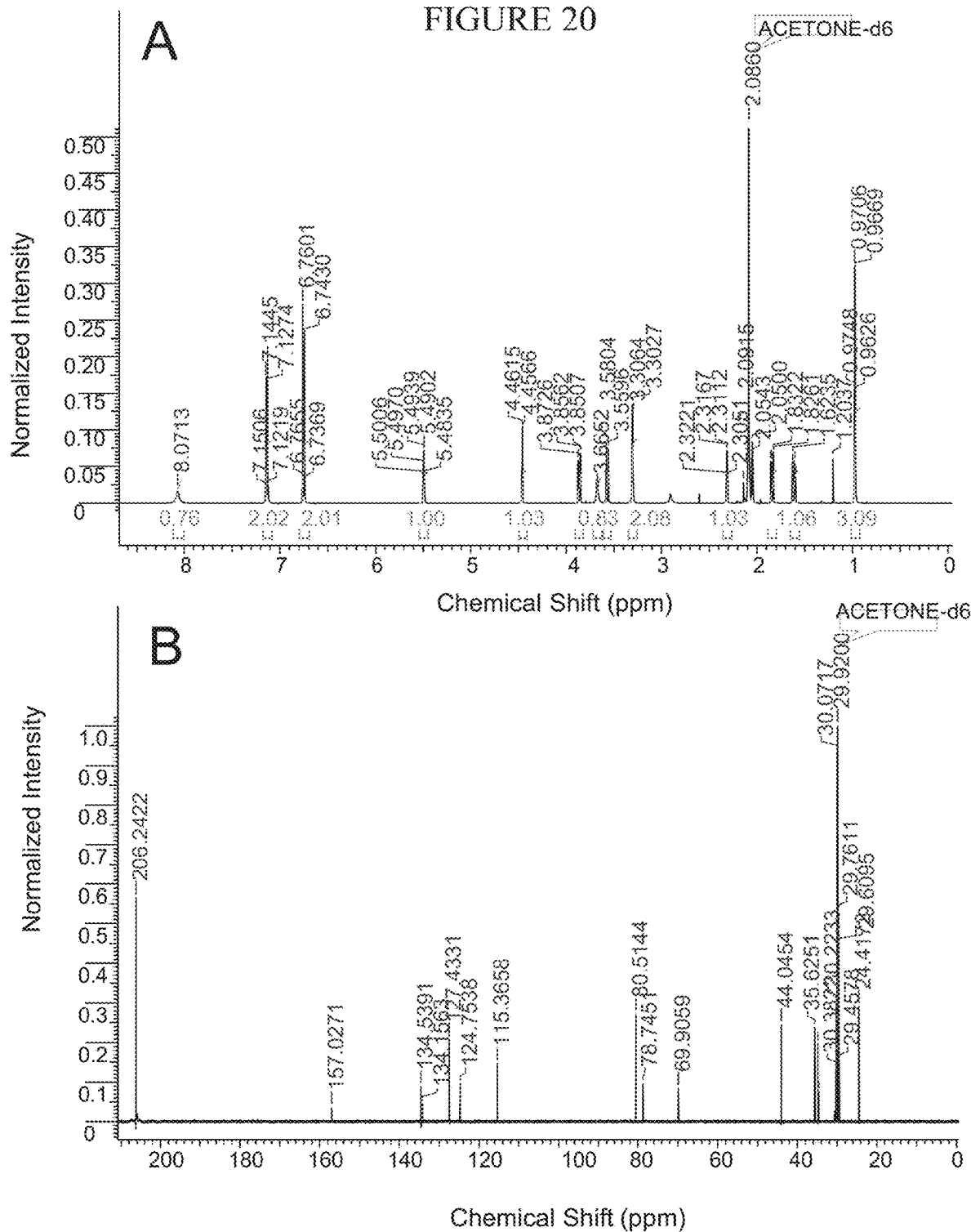
FIG. 20 shows (A) $^1$H NMR (500 MHz) data and (B) $^{13}$C NMR (125 MHz) data for compound AB-1.
Figure 21:
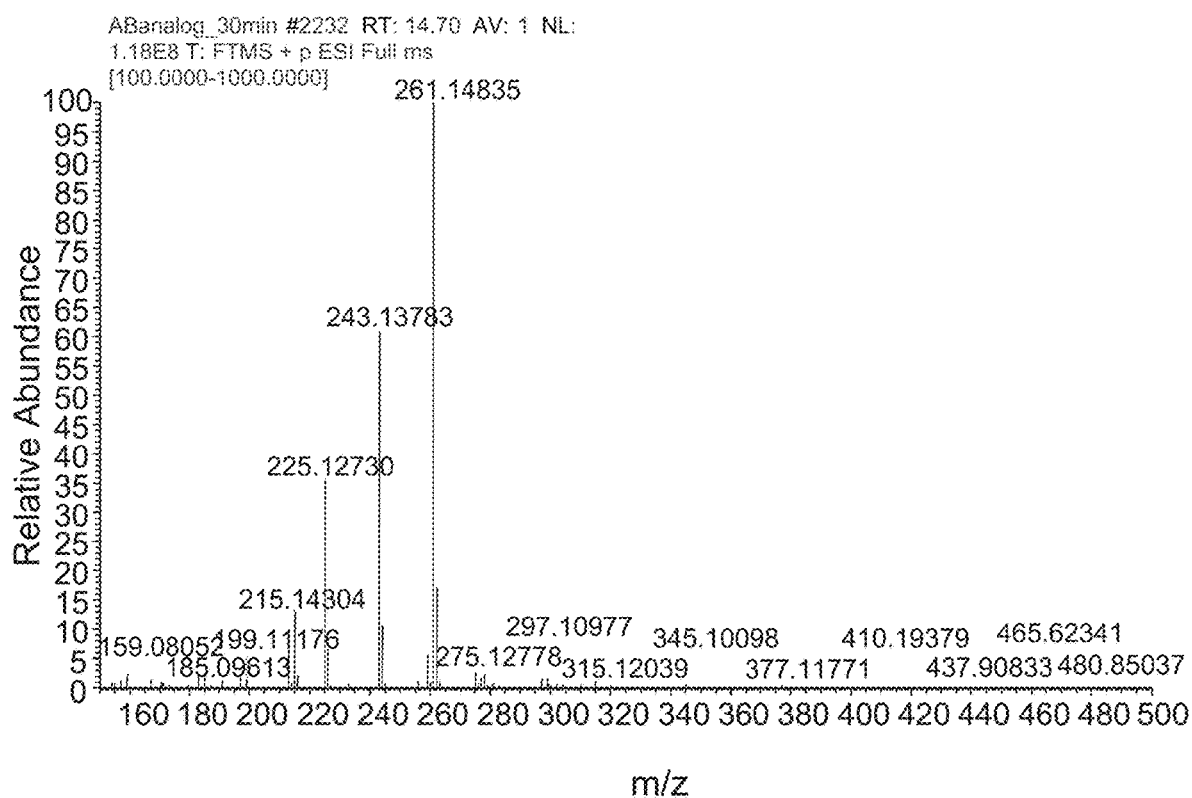
FIG. 21 shows the high resolution mass spectrometry of synthetic AB-1 performed with an Orbitrap Fusion mass spectrometer.
Figure 22:
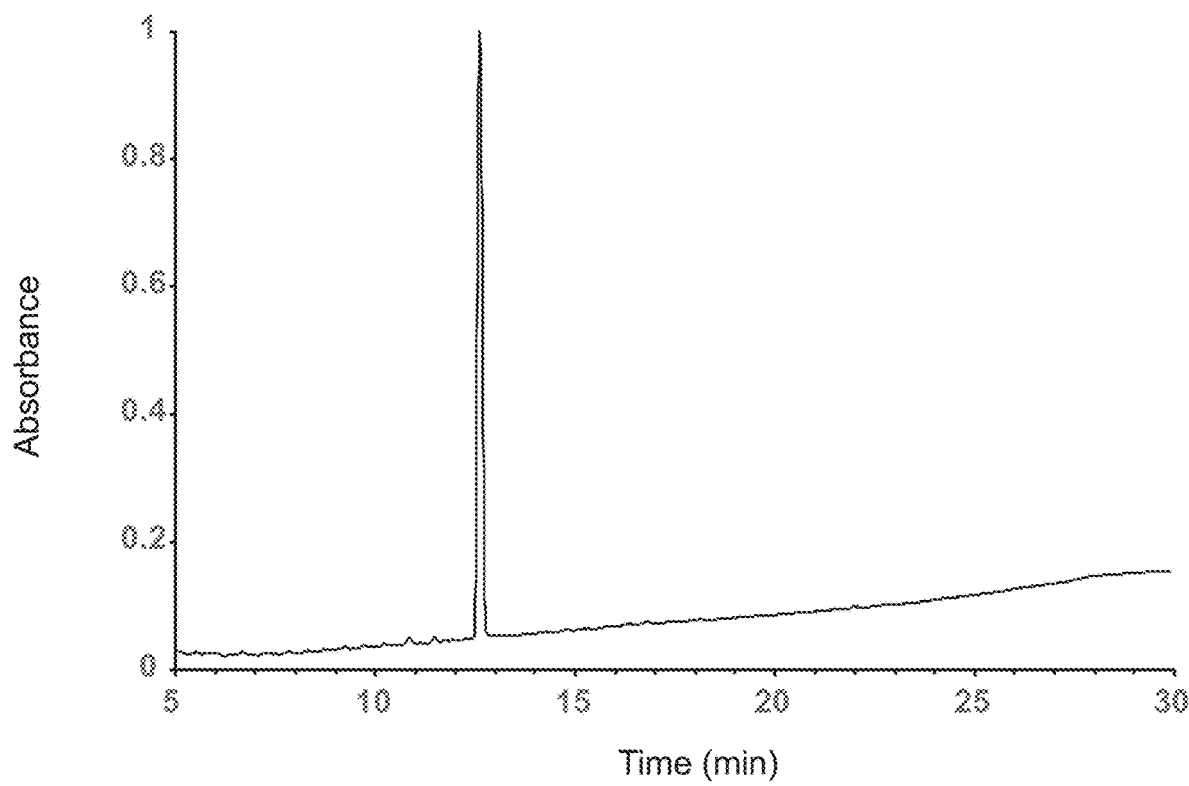
FIG. 22 shows a representative HPLC chromatograph of synthetic compound AB-1 obtained using a reversed-phase $C_{18}$ column with a flow rate of 200 μL/minute and eluent $H_2O$/acetonitrile/formic acid as a linear gradient from [98/02/0.1] to [02/98/0.1] over a 30-minute period. The effluent was routed through an in-line diode array detector (190-400 nm) for relative quantification of constituents.

To a solution of the (4-methylcyclohex-3-ene-1,1-diyl) dimethanol (0.161 g, 1.032 mmol) and 4-hydroxybenzaldehyde (0.15 g, 1.23 mmol) in anhydrous acetonitrile (4 mL) was added 5 mol % hafnium(IV) trifluoromethanesulfonate monohydrate (0.040 g, 0.051 mmol). The reaction mixture was stirred at ambient temperature under a nitrogen atmosphere for 18 h. The reaction mixture was quenched with sat. $NaHCO_3$ (10 mL), diluted with water (25 mL) and the product was extracted using $CH_2Cl_2$ (3×10 mL), dried over $Na_2SO_4$, and evaporated in vacuo. The product was purified by silica gel column chromatography eluted with EtOAc/hexanes (45:55) to isolate the product as white solid (0.23 g, 86%; mp 164-168° C.) ($R_f$=0.3). $^1H$ NMR (500 MHz, acetone-$d_6$) δ 8.03 (bs, 1H), 7.10 (d, J=8.85 Hz, 2H), 6.71 (d, J=8.85 Hz, 2H), 5.45-5.46 (m, 1H), 4.42 (d, J=1.83 Hz, 1H), 3.83 (dd, J=10.99, 2.83 Hz, 1H), 3.65 (bs, 1H), 3.53 (d, J=10.99 Hz, 1H), 3.26 (s, 2H), 2.28-2.26 (m, 1H), 2.22-2.03 (m, 2H), 1.8 (dd, J=11.6, 2.75 Hz, 1H), 1.65 (m, 1H), 1.01 (dd, J=3.97, 2.14 Hz, 3H) (FIG. 20A); $^{13}C$ NMR (125 MHz, $CD_3COCD_3$) δ 157.03, 134.54, 134.16, 127.43, 124.75, 115.36, 80.51, 78.74, 69.90, 44.05, 35.62, 34.85, 34.68, 30.67, 24.4 (FIG. 20B); FT-IR (Neat) 3300, 2975, 1610, 1092, 1051 $cm^1$. HRMS (m/z) calcd for $C_{16}H_{21}O_3$, 261.1485 [M+H$^+$]; found, 261.1484 (FIG. 21). The UV absorbance peak areas in the HPLC chromatogram of the AB-1 sample (FIG. 22) were integrated and demonstrated compound purity of 98.6%.

Alternative 2-Step Approach for the Prins-Type Cyclization of Acetal.

A demonstration of an alternative approach to the multi-component Prins-type cyclization for the synthesis of AB-1 is shown below. The first step involves formation of the acetal, which typically occurs in high yield. The acetal is able to react in a Prins-type cyclization with added aldehyde in the presence of catalyst hafnium(IV) trifluoromethanesulfonate. The same purification procedures are applicable, although the distribution of side products and unreacted compounds in the reaction mixture may be different from the reaction mixture produced by the multi-component approach.

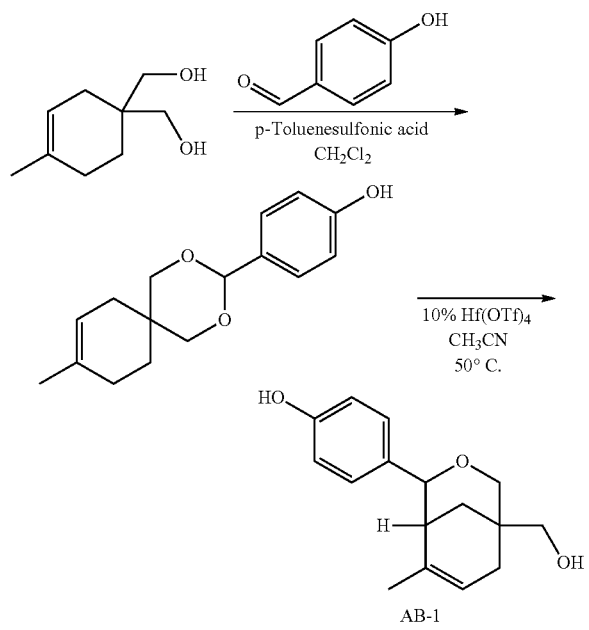

Methods for Preparation of Further Compounds According to the Present Invention Saturated oxabicyclo[3.3.1]nonane analogues. The catalytic hydrogenation of the oxabicyclo[3.3.1]non-7-ene scaffold to provide saturated analogs according to formula (II) has been demonstrated by the synthesis AB-110F following the scheme below. The detailed experimental procedure as described in the following section is representative of the procedures used for preparation of related saturated analogues.

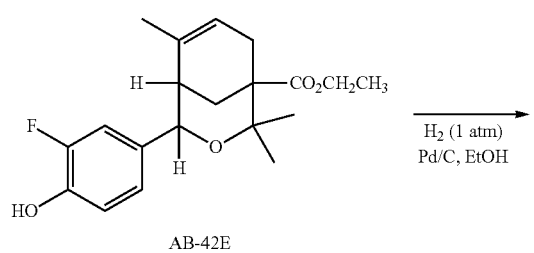

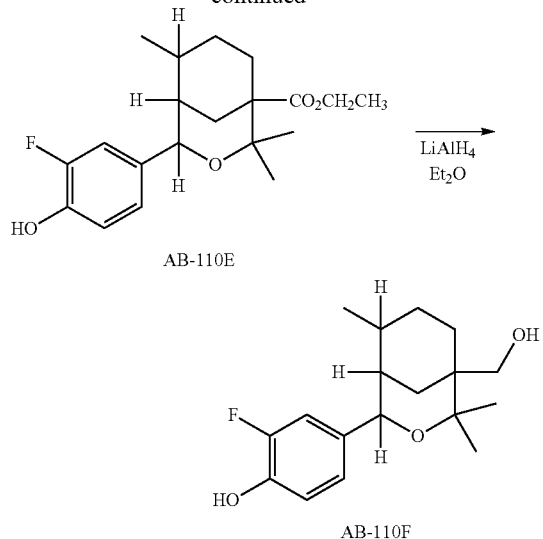

AB-42E (22 mg, 0.06 mmol) was taken up in ethanol (2 mL), then added to activated palladium on carbon (23 mg, 0.022 mmol) under an atmosphere of hydrogen (1 atm). The reaction was stirred for 4 hours, then filtered through celite. The filtrate was concentrated under reduced pressure and the crude product AB-110E was sufficiently pure for the next step. $^1$H NMR (300 MHz, Chloroform-d) δ 7.17 (dd, J=12.2, 2.0 Hz, 1H), 7.06-6.99 (m, 1H), 6.92 (t, J=8.6 Hz, 1H), 4.97-4.90 (m, 1H), 4.14 (tq, J=7.1, 3.3 Hz, 2H), 2.62 (dt, J=13.4, 3.3 Hz, 1H), 2.49 (dd, J=13.4, 3.3 Hz, 1H), 2.11 (dd, J=12.8, 4.8 Hz, 1H), 2.04 (q, J=3.8, 3.1 Hz, 1H), 1.76 (dd, J=13.4, 3.2 Hz, 1H), 1.54 (s, 4H), 1.52-1.31 (m, 4H), 1.30-1.26 (m, 6H), 0.33 (d, J=7.2 Hz, 3H).

AB-110E (20 mg, 0.057 mmol) was taken up in dry diethyl ether (0.5 mL) and added to lithium aluminum hydride (4.4 mg, 0.114 mmol) at 0° C. dropwise over 1 minute. After two hours the reaction was quenched sequentially by the addition of 40 μL H$_2$O, 40 μL 10% NaOH, and 120 μL H$_2$O. The mixture was filtered through celite with hot ethyl acetate (50 mL). The filtrate was concentrated under reduced pressure. The crude material was passed through a plug of silica gel and eluted with dichloromethane to give the product AB-110F as a white solid (13 mg, 77% yield over two steps). $^1$H NMR (500 MHz, Chloroform-d) δ 7.19 (dd, J=12.1, 2.0 Hz, 1H), 7.06-6.99 (m, 1H), 6.92 (t, J=8.6 Hz, 1H), 5.02 (d, J=3.2 Hz, 1H), 4.91-4.82 (m, 1H), 3.46 (dd, J=11.3, 5.3 Hz, 1H), 3.30 (dd, J=11.1, 3.7 Hz, 1H), 2.13-2.04 (m, 2H), 2.02-1.96 (m, 2H), 1.68 (d, J=10.2 Hz, 1H), 1.48-1.41 (m, 1H), 1.39 (d, J=1.9 Hz, 4H), 1.30 (s, 4H), 0.34 (d, J=7.3 Hz, 3H). $^{13}$C NMR (126 MHz, Chloroform-d) δ 137.11, 121.49 (d, J=3.3 Hz), 116.30, 112.80, 112.64, 77.79, 73.69, 70.07, 40.47, 38.44, 37.43, 36.05, 31.16, 29.91, 25.85, 22.03, 21.12. $^{19}$F NMR (471 MHz, Chloroform-d) δ −142.06, −162.00.

Determination of Structural Features Favorable for ER-Binding Affinities.

The ER-binding affinities were measured for the series of synthetic compounds with structures containing $R^8$=methyl (—CH$_3$) and representative examples are reported in FIG. 18. Analysis of structure-activity relationships demonstrated the following substituent features, following the labeling schemes corresponding to Formula I, IA, IAA, that are advantageous for ERα-binding affinity: $R_4$ and $R_{4'}$ are both methyl groups; $R_5$ is hydroxymethyl (CH$_2$OH); $R^{12}$ is hydroxyl (OH); and $R^{13}$ is fluorine (F). In pursuit of the objective to develop analogues that antagonize the activity and/or downregulate receptor expression, the $R_8$ position was identified as a suitable position on the oxabicyclo[3.3.1] non-7-ene scaffold for the introduction of substituents of varying overall length, conformational flexibility, steric volume, lipophilicity/hydrophobicity, functional group and heteroatom composition, and hydrogen-bond donor/acceptor properties. A series of novel $R_8$-substituted analogues were synthesized, and representative compounds within this series are shown in FIG. 16.

General Synthetic Approach for Preparation of Antagonists with Substitution ($R_8$).

The general synthetic approach for the synthesis of $R_8$-substituted analogues extrapolates from the three key steps described in the previous section (A-C), with additional steps and functional group transformations as required for the construction of the substituents. Synthetic manipulation of the substituent may be focused on reagents used in the Diels-Alder cyclization, or may be initiated subsequently and either before or after the Prins-type cyclization, with chemical modifications of the substituents and/or scaffold as required to produce the final compounds. This approach is demonstrated in the following section with the syntheses of $R_8$-substituted analogues using the Diels-Alder cycloaddition of the commercially available natural product myrcene (7-methyl-3-methylene-1,6-octadiene) with a conjugated acrylate or enone dienophile, prepared from aldol condensation of formaldehyde with the enol/enolate of the corresponding activated α-methylene carbonyl compound, to produce the 1-carbonyl-4-(4-methylpent-3-en-1yl)cyclohex-3-ene substrate for Prins-type cyclization. The isolated trisubstituted alkene in the cyclohexene product may be modified by a wide variety of different reagents, and this provides a convenient position for elaboration of extended substituents, as demonstrated herein. The selective modification of this alkene to synthesize extended substituents may be performed either after the Prins-type cyclization or before that step, as implemented by the skilled practitioner. This strategy represents a novel approach that we refer to as the myrcene route. The syntheses of $R_8$-substituted analogues oxabicyclo[3.3.1]non-7-ene compounds using the myrcene route require careful optimization of reaction conditions in order to maximize the yield and avoid or minimize competing side-product formation. Representative examples of synthesized $R_8$-substituted analogues produced by the myrcene route are illustrated in FIG. 16: AB-22P, AB-81P, AB-42F9496, ABFM-4C2, ABFM-5C2, ABFM-6, AB-82P, AB-146F, AB-83, AB-155F, AB-71, AB-835C2, AB-148F, AB-149F, AB-152F, AB-254 TA, AB-354SE, AB-454SA, AB-454SAO, AB-454ZA, AB-454ZAO, AB-454NA, AB-454NAO. Detailed experimental procedures are provided for selected representative examples in the next section, and brief descriptive summaries of the synthetic sequences are provided for other examples. Selected examples of the ERalpha/beta binding affinities of representative $R_8$-substituted analogues are shown in FIG. 18.

Synthesis of $R_8$-substituted N-butylmethyldodecanamide Analogue: AB-82P

Figure 17:
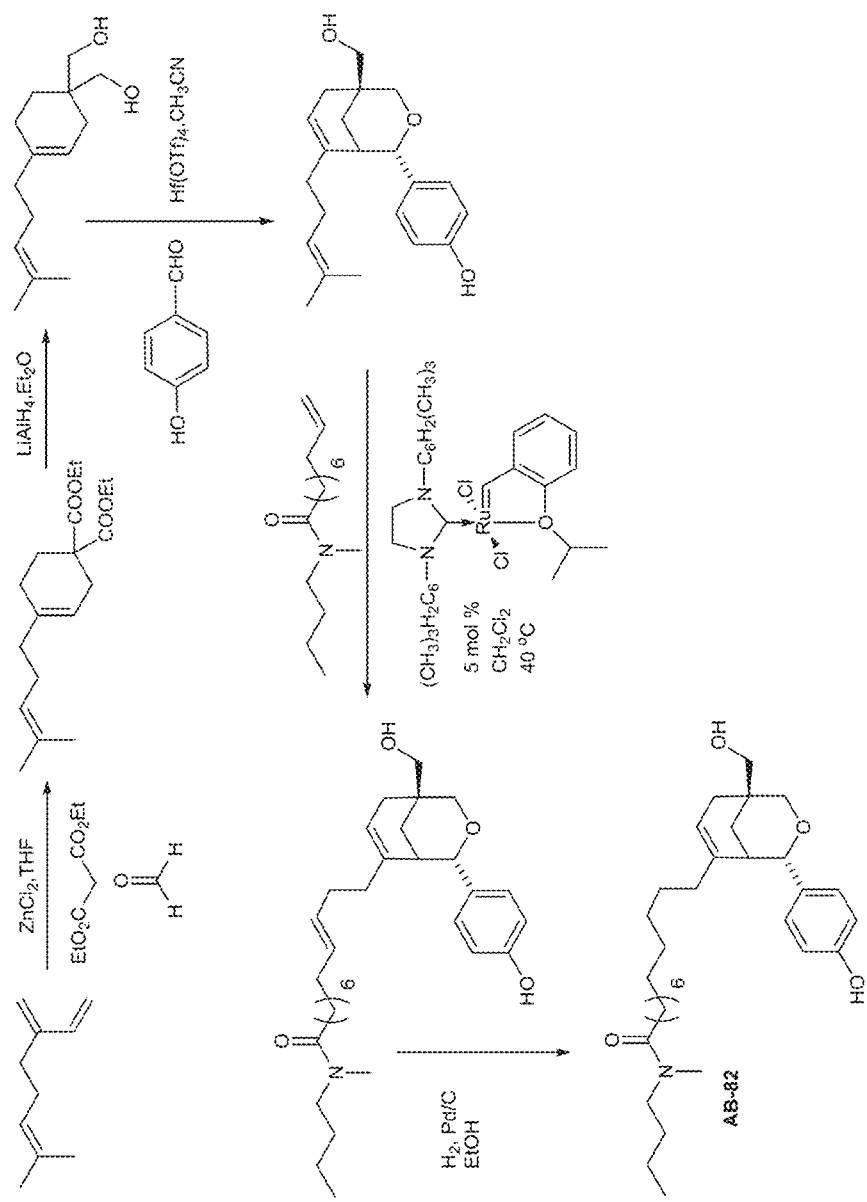
FIG. 17 shows a general chemical synthetic scheme for providing compounds according to the present invention. In this figure, the synthesis of compound AB-82 is shown. Other compounds according to the present invention may be synthesized by analogy.

General features of the utility of the myrcene route for the preparation of $R_8$-substituted analogues are demonstrated in the preparation of compound AB-82P as summarized in FIG. 17. The in situ generation of the electrophilic unsaturated carbonyl-compound dienophile from formaldehyde and diethylmalonate, and the Diels-Alder reaction with the substituted conjugated diene myrcene (7-methyl-3-methyleneocta-1,6-diene) are both catalyzed by zinc(II) chloride as an efficient multi-component reaction. It is important to note that the electrophilic unsaturated carbonyl-compound dienophiles required for this application are typically unstable, undergo side reactions and polymerization, and are not generally commercially available. Reduction of the ester groups, followed by the Prins-type cyclization with 4-hydroxybenzaldehyde catalyzed by scandium(III)trifluoromethanesulfonate gave the oxabicyclo[3.3.1]non-7-ene scaffold with a 4-methylpent-3-en-1-yl group at the $R_8$-position. In this demonstration of the myrcene route, a cross-metathesis reaction is used for the synthesis of an extended substituent, converting the 4-methylpent-3-en-1-yl group into the N-butylmethyldodec-9-enamide substituent. The conditions for cross-metathesis are mild and compatible with a wide variety of functional groups, therefore this general approach provides access to a wide variety of analogues incorporating substituents with different length and functional groups. The hydrogenation of the exocyclic alkene group in the N-butylmethyldodec-9-enamide proceeds rapidly and selectively under very mild conditions and low catalyst loading, leaving the cyclic alkene intact in the product compound AB-82P.

Step 1 Diels-Alder with Myrcene

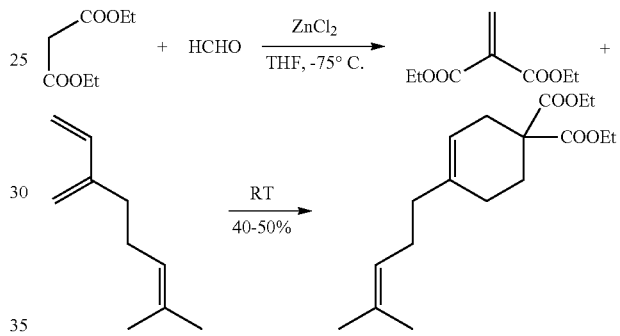

A mixture of diethyl malonate (2 g, 12.5 mmol), powdered paraformaldehyde (0.375 g, 25 mmol) and anhydrous zinc(II) chloride (0.170 g, 1.25 mmol, 10 mol %) in dry tetrahydrofuran (20 mL) was refluxed at 75° C. under argon atmosphere for overnight. The reaction mixture was cooled to room temperature and myrcene (1.7 g, 12.5 mmol) was added and allowed to stir at room temperature under argon atmosphere for 12 hours. The reaction mixture was filtered and the filtrate was concentrated under reduced pressure to obtain the crude product as thick oil. The crude reaction mixture was purified by silica gel column chromatography using EtOAc/hexanes (05:95) to obtain the pure product diethyl 4-(4-methylpent-3-en-1-yl)cyclohex-3-ene-1,1-dicarboxylate (1.928 g, 50%). $^1$H NMR (300 MHz, CDCl$_3$) δ 5.38-5.36 (m, 1H), 5.07-5.03 (m, 1H), 4.17 (q, J=10, 3.0 Hz, 4H), 2.55-2.53 (m, 2H), 2.15-1.91 (m, 10H), 1.67 (s, 3H), 1.58 (s, 3H), 1.23 (t, J=3.0 Hz, 6H).

Step 2 Reduction to Diol

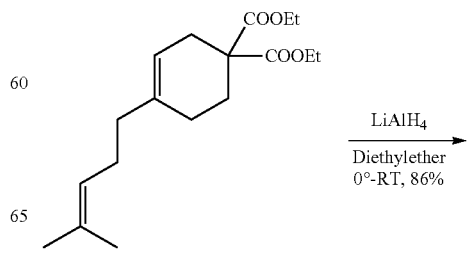

-continued

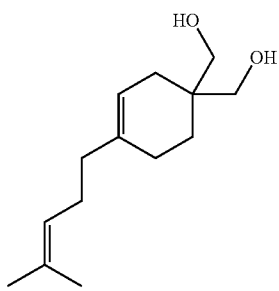

To lithium aluminum hydride (0.146 g, 3.84 mmol) suspended in dry diethyl ether (3 mL) in a 25 mL round bottomed flask, was added a solution of the ester (0.6 g, 1.92 mmol) in diethyl ether (3 mL) at 0° C. and the reaction mixture was allowed to stir under an argon atmosphere overnight. The reaction mixture was diluted with diethyl ether (10 mL), quenched with dropwise addition of 5M NaOH (1.5 mL), filtered, and the filtrate was concentrated, dried to provide the product (4-(4-methylpent-3-en-1-yl)cyclohex-3-ene-1,1-diyl)dimethanol as flaky white solid (0.37 g, 86%) $^1$H NMR (300 MHz, CDCl$_3$) δ 5.23-5.20 (m, 1H), 5.02-4.97 (m, 1H), 3.97 (bs, 2H), 3.93 (s, 4H), 2.02-1.83 (m, 6H), 1.71-1.68 (m, 2H), 1.60 (bs, 3H), 1.51 (bs, 3H), 1.49-1.44 (t, J=6.16 Hz, 2H).

Step 3 Prins-Type Cyclization of Diol

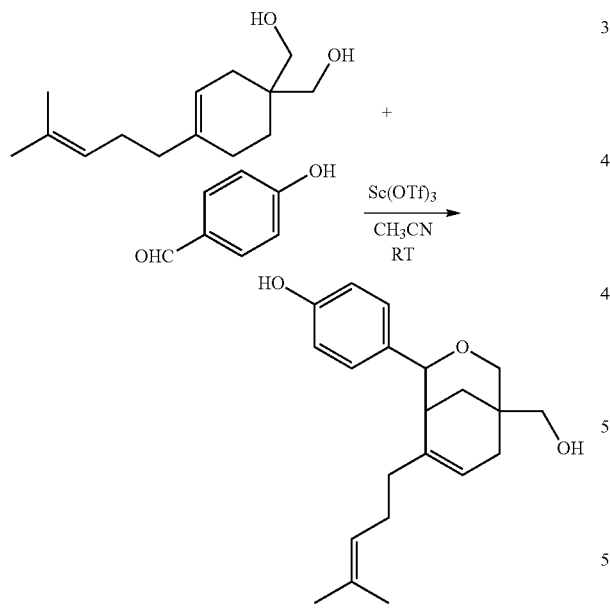

A mixture of the diol (0.16 g, 0.714 mmol) and p-hydroxybenzaldehyde (0.174 g, 1.42 mmol) and Sc(OTf)$_3$ (0.019 g, 0.04 mmol, 5 mol %) in 3 mL of anhydrous acetonitrile was allowed to stir at room temperature under an argon atmosphere for 24 h. The reaction mixture was diluted with of dichloromethane (15 mL) and washed with saturated NaHCO$_3$ solution (15 mL). The organic layer was separated, dried over anhydrous sodium sulfate, filtered and the filtrate was evaporated under reduced pressure to obtain the crude product (0.25 g, 106%). The crude reaction mixture was purified by silica gel column chromatography using 10-15% EtOAc/Hexanes to obtain the product 4-(5-(hydroxymethyl)-8-(4-methylpent-3-en-1-yl)-3-oxabicyclo[3.3.1]non-7-en-2-yl)phenol (0.073 g, 31%); $^1$H NMR (300 MHz, CDCl$_3$) δ 7.12 (d, J=8.80 Hz, 2H), 6.73 (d, J=8.66 Hz, 2H), 5.57-5.54 (m, 1H), 4.87-4.80 (m, 1H), 4.47 (bs, 1H), 3.96-3.92 (dd, J=11, 2.8 Hz, 1H), 3.60 (s, 2H), 3.39 (s, 2H) 2.37-2.34 (m, H), 2.12-2.03 (m, 3H), 2.0-1.90 (m, 4H), 1.82-1.72 (m, 3H), 1.67 (s, 3H), 1.59 (s, 3H), 1.48 (bs, 2H).

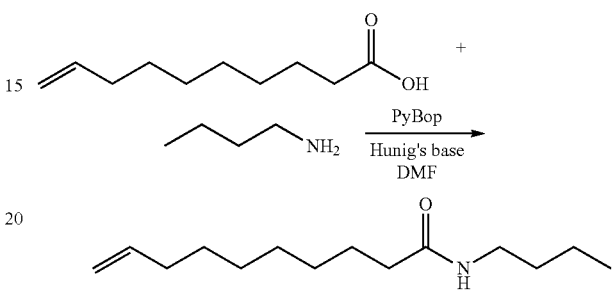

To a mixture of 9-decenoic acid (0.170 g, 1 mmol) and butylamine (0.073 g, 1 mmol) in dry DMF (2 mL), was added Hunig's base (0.129 g, 1 mmol) followed by addition of PyBOP (0.52 g, 1 mmol) at 0° C. under an argon atmosphere. The reaction mixture was allowed to stir overnight. The reaction mixture was diluted with dichloromethane (5 mL) and washed with cold water. The organic layer was separated and concentrated to obtain the product N-butyldec-9-enamide (0.225 g, 100% yield); $^1$H NMR (300 MHz, CDCl$_3$) δ 5.87-5.73 (m, 1H), 5.40 (bs, 1H), 5.01-4.90 (m, 2H), 3.28-3.21 (m, 2H), 2.14 (t, J=7.19 Hz, 2H), 2.05-1.99 (m, 2H), 1.56-1.26 (m, 10H), 0.92 (t, J=7.19 Hz, 3H).

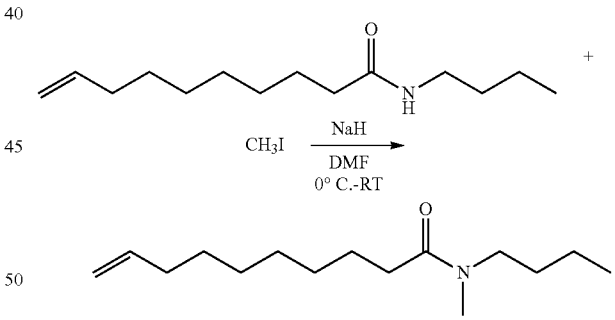

Sodium hydride (0.048 g, 1.3 mmol, 60% NaH) was added to the substrate (0.225 g, 1 mmol) in dry DMF (1.5 mL) at 0° C. and allowed to stir for 3h. The reaction mixture was diluted with methylene chloride (10 mL) and washed with cold water (15 mL). Organic layer was separated, dried over anhydrous sodium sulfate, filtered and evaporated under reduced to yield the product N-butyl-N-methyldec-9-enamide (0.220 g, 91%); $^1$H NMR (300 MHz, CDCl$_3$) δ 5.86-5.73 (m, 1H), 5.02-4.91 (m, 2H), 3.38-3.28 (m, 2H), 2.96 (s, 1.5H, rotamer), 2.90 (s, 1.5H, rotamer) 2.31-2.26 (m, 2H), 2.06-2.00 (m, 2H), 1.64-1.23 (m, 15H), 0.97-0.89 (m, 3H).

Step 4 Synthesis of Extended the N-Butyl-N-Methyldodec-9-Enamide Substituent Using Cross-Metathesis

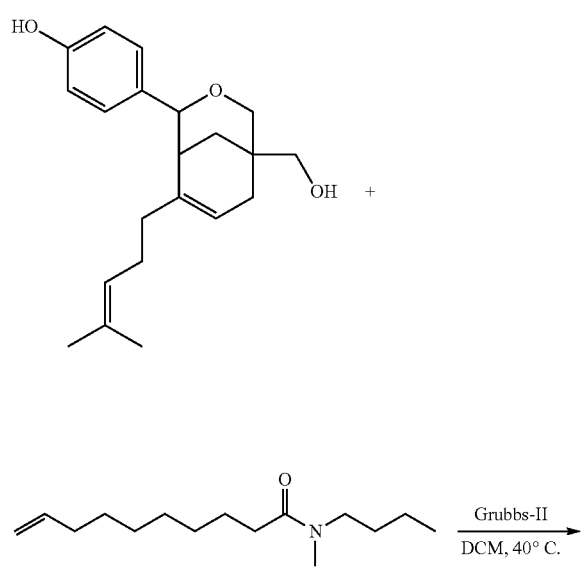

To a mixture of 4-(5-(hydroxymethyl)-8-(4-methylpent-3-en-1-yl)-3-oxabicyclo[3.3.1]non-7-en-2-yl)phenol (0.050 g, 0.152 mmol) and N-butyl-N-methyldec-9-enamide (0.182 g, 0.762 mmol) in dry dichloromethane (4 mL), was added Grubbs II catalyst (6.42 mg, 0.005 mol, 5 mol %) and allowed to stir at 40° C. under argon atmosphere for 7.5 h. The reaction mixture was filtered through celite, and the filtrate was concentrated under reduced pressure to provide the product N-butyl-12-(1-(hydroxymethyl)-4-(4-hydroxyphenyl)-3-oxabicyclo[3.3.1]non-6-en-6-yl)-N-methyldodec-9-enamide (0.058 g, 75%); $^1$H NMR (CDCl$_3$, 300 MHz) δ $^1$H NMR (300 MHz, CDCl$_3$) δ 7.10-7.07 (d, J=8.22 Hz, 2H), 6.80-6.77 (d, J=8.5 Hz, 2H), 5.5 (bs, 1H), 5.16-5.12 (m, 2H), 4.47-4.46 (bs, 1H), 3.97-3.92 (m, 1H), 3.62-3.58 (m, 1H), 3.41-3.24 (m, 4H), 2.98 (s, 1.5H; rotamer), 2.94 (s, 1.5H; rotamer), 2.37-2.05 (m, 5H), 1.60-1.47 (m, 5H), 1.38-1.18 (m, 10H), 0.98-0.89 (m, 3H).

A mixture of the alkene (0.015 g, 0.0285 mmol) and Pd/C (0.015 g) in ethanol (5 mL) was allowed stir under a hydrogen atmosphere (1 atm) for 3 h. The reaction mixture was filtered and the filtrate was concentrated under reduced pressure. The crude product was purified by silica gel column chromatography using 20-25% EtOAc/hexanes to obtain the pure product AB-82P (N-butyl-12-(1-(hydroxymethyl)-4-(4-hydroxyphenyl)-3-oxabicyclo[3.3.1]non-6-en-6-yl)-N-methyldodecanamide) (6.2 mg, 42%); $^1$H NMR (300 MHz, CDCl$_3$) δ 7.11-7.08 (d, J=8.5 Hz, 2H), 6.81-6.78 (d, J=8.0 Hz, 2H), 5.53 (bs, 1H), 4.47 (s, 1H), 3.97-3.92 (m, 1H), 3.62-3.59 (m, 1H), 3.39 (s, 2H), 3.35-3.27 (m, 2H), 2.98 (s, 1.5H; rotamer), 2.93 (s, 1.5H; rotamer), 2.37-2.32 (m, 3H), 2.31-2.10 (m, 2H), 1.84-1.79 (m, 1H), 1.65-1.47 (m, 5H), 1.37-0.88 (m, 23H).

Synthesis of ABFM-4C$_2$ and ABFM-5C2 Demonstrating Regioselectivity Effects of Alcohol-Substitution in the Prins-Type Cyclization.

Additional features of the utility of the myrcene route for the preparation of R$_8$-substituted analogues are demonstrated in the preparation of compounds: ABFM-4C$_2$, ABFM-5C$_2$ and ABFM-6. In this synthetic sequence the in situ generation of the electrophilic unsaturated carbonyl-compound dienophile from formaldehyde and ethylacetoacetate, and the Diels-Alder reaction with the substituted conjugated diene myrcene (7-methyl-3-methyleneocta-1,6-diene) are both catalyzed by zinc(II) chloride. The ketone group in ethyl 1-acetyl-4-(4-methylpent-3-en-1-yl)cyclohex-3-enecarboxylate reacts preferentially with methylmagnesium bromide to produce the tertiary alcohol. The ethyl ester group was then reduced to a primary alcohol with lithium aluminum hydride. The Prins-type cyclization of the substituted cyclohexene-alcohol, which possesses a primary and tertiary alcohol groups, was catalyzed using hafnium (IV)triflate. This procedure the oxabicyclo[3.3.1]non-7-ene compounds were formed with involvement of the tertiary alcohol in the Prins-type cyclization to yield ABFM-4C$_2$ in 10%, and the product involving the primary alcohol ABFM-5C$_2$ was formed in 42% yield. This observed regioselectivity of the Prins-type cyclization indicates preferential formation of the primary alkyloxonium ion intermediate from the aldehyde that forms ABFM-5C$_2$. This example represents a practical limitation for the synthetic approach using the Prins-type cyclization employing diol precursors for preparation of compounds with dimethyl groups at R$_4$,R$_4$ and hydroxymethyl at R$_5$ on the oxabicyclo[3.3.1]non-7-ene scaffold. The compound ABFM-6 is formed by acid-catalyzed elimination of the tertiary alcohol in ABFM-5C$_2$ and was isolated in 22% yield. Additional byproducts detected in the crude reaction mixture include the intramolecular ether, acetal, and alkene hydration.

Step 1 Diels-Alder Cyclization

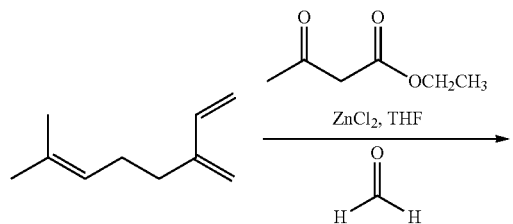

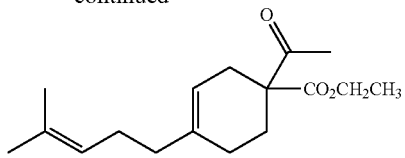

To a high pressure flask, myrcene (15.7 g, 115 mmol), paraformaldehyde (1.72 g, 57.6 mmol), ethyl acetoacetate (5 g, 38.4 mmol), and zinc chloride (0.522 g, 3.84 mmol) were combined with dry THF (60 mL) and the flask was sealed and heated to 70° C. The reaction was stirred for 48 hours, then cooled to room temperature and filtered through celite with diethyl ether. The filtrate was concentrated under reduced pressure. The crude mixture was purified by column chromatography with hexanes, then 10% ethyl acetate/hexanes to give the pure product ethyl 1-acetyl-4-(4-methylpent-3-en-1-yl)cyclohex-3-enecarboxylate (10.57 g, 100% yield); $^1$H NMR (300 MHz, chloroform-d) δ 5.39 (s, 1H), 5.05 (s, 1H), 4.19 (qd, J=7.1, 0.9 Hz, 2H), 2.50 (d, J=20.1 Hz, 2H), 2.18 (s, 3H), 2.16-1.90 (m, 7H), 1.68 (d, J=1.3 Hz, 3H), 1.59 (d, J=1.3 Hz, 3H), 1.25 (t, J=7.1 Hz, 3H). $^{13}$C NMR (126 MHz, chloroform-d) δ 205.22, 172.14, 137.20, 131.51, 123.98, 119.77, 117.66, 61.27, 37.21, 29.96, 27.16, 26.20, 25.82, 25.66, 25.43, 17.65, 14.02.

Step 2a Selective Addition of Grignard Reagent to Ketone to Produce a Tertiary Alcohol

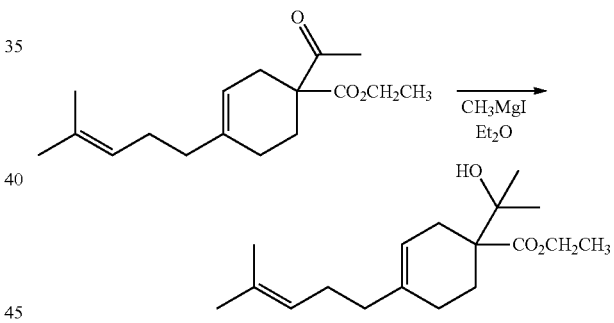

At 0° C. a solution of ethyl 1-acetyl-4-(4-methylpent-3-en-1-yl)cyclohex-3-enecarboxylate (2.78 g, 9.98 mmol) in dry THF (50 mL), was added to methylmagnesium iodide (6.58 mL of a 3.0 M solution in diethyl ether) at a rate of 1 mL per minute. The reaction was maintained at 0° C. for five hours. The reaction was quenched by the addition of saturated ammonium chloride (40 mL), the mixture was diluted with water (40 mL), and extracted with diethyl ether (3×110 mL). The combined organics were dried over MgSO$_4$, filtered and concentrated under reduced pressure. The product was purified by column chromatography with 10% ethyl acetate/hexanes to give the pure product ethyl 1-(2-hydroxypropan-2-yl)-4-(4-methylpent-3-en-1-yl)cyclohex-3-enecarboxylate (2.64 g, 90%). $^1$H NMR (300 MHz, Chloroform-d) δ 5.40 (d, J=5.4 Hz, 1H), 5.13-5.03 (m, 1H), 4.18 (qd, J=7.1, 4.0 Hz, 2H), 2.98 (s, 1H), 2.62-2.49 (m, 1H), 2.28-1.94 (m, 8H), 1.68 (d, J=1.4 Hz, 3H), 1.63-1.56 (m, 4H), 1.27 (td, J=7.1, 2.2 Hz, 3H), 1.20 (s, 3H), 1.19 (s, 3H). $^{13}$C NMR (126 MHz, Chloroform-d) δ 176.24, 136.83, 131.37, 124.15, 119.37, 73.61, 60.72, 37.27, 36.61, 28.82, 26.56, 26.37, 25.92, 25.65, 25.44, 24.66, 23.32, 17.65, 14.17.

Step 2b Ester Reduction to Produce a Primary Alcohol

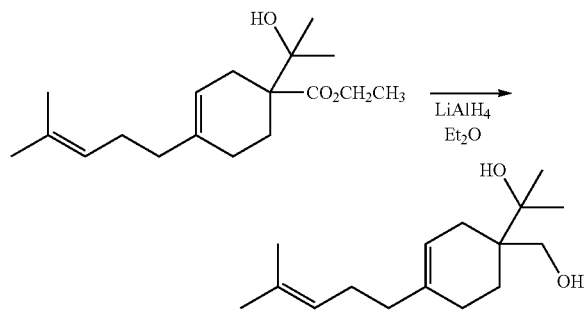

A solution of ethyl 1-(2-hydroxypropan-2-yl)-4-(4-methylpent-3-en-1-yl)cyclohex-3-enecarboxylate (500 mg, 1.7 mmol) in dry diethyl ether (3.8 mL) was cooled to 0° C., and added to lithium aluminum hydride (129.2 mg, 3.4 mmol) dropwise over 5 minutes. The reaction was stirred at 0° C. for 3 hours, then quenched by sequential addition of water (130 µL), 10% NaOH (130 µL), and water (390 µL). The solids were filtered through celite and extracted with hot ethyl acetate (75 mL). The filtrate was concentrated under reduced pressure to provide the product 2-(1-(hydroxymethyl)-4-(4-methylpent-3-en-1-yl)cyclohex-3-en-1-yl)propan-2-ol (420 mg, 98%); $^1$H NMR (300 MHz, chloroform-d) δ 5.31 (d, J=5.2 Hz, 1H), 5.14-5.05 (m, 1H), 3.80 (d, J=11.3 Hz, 1H), 3.65 (dd, J=11.1, 4.4 Hz, 1H), 2.02-1.88 (m, 5H), 1.69 (d, J=1.3 Hz, 4H), 1.61 (d, J=1.3 Hz, 4H), 1.53 (td, J=12.4, 6.0 Hz, 2H), 1.27 (d, J=1.3 Hz, 3H), 1.24 (s, 3H). This material was used for the next reaction without further purification.

Step 3 Prins-Type Cyclization to Produce ABFM-4C$_2$ and ABFM-5C$_2$ and ABFM-6 mL), and washed with water (50 mL). The organic layer was dried over magnesium sulfate and filtered. The filtrate was concentrated under reduced pressure. The residue was chromatographed over silica gel with 0-2% methanol/methylene chloride to give three isolated products: ABFM-4C$_2$ and ABFM-5C$_2$ and ABFM-6. Respective yields and structural characterization data are presented below.

ABFM-4C$_2$: (2-fluoro-4-(5-(hydroxymethyl)-4,4-dimethyl-8-(4-methylpent-3-en-1-yl)-3-oxabicyclo[3.3.1]non-7-en-2-yl)phenol (45 mg, 10%); $^1$H NMR (500 MHz, chloroform-d) δ 7.09-7.04 (m, 1H), 6.94-6.89 (m, 2H), 5.54 (td, J=3.4, 1.6 Hz, 1H), 5.14 (d, J=4.0 Hz, 1H), 4.89-4.84 (m, 1H), 4.73 (d, J=2.4 Hz, 1H), 3.51 (dd, J=10.9, 6.4 Hz, 1H), 3.38 (dd, J=10.9, 4.6 Hz, 1H), 2.59-2.51 (m, 1H), 2.34 (q, J=2.9 Hz, 1H), 2.15-2.06 (m, 1H), 2.00 (ddd, J=12.4, 3.2, 1.3 Hz, 1H), 1.88 (s, 1H), 1.75 (d, J=7.1 Hz, 1H), 1.63 (d, J=2.6 Hz, 4H), 1.60 (d, J=3.2 Hz, 1H), 1.51 (d, J=1.3 Hz, 3H), 1.38 (s, 3H), 1.36 (d, J=2.0 Hz, 3H), 1.26-1.22 (m, 1H). $^{13}$C NMR (126 MHz, chloroform-d) δ 150.85 (d, J=236.3 Hz), 142.09, 136.08, 135.81 (d, J=5.8 Hz), 131.11, 124.21, 123.37, 121.77 (d, J=3.3 Hz), 116.40, 113.10 (d, J=19.2 Hz), 77.78, 72.69, 69.26, 53.41, 40.71, 38.37, 36.61, 30.48, 29.92, 26.52, 26.42, 25.63, 21.41, 17.49. $^{19}$F NMR (471 MHz, hexafluorobenzene-C$_6$F6) δ-141.71--141.80 (m).

ABFM-5C2: 2-fluoro-4-(5-(2-hydroxypropan-2-yl)-8-(4-methylpent-3-en-1-yl)-3-oxabicyclo[3.3.1]non-7-en-2-yl)phenol (189 mg, 42%); $^1$H NMR (500 MHz, chloroform-d) δ 7.09-7.01 (m, 1H), 6.96-6.85 (m, 2H), 5.59 (d, J=3.5 Hz, 1H), 4.92-4.82 (m, 1H), 4.46 (d, J=2.2 Hz, 1H), 3.97 (dd, J=10.7, 2.9 Hz, 1H), 3.81 (dd, J=10.7, 1.5 Hz, 1H), 2.40-2.28 (m, 2H), 2.18 (s, 1H), 1.99 (dd, J=11.7, 3.1 Hz, 1H), 1.97-1.88 (m, 1H), 1.78 (dt, J=11.5, 3.2 Hz, 2H), 1.67 (s, 3H), 1.63 (d, J=1.4 Hz, 3H), 1.33-1.27 (m, 2H), 1.25 (s, 3H), 1.23 (s, 3H). $^{13}$C NMR (126 MHz, chloroform-d) δ 150.82 (d, J=236.8 Hz), 142.18 (d, J=14.4 Hz), 136.74, 135.09 (d, J=5.8 Hz), 131.17, 124.09 (d, J=21.7 Hz), 121.62 (d, J=3.5 Hz), 116.54, 112.87 (d, J=19.4 Hz), 79.62, 76.53, 73.83,

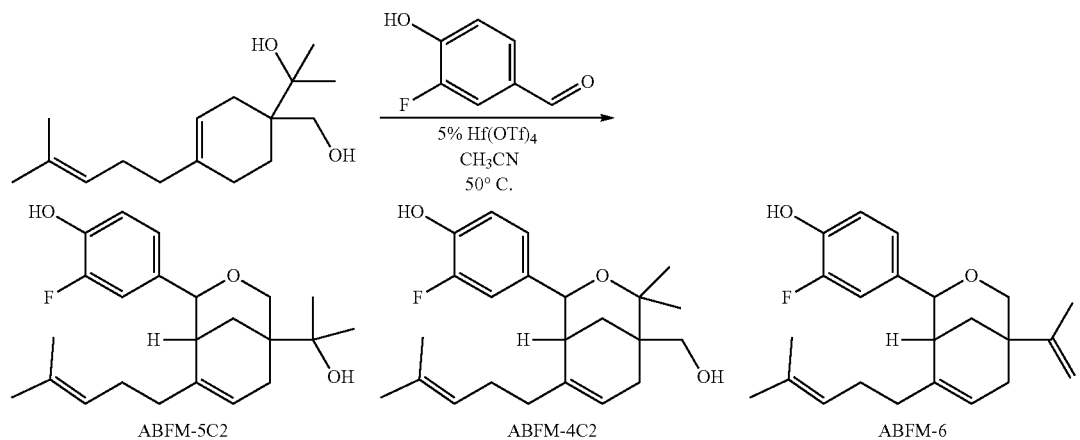

ABFM-5C2    ABFM-4C2    ABFM-6

The diol 2-(1-(hydroxymethyl)-4-(4-methylpent-3-en-1-yl)cyclohex-3-en-1-yl)propan-2-ol (300 mg, 1.19 mmol) was dissolved in dry acetonitrile (12 mL) under nitrogen, followed by sequential addition of 3-fluoro-4-hydroxybenzaldehyde (333.2 mg, 2.38 mmol), and hafnium (IV) triflate hydrate (46 mg, 0.0595 mmol) with additional acetonitrile (6 mL). The reaction was heated to 40° C. for 4 hours, then cooled to room temperature and diluted with ethyl acetate (50 mL), extracted with saturated sodium bicarbonate (30

41.30, 38.63, 36.70, 32.89, 31.25, 26.34, 25.62, 25.22, 25.10, 17.49. $^{19}$F NMR (471 MHz, hexafluorobenzene-C$_6$F6) δ-141.48 (dd, J=11.4, 6.1 Hz).

ABFM-6: 2-fluoro-4-(8-(4-methylpent-3-en-1-yl)-5-(prop-1-en-2-yl)-3-oxabicyclo[3.3.1]non-7-en-2-yl)phenol (92 mg, 22%); $^1$H NMR (300 MHz, chloroform-d) δ 7.07-6.99 (m, 1H), 6.94-6.87 (m, 2H), 5.60-5.54 (m, 1H), 5.04 (d, J=4.1 Hz, 1H), 4.88-4.83 (m, 1H), 4.79 (q, J=1.5 Hz, 1H), 4.77-4.74 (m, 1H), 4.44 (d, J=2.2 Hz, 1H), 4.05 (dd, J=10.8, 2.8 Hz, 1H), 3.46 (dd, J=10.8, 1.5 Hz, 1H), 2.39 (dd, J=6.7, 3.6 Hz, 2H), 2.15 (d, J=18.0 Hz, 2H), 1.98 (dd, J=12.0, 3.0 Hz, 1H), 1.91-1.84 (m, 2H), 1.74 (dd, J=1.4, 0.7 Hz, 3H), 1.61 (t, J=1.3 Hz, 3H), 1.49 (d, J=1.3 Hz, 3H), 1.35-1.23 (m, 2H).

Extension of an $R_8$-Substituted N-Butyl-N-Methyl-6-(Pentylsulfonyl)Hexanamide Substituent Using Cross-Metathesis for the Synthesis of AB-835C2

An additional demonstration of the myrcene route with cross-metathesis for the modification of an $R_8$-substituent is illustrated with the synthesis of AB-835C$_2$. The starting compound ABFM-5C$_2$ (2-fluoro-4-(5-(2-hydroxypropan-2-yl)-8-(4-methylpent-3-en-1-yl)-3-oxabicyclo[3.3.1]non-7-en-2-yl)phenol) was combined with 6,6'-(but-2-ene-1,4-diyldisulfonyl)bis(N-butyl-N-methylhexanamide, and Hoveyda-Grubbs(II) catalyst for the cross metathesis reaction in dichloromethane. Selective hydrogenation of the exocyclic alkene gave the product AB-835C$_2$ (N-butyl-6-((5-(4-(3-fluoro-4-hydroxyphenyl)-1-(2-hydroxypropan-2-yl)-3-oxabicyclo[3.3.1]non-6-en-6-yl)pentyl)sulfonyl)-N-methylhexanamide).

then oxidative cleavage of the epoxide with sodium periodate to produce the aldehyde, followed by reduction of the aldehyde with sodium borohydride and selective acetylation of the primary alcohol in to provide the acetate-protected substituted cyclohexene-tertiary alcohol. The Prins-type cyclization was catalyzed using hafnium(IV)triflate to produce the desired oxabicyclo[3.3.1]non-7-ene scaffold in good yield. The ethyl ester group in AB-154E was reduced to a primary alcohol with lithium aluminum hydride to produce AB-154F. The compounds produced in this procedure are also useful for the synthesis of other substituted analogues, as shown in the following section.

The optimal catalyst [Hf(OTf)$_4$] was identified following an extensive survey of different protic and Lewis Acid catalysts, and reaction conditions including temperature and solvent. The successful Prins-type cyclization reactions with the substituted cyclohexene compounds are highly dependent on the choice of catalyst, solvent, temperature and other conditions. The desired cyclization competes unfavorably with the formation of several side products using a variety of other catalysts. In this reaction, three major side products

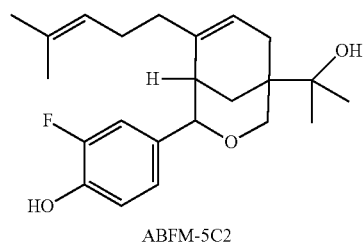

ABFM-5C2

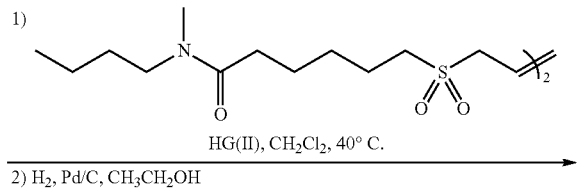

1)

HG(II), CH$_2$Cl$_2$, 40° C.

2) H$_2$, Pd/C, CH$_3$CH$_2$OH

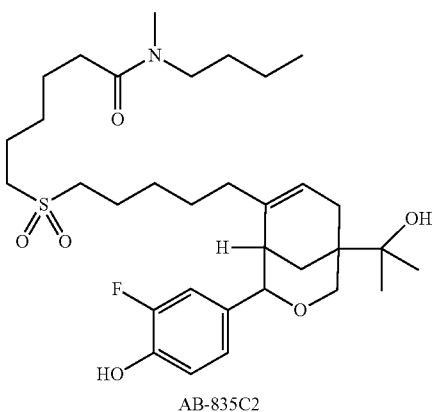

AB-835C2

Advantageous Features of the Myrcene Route with Efficient Prins-Type Cyclization of a Tertiary Alcohol for Access to Optimally Substituted Compounds.

An efficient route for synthesis of the oxabicyclo[3.3.1] non-7-ene compounds possessing dimethyl groups at $R_4,R_{4'}$ and hydroxymethyl at $R_5$ is demonstrated with the preparation of compound AB-154F. This approach involves selective chemical modification of the isolated trisubstituted alkene in the Diels-Alder product of myrcene, before the Prins-type cyclization. The substituted cyclohexene-tertiary alcohol undergoes selective epoxidation of the exocyclic alkene with m-chloroperoxybenzoic acid in the first step, are formed in association with the high reactivity of carbocation intermediates and inherent elimination/addition reactivity of alkene groups. These byproducts include: i) elimination of the tertiary alcohol to form an alkene; ii) intermolecular reaction of water with the alkene groups to produce the alcohol; iii) intramolecular reaction of the alcohol and alkene groups to produce a cyclic ether. These side reactions cause significant reductions in the isolated and purified yields of the desired product when using other acid catalysts, however, these problems were minimized using the catalyst hafnium(IV) triflate in dry acetonitrile.

Step 1 Regioselective Epoxidation

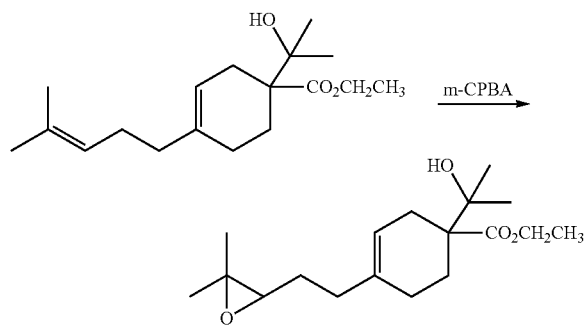

Ethyl 1-(2-hydroxypropan-2-yl)-4-(4-methylpent-3-en-1-yl)cyclohex-3-enecarboxylate (1.73 g, 5.88 mmol) and sodium bicarbonate (543 mg, 6.47 mmol) were combined in dry $CH_2Cl_2$ (33 mL) in a round bottom flask equipped with a magnetic stir-bar. A solution of m-CPBA (70% purity, 1.6 g, 6.47 mmol) in dry $CH_2Cl_2$ (33 mL) at −20° C. under a nitrogen atmosphere was added at a rate of 0.75 mL/min. Upon completion of the addition, the reaction mixture was maintained at −20° C. for 70 min. Then, the solution was quenched by the addition of 1 M NaOH (15 mL) at −20° C., the aqueous layer was extracted with $CH_2Cl_2$ (3×30 mL). The combined organic phase was dried over MgSO4, filtered, and concentrated in vacuo. The crude mixture was then purified by column chromatography with ethyl acetate/hexane mobile phase starting with 10% v/v and eluting at 15% v/v to provide the pure epoxide product ethyl 4-(2-(3,3-dimethyloxiran-2-yl)ethyl)-1-(2-hydroxypropan-2-yl)cyclohex-3-enecarboxylate (1.2 g, 65%); H NMR (300 MHz, chloroform-d) δ 5.38 (dd, J=5.3, 2.5 Hz, 1H), 4.25-4.02 (qd, J=7.1, 0.9 Hz, 2H), 2.92 (d, J=4.0 Hz, 1H), 2.61 (td, J=6.2, 2.4 Hz, 1H), 2.12-1.91 (m, 6H), 1.64-1.45 (m, 4H), 1.24-1.17 (m, 9H), 1.13 (s, 3H), 1.12 (s, 3H). $^{13}C$ NMR (126 MHz, chloroform-d) δ 175.25, 135.38, 119.87, 72.79, 63.46, 63.35, 60.10, 57.74, 33.54, 28.26, 26.78, 26.19, 25.59, 25.25, 25.01, 24.42, 18.29, 13.77.

Step 2 Oxidative Cleavage of Epoxide to Aldehyde

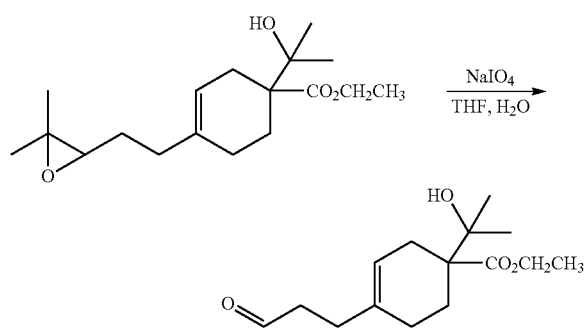

The epoxide (1.2 g, 3.87 mmol) was combined with finely powdered sodium periodate (2.47 g, 11.6 mmol), and THF/water solution (2/1, 0.25 M, 16 mL) in a round-bottom flask equipped with a magnetic stir-bar, and the reaction mixture was stirred at RT for 15 h. The white precipitate that had formed was removed by filtration, and extracted with diethyl ether (3×30 mL). The combined organic phase was washed with water, dried over $MgSO_4$, filtered, and concentrated in vacuo. The isolated product ethyl 1-(2-hydroxypropan-2-yl)-4-(3-oxopropyl)cyclohex-3-enecarboxylate was used for the subsequent reduction without additional purification.

Step 3 Aldehyde Reduction and Acetylation

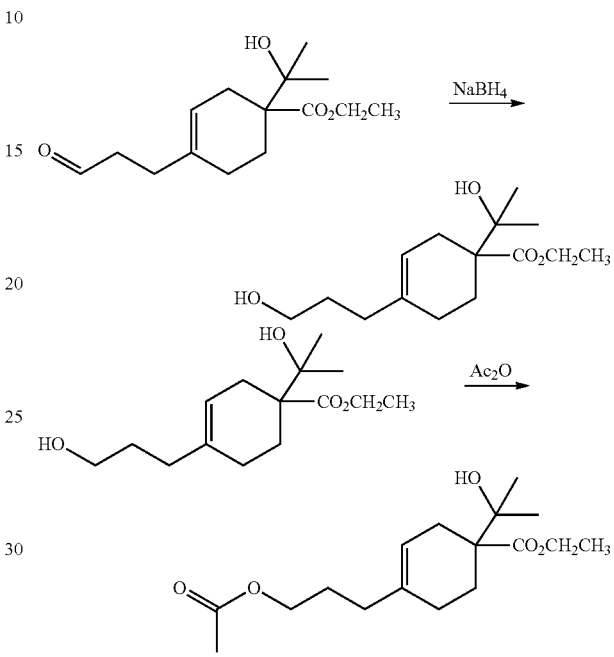

The aldehyde (940 mg, 3.5 mmol) was dissolved in methanol (3 mL) in a round-bottom flask equipped with a magnetic stir-bar, and cooled to 0° C. Finely powdered sodium borohydride (146 mg, 3.85 mmol) was added neat as a single portion, and the reaction mixture was maintained at 0° C. for 15 min. The reaction was quenched after 15 min by the addition of cold water (10 mL), and the solution was extracted with ethyl acetate (3×30 mL). The combined organic phase was dried over $MgSO_4$, filtered, and concentrated in vacuo. The product ethyl 1-(2-hydroxypropan-2-yl)-4-(3-hydroxypropyl)cyclohex-3-enecarboxylate was subjected to acetylation without additional purification.

The alcohol (947 mg, 3.47 mmol) was dissolved in pyridine (12 mL) in a round-bottom flask equipped with a magnetic stir-bar at room temperature, and acetic anhydride (655 μL, 6.94 mmol) was added drop-wise. The reaction mixture was stirred at RT for 3 h, then 1M HCl (10 mL) was added to the reaction mixture and the aqueous layer was extracted with ethyl acetate (3×30 mL). The combined organic phase was washed successively with saturated sodium bicarbonate (30 mL) and water (30 mL), dried over $MgSO_4$, filtered, and concentrated in vacuo. The crude product was purified by column chromatography with ethyl acetate/hexane mobile phase starting with 10% v/v to 15% v/v to elute the pure product ethyl 4-(3-acetoxypropyl)-1-(2-hydroxypropan-2-yl)cyclohex-3-enecarboxylate (845 mg, 70% over 3 steps); $^1H$ NMR (500 MHz, chloroform-d) δ 5.37 (dd, J=5.3, 2.5 Hz, 1H), 4.13 (qd, J=7.1, 0.9 Hz, 2H), 3.95 (t, J=6.8 Hz, 2H), 2.98 (bs, 1H), 2.56-2.47 (m, 1H), 2.23-2.15 (m, 1H), 2.11-1.97 (m, 6H), 1.96-1.93 (in, 2H), 1.73-1.60 (m, 2H), 1.60-1.51 (m, 1H), 1.21 (t, J=7.2 Hz, 3H), 1.15 (s, 3H), 1.14 (s, 3H) $^{13}C$ NMR (126 MHz, chloroform-d) δ 176.03, 171.12, 135.60, 120.31, 73.47, 64.04, 60.77, 53.26, 33.33, 28.77, 26.50, 26.45, 26.04, 25.58, 25.50, 20.97, 14.20.

Step 4 Prins-Type Cyclization of Tertiary-Alcohol

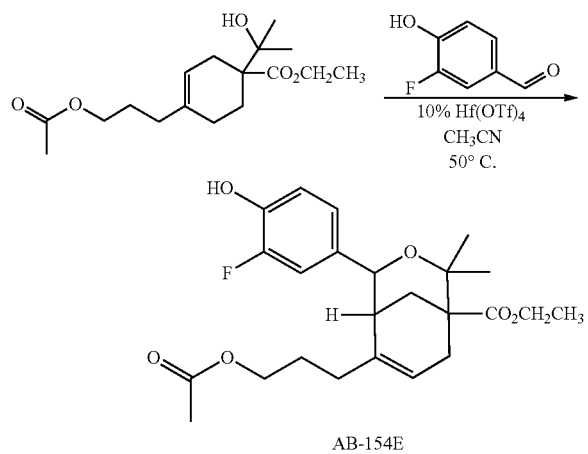

Byproducts:

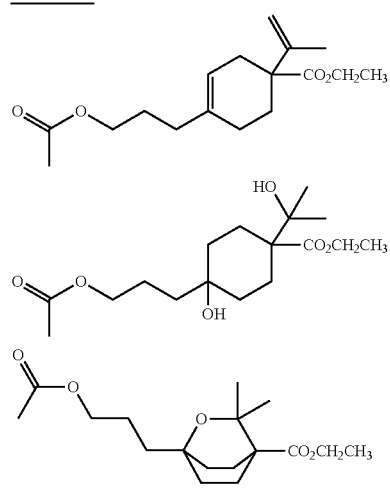

The tertiary alcohol (800 mg, 2.56 mmol) was combined with 3-fluoro, 4-hydroxybenzaldehyde (717 mg, 5.12 mmol), and hafnium (IV) triflate hydrate (198 mg, 0.256 mmol) were combined with dry acetonitrile (40 mL) in a round bottom flask under nitrogen atmosphere. The reaction mixture was heated to 50° C. for 16 hours, then cooled to room temperature, diluted with ethyl acetate (50 mL) and washed successively with saturated sodium bicarbonate (30 mL), water (30 mL), and brine (20 mL). The organic layer was dried over magnesium sulfate, filtered and concentrated under reduced pressure. The residue was purified by column chromatography using 10% ethyl acetate in hexanes to give the product AB-154E (ethyl 6-(3-acetoxypropyl)-4-(3-fluoro-4-hydroxyphenyl)-2,2-dimethyl-3-oxabicyclo[3.3.1]non-6-ene-1-carboxylate) (625 mg, 56%); $^1$H NMR (500 MHz, chloroform-d) δ 7.08-6.99 (m, 1H), 6.91 (dd, J=6.9, 1.9 Hz, 2H), 5.49 (t, J=3.6 Hz, 2H), 4.77 (d, J=2.4 Hz, 1H), 4.17-4.12 (m, 2H), 3.83-3.75 (m, 2H), 2.89-2.79 (m, 1H), 2.67-2.60 (m, 1H), 2.34 (d, J=2.9 Hz, 1H), 2.15 (d, J=18.3 Hz, 2H), 1.99 (d, J=2.3 Hz, 4H), 1.80 (dd, J=13.1, 3.4 Hz, 1H), 1.48 (s, 3H), 1.33 (s, 3H), 1.27 (t, J=7.1 Hz, 4H). $^{13}$C NMR (126 MHz, chloroform-d) δ 175.54, 171.29, 150.91 (d, J=237.1 Hz), 142.27 (d, J=14.2 Hz), 135.03, 123.07, 121.59 (d, J=3.2 Hz), 116.65, 112.97 (d, J=19.4 Hz), 72.58, 64.06, 60.58, 45.32, 40.47, 32.55, 31.13, 30.63, 26.47, 26.16, 21.95, 20.86, 14.09. $^{19}$F NMR (471 MHz, hexafluorobenzene) 6-141.07 (dd, J=11.8, 7.4 Hz).

The reaction mixture also contained these three byproducts that were isolated and identified, with the respective yield and structural characterization data presented below.

The elimination product: ethyl 4-(3-acetoxypropyl)-1-(prop-1-en-2-yl)cyclohex-3-enecarboxylate (40 mg, 5%) $^1$H NMR (300 MHz, Chloroform-d) δ 5.42-5.38 (m, 1H), 4.92 (d, J=11.1 Hz, 2H), 4.24-3.96 (m, 4H), 2.64-2.54 (m, 2H), 2.05 (s, 3H), 1.74 (dd, J=1.4, 0.7 Hz, 3H), 1.60-1.40 (m, 6H), 1.31-1.22 (m, 5H). $^{13}$C NMR (126 MHz, chloroform-d) δ 174.97, 171.16, 145.52, 135.78, 119.55, 111.78, 64.10, 60.57, 50.36, 33.36, 32.55, 28.45, 26.46, 25.89, 21.00, 19.71, 14.14.

The hydration product: ethyl 4-(3-acetoxypropyl)-4-hydroxy-1-(2-hydroxypropan-2-yl)cyclohexanecarboxylate (80 mg, 10%); $^1$H NMR (300 MHz, chloroform-d) δ 4.16-4.00 (m, 4H), 2.52 (dt, J=11.9, 2.6 Hz, 1H), 2.15 (t, J=3.4 Hz, 1H), 2.03 (s, 3H), 1.77-1.50 (m, 9H), 1.40-1.35 (m, 2H), 1.28-1.20 (m, 5H), 1.13-1.07 (m, 2H). $^{13}$C NMR (126 MHz, chloroform-d) δ 173.78, 171.21, 82.73, 81.30, 64.85, 60.48, 55.76, 42.01, 35.98 (d, J=5.5 Hz), 30.83, 28.12, 23.39, 22.05, 20.98, 19.65, 14.14.

The cyclic ether product: ethyl 1-(3-acetoxypropyl)-3,3-dimethyl-2-oxabicyclo[2.2.2]octane-4-carboxylate (120 mg, 15%); $^1$H NMR (300 MHz, Chloroform-d) δ 4.11 (q, J=7.1 Hz, 2H), 4.03 (t, J=6.8 Hz, 2H), 2.42-2.31 (m, 2H), 2.02 (s, 3H), 1.79-1.59 (m, 6H), 1.52-1.35 (m, 4H), 1.29-1.16 (m, 8H). $^{13}$C NMR (126 MHz, chloroform-d) δ 174.63, 171.16, 75.63, 71.48, 64.96, 60.42, 44.89, 36.45, 29.78, 26.94, 25.59, 22.97, 20.97, 14.12.

Step 5 Reduction of ester AB-154F

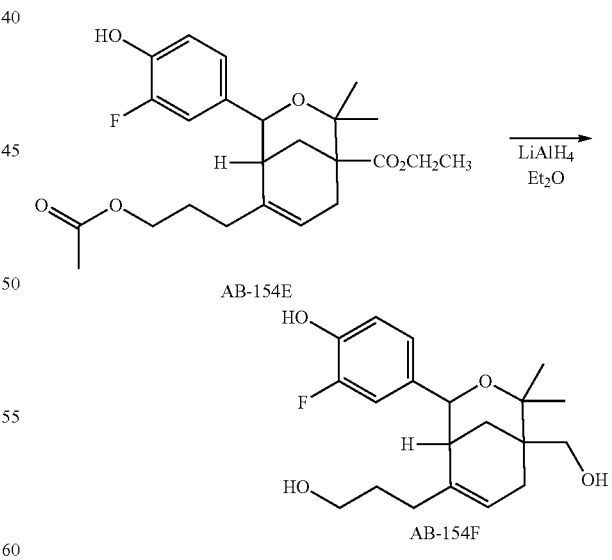

The ester AB-154E (21.7 mg, 0.05 mmol) was taken up in dry diethyl ether (1 mL) and cooled to 0° C., then added dropwise to lithium aluminum hydride (8.75 mg, 0.2 mmol). The reaction was stirred for 2h and then quenched with successive addition of water (15 μL), 10% NaOH (15 μL), and water (45 μL). The precipitate was removed by filtration through celite and extracted with hot ethyl acetate (50 mL). The filtrate was concentrated under reduced pressure. The residue was chromatographed over silica gel eluted with 5% methanol in dichloromethane to give the pure product AB-154F (2-fluoro-4-(5-(hydroxymethyl)-8-(3-hydroxypropyl)-4,4-dimethyl-3-oxabicyclo[3.3.1]non-7-en-2-yl)phenol) (4.4 mg); $^1$H NMR (500 MHz, methanol-$d_4$) δ 6.95 (dd, J=12.5, 2.0 Hz, 1H), 6.90-6.87 (m, 1H), 6.80 (d, J=4.7 Hz, 1H), 5.52 (s, 1H), 4.75 (d, J=2.4 Hz, 1H), 3.40 (d, J=11.2 Hz, 1H), 3.27-3.24 (m, 2H), 3.24-3.20 (m, 1H), 2.83 (d, J=17.5 Hz, 1H), 2.49 (d, J=18.9 Hz, 1H), 2.34 (d, J=2.8 Hz, 1H), 2.15-1.99 (m, 4H), 1.55 (dd, J=12.5, 3.3 Hz, 2H), 1.36 (s, 3H), 1.32 (s, 3H).

Nucleophilic Substitution for Extension of an $R_8$-Substituted N-Butyl-N-Methyl-6-(Propylsulfonyl)Hexanamide Substituent for Access to Optimally Substituted Compounds Additional applications of the myrcene route employing nucleophilic substitution reactions for the extension of substituents are exhibited with the synthetic approach described below. This procedure was used to synthesize substituents containing functional groups sulfide and amide (AB-148F) or sulfone and amide (AB-149F) at the $R_8$-position of an oxabicyclo[3.3.1]non-7-ene scaffold. These examples use the efficient route for producing the synthetic intermediate AB-154E that was discussed in the preceding section. The primary acetate undergoes hydrolysis under mild conditions employing cesium carbonate in methanol to yield the primary alcohol AB-154EA. The alcohol was converted to the p-toluenesulfonate ester AB-254TE that serves as an effective substrate for nucleophilic substitution reactions. The efficient substitution of the primary substrate with S-(6-(butyl(methyl)amino)-6-oxohexyl)ethanethioate takes place in the presence of cesium carbonate in ethanol, producing the nucleophilic thiolate, provides the sulfide product AB-148E. Reduction of the ester group in AB-148E with lithium aluminum hydride provides the sulfide analogue AB-148F. Alternatively, oxidation of the sulfide group in AB-148E produces the sulfone AB-149E. Reduction of the ester group in AB-149E with lithium aluminum hydride provides the sulfone analogue AB-149F.

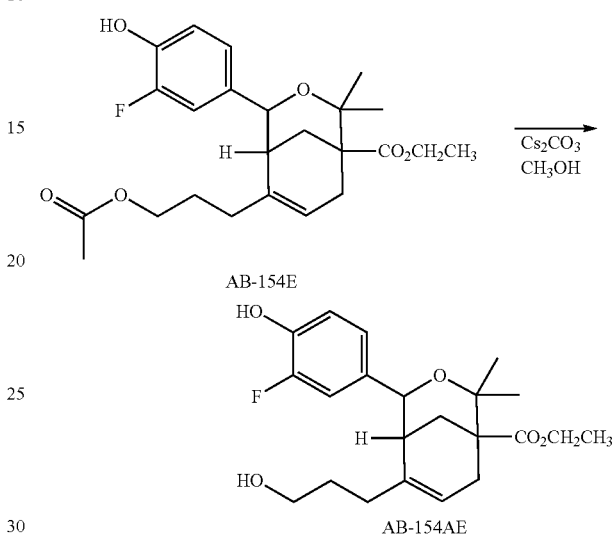

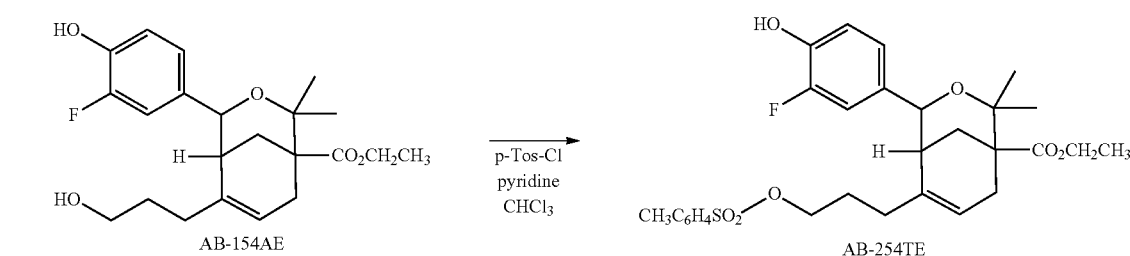

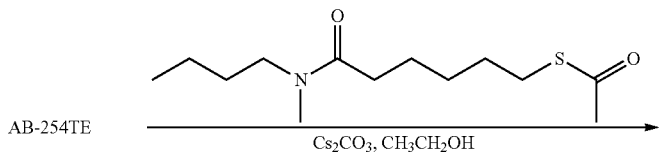

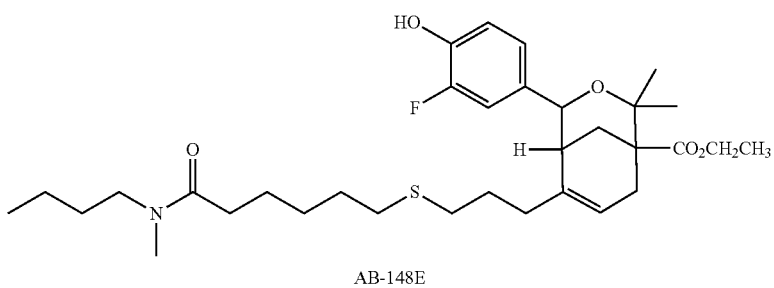

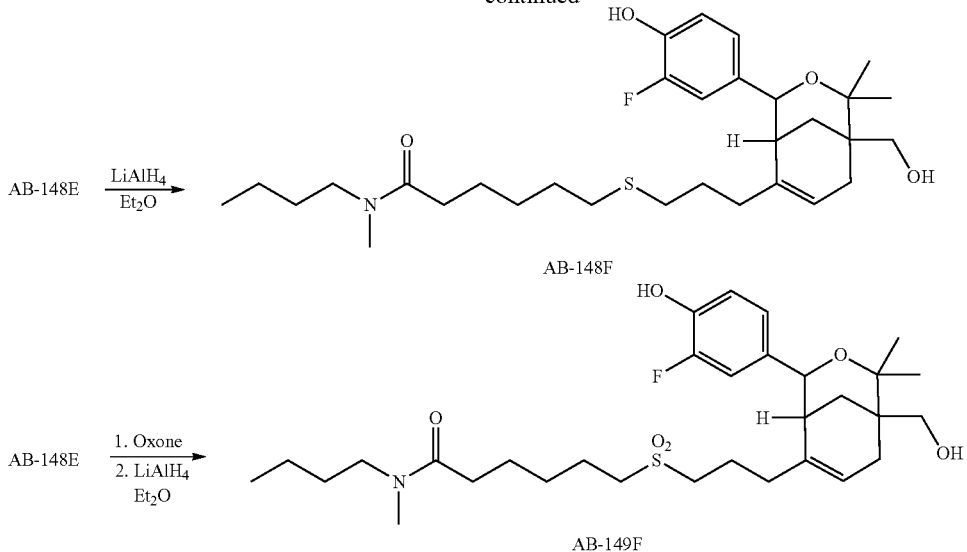

An additional and complementary approach for employing nucleophilic substitutions for the synthesis of extended substituents is demonstrated with the conversion of the p-toluenesulfonate ester AB-254TE to the thioacetate AB-354SE using potassium thioacetate in alcohol solvent. This functional group transformation effectively inverts the reactivity from a substrate into a nucleophile for S-alkylation and addition reactions. The demonstration of this type reactivity is illustrated for the synthesis of AB-148E from the reaction of thioacetate AB-354SE with N-butyl-6-iodo-N-methylhexanamide in the presence of cesium carbonate in ethanol, liberating the nucleophilic thiolate that undergoes efficient substitution to produce the sulfide AB-148E. The synthesis was completed as previously described with reduction of the ester with lithium aluminum hydride to provide the optimally substituted sulfide analogue AB-148F.

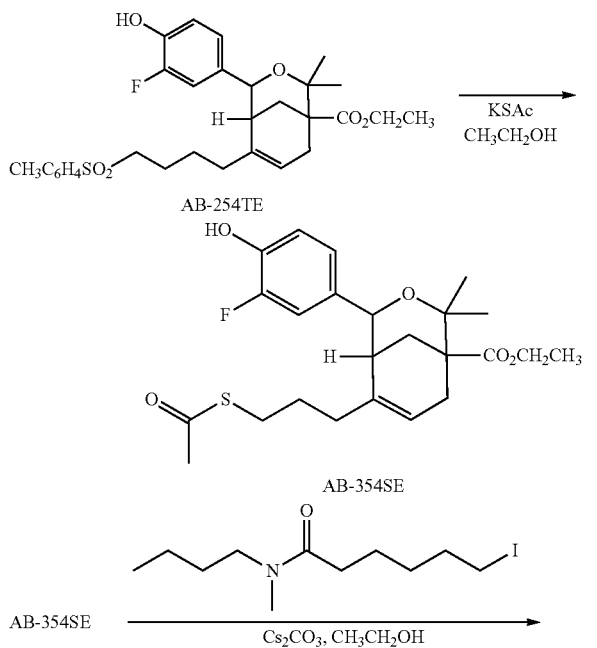

Iterative Nucleophilic Substitution with Dihalogenated Alkyl Substrates for Extension of Substituents and Access to Optimally Substituted Compounds for Labeling Applications.

The efficient alkylation of thioacetate AB-354SE with 1,6-dibromohexane further demonstrates the utility and versatility of this method for the synthesis of functionalized substituents. This substitution approach is compatible with a wide variety of substrates that react with nucleophilic thiol/thiolate reagents, including alkyl halides and sulfonates, acrylates, enones and maleimides as representative examples, providing a versatile method of preparing different substituents. The efficient alkylation of thioacetate AB-354SE with 1,6-dibromohexane was achieved in the presence of cesium carbonate in ethanol to produce the bromo-alkyl derivative AB-454E. Reduction of the ester group in AB-454E with lithium aluminum hydride provided the sulfide alcohol AB-454ABr. Oxidation of the sulfide group with the mild oxidizing reagent oxone produces the corresponding sulfone alcohol AB-454ABrO. Both of these analogues are useful substrates for the synthesis of substituted derivatives, as discussed in the following section.

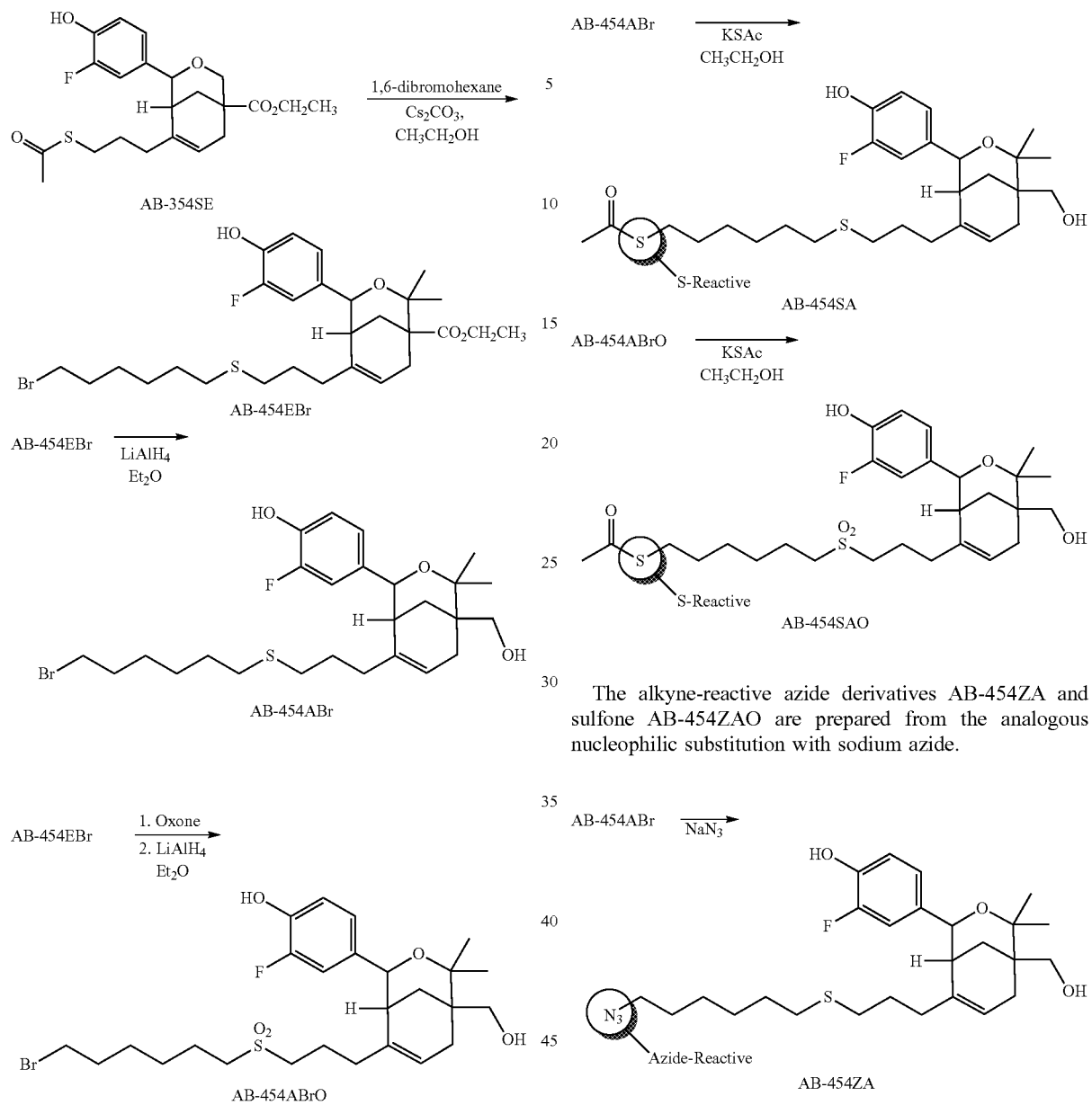

The primary alkylbromide group in the sulfide AB-454ABr and sulfone AB-454ABrO are effective substrates for nucleophilic substitution reactions, enabling iterative incorporation of new functional groups and further extensions of the length of the appendage and other modifications. An additional application of this approach is the construction of analogues suitable for labeling with fluorescent dyes or chelates. Available technology for the attachment of fluorescent dyes are focused on reagents that are correspondingly thiol-reactive, amine-reactive, or reactive through azide/alkyne cycloaddition reactions. In this example, the corresponding required thioacetate, azide and amine derivatives are produced by substitution reactions of the primary alkylbromide group in sulfide AB-454ABr and sulfone AB-454ABrO. The thiol-reactive derivatives xx are prepared from the substitution of sulfide AB-454ABr and sulfone AB-454ABrO with potassium thioacetate.

The alkyne-reactive azide derivatives AB-454ZA and sulfone AB-454ZAO are prepared from the analogous nucleophilic substitution with sodium azide.

The amine-reactive derivatives AB-454NA and sulfone AB-454NAO are prepared from reduction of the corresponding alkyl azide compounds with lithium aluminum hydride.

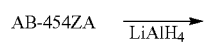

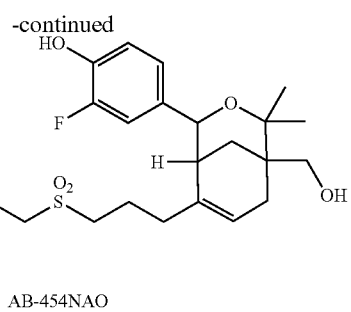

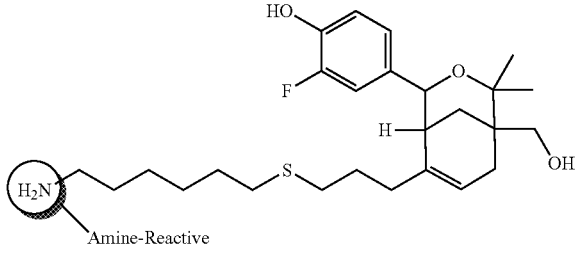

Diels-Alder Route for the Synthesis $R_7$-$R_8$-Cyclic Analogues

The extension of the general approach for construction of analogues possessing an additional fused ring is demonstrated with the synthesis of AB-cyclo61F. The use of the conjugated diene vinylcyclohexene in the multi-component Diels-Alder cycloaddition establishes an additional ring structure fused at the nascent $R_7$-$R_8$-substituent positions, as shown below. The remaining sequence of chemical modifications demonstrated previously, comprising methyl Grignard reagent addition, Prins-type cyclization, and ester reduction, provides access to the product AB-cyclo61F: 3-fluoro-4-(5-(hydroxymethyl)-2,4,5,6,7,8,9,10-octahydro-1H-1,5-methanobenzo[d]oxocin-2-yl)phenol. This procedure is applicable for the synthesis of a wide variety of optionally substituted cyclic analogues.

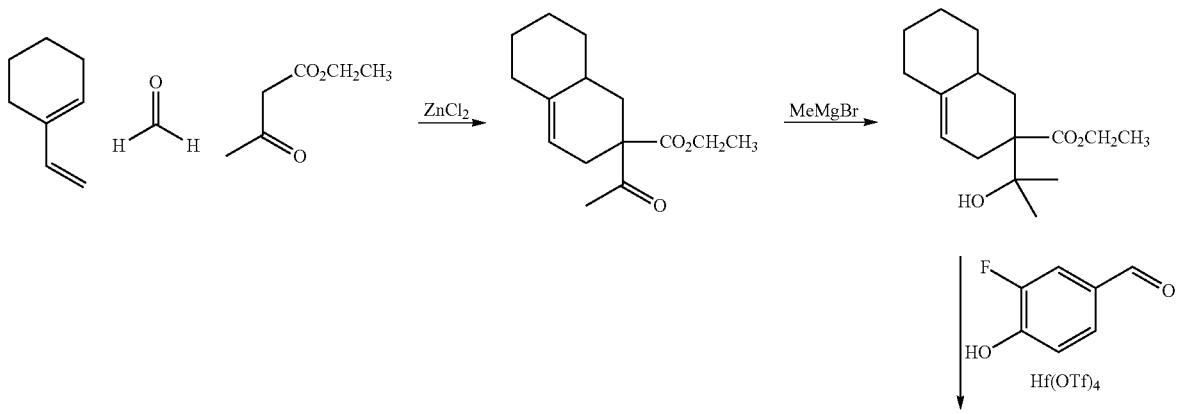

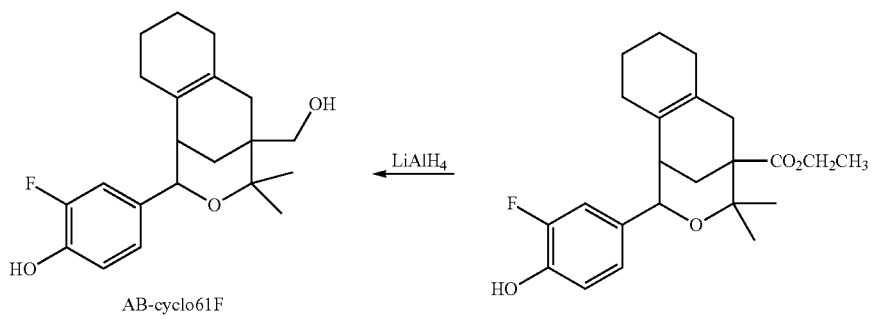

Additional Summary Descriptions of Syntheses of Analogues with Substitution ($R_8$).

AB-22P: The compound was synthesized by a stepwise sequence beginning with the zinc(II) chloride catalyzed Diels-Alder reaction of myrcene with dienophile diethyl 2-methylenemalonate, produced in situ from diethyl malonate and formaldehyde, to give the cyclohexene product diethyl 4-(4-methylpent-3-en-1-yl)cyclohex-3-ene-1,1-dicarboxylate. The ester groups were reduced with lithium aluminum hydride to provide the diol (4-(4-methylpent-3-en-1-yl)cyclohex-3-ene-1,1-diyl)dimethanol. Prins cyclization with 4-hydroxybenzaldehyde catalyzed by scandium (III)trifluoromethylsulfonate gave 4-(5-(hydroxymethyl)-8-(4-methylpent-3-en-1-yl)-3-oxabicyclo[3.3.1]non-7-en-2-yl)phenol. Selective hydrogenation of the exocyclic alkene with $H_2$/Pd/C in ethanol gave the product AB-22P (4-(5-(hydroxymethyl)-8-(4-methylpentyl)-3-oxabicyclo[3.3.1]non-7-en-2-yl)phenol).

AB-42E: The compound was synthesized by a stepwise sequence beginning with the zinc(II) chloride catalyzed Diels-Alder reaction of isoprene with dienophile ethyl 2-methylene-3-oxobutanoate, produced in situ from ethyl acetoacetate and formaldehyde to produce the cyclohexene product ethyl 1-acetyl-4-methylcyclohex-3-enecarboxylate. Selective reaction of the ketone group with methylmagnesium iodide gave the tertiary alcohol ethyl 1-(2-hydroxypropan-2-yl)-4-methylcyclohex-3-enecarboxylate. The Prins-type cyclization with 3-fluoro-4-hydroxybenzaldehyde catalyzed by hafnium(IV)trifluoromethylsulfonate gave the product AB-42E (ethyl 4-(3-fluoro-4-hydroxyphenyl)-2,2,6-trimethyl-3-oxabicyclo[3.3.1]non-6-ene-1-carboxylate).

AB-71: The starting compound 4-(5-(hydroxymethyl)-8-(4-methylpent-3-en-1-yl)-3-oxabicyclo[3.3.1]non-7-en-2-yl)phenol, prepared as described previously, was combined with phenyl allyl sulfone and HG(II) catalyst for cross metathesis to provide the alkene product (E)-4-(5-(hydroxymethyl)-8-(5-(phenylsulfonyl)pent-3-en-1-yl)-3-oxabicyclo[3.3.1]non-7-en-2-yl)phenol. Selective hydrogenation of the exocyclic alkene with $H_2$/Pd/C in ethanol gave the product AB-71 (4-(5-(hydroxymethyl)-8-(5-(phenylsulfonyl)pentyl)-3-oxabicyclo[3.3.1]non-7-en-2-yl)phenol).

AB-81P: The starting compound 4-(5-(hydroxymethyl)-8-(4-methylpent-3-en-1-yl)-3-oxabicyclo[3.3.1]non-7-en-2-yl)phenol, prepared as described previously, was combined with 1-octene and HG(II) catalyst for cross metathesis to provide the alkene product. Selective hydrogenation of the exocyclic alkene with $H_2$/Pd/C in ethanol gave the product AB-81P (4-(8-decyl-5-(hydroxymethyl)-3-oxabicyclo[3.3.1]non-7-en-2-yl)phenol).

AB-83: The starting compound 4-(5-(hydroxymethyl)-8-(4-methylpent-3-en-1-yl)-3-oxabicyclo[3.3.1]non-7-en-2-yl)phenol, prepared as described previously, was combined with 6,6'-(but-2-ene-1,4-diyldisulfonyl)bis(N-butyl-N-methylhexanamide and HG(II) catalyst for cross metathesis to provide the alkene product (E)-N-butyl-6-((5-(1-(hydroxymethyl)-4-(4-hydroxyphenyl)-3-oxabicyclo[3.3.1]non-6-en-6-yl)pent-2-en-1-yl)sulfonyl)-N-methylhexanamide. Selective hydrogenation of the exocyclic alkene with $H_2$/Pd/C in ethanol gave the product AB-83 (N-butyl-6-((5-(1-(hydroxymethyl)-4-(4-hydroxyphenyl)-3-oxabicyclo[3.3.1]non-6-en-6-yl)pentyl)sulfonyl)-N-methylhexanamide).

AB-146F: The starting tosylate compound AB-254TA, prepared as described previously, was combined with phenylthioacetate, cesium carbonate, in methanol to form the phenylsulfide product ethyl 4-(3-fluoro-4-hydroxyphenyl)-2,2-dimethyl-6-(3-(phenylthio)propyl)-3-oxabicyclo[3.3.1]non-6-ene-1-carboxylate. Oxidation of the sulfide with oxone gave the sulfone, and reduction of the ethyl ester to the primary alcohol with lithium aluminum hydride gave the product AB-146F (2-fluoro-4-(5-(hydroxymethyl)-4,4-dimethyl-8-(3-(phenylsulfonyl)propyl)-3-oxabicyclo[3.3.1]non-7-en-2-yl)phenol).

AB-152F: The starting compound ABFM-4C2 ((2-fluoro-4-(5-(hydroxymethyl)-4,4-dimethyl-8-(4-methylpent-3-en-1-yl)-3-oxabicyclo[3.3.1]non-7-en-2-yl)phenol), prepared as described previously, was combined with (E)-6,6'-(but-2-ene-1,4-diyldisulfonyl)bis(N-butyl-N-methylhexanamide), and HG(II) catalyst for the cross metathesis to provide the product (E)-N-butyl-6-((5-(4-(3-fluoro-4-hydroxyphenyl)-1-(hydroxymethyl)-2,2-dimethyl-3-oxabicyclo[3.3.1]non-6-en-6-yl)pent-2-en-1-yl)sulfonyl)-N-methylhexanamide. Selective hydrogenation of the exocyclic alkene with $H_2$/Pd/C, and reduction of the ethyl ester to the primary alcohol with lithium aluminum hydride gave the product AB-152F (N-butyl-6-((5-(4-(3-fluoro-4-hydroxyphenyl)-1-(hydroxymethyl)-2,2-dimethyl-3-oxabicyclo[3.3.1]non-6-en-6-yl)pentyl)sulfonyl)-N-methylhexanamide).

AB-155F: The compound was synthesized from ABFM-$4C_2$ ((2-fluoro-4-(5-(hydroxymethyl)-4,4-dimethyl-8-(4-methylpent-3-en-1-yl)-3-oxabicyclo[3.3.1]non-7-en-2-yl)phenol), prepared as described previously, combined with phenyl allyl sulfone and HG(II) catalyst for cross metathesis to provide the alkene (E)-2-fluoro-4-(5-(hydroxymethyl)-4,4-dimethyl-8-(5-(phenylsulfonyl)pent-3-en-1-yl)-3-oxabicyclo[3.3.1]non-7-en-2-yl)phenol. Selective hydrogenation of the exocyclic alkene with $H_2$/Pd/C in ethanol gave the product AB-155F (2-fluoro-4-(5-(hydroxymethyl)-4,4-dimethyl-8-(5-(phenylsulfonyl)pentyl)-3-oxabicyclo[3.3.1]non-7-en-2-yl)phenol).

AB-42F9496: The compound was synthesized from AB-154AE (ethyl 4-(3-fluoro-4-hydroxyphenyl)-6-(3-hydroxypropyl)-2,2-dimethyl-3-oxabicyclo[3.3.1]non-6-ene-1-carboxylate), prepared as described previously, using DMSO, oxalyl chloride, and triethylamine in dichloromethane to oxidize the primary alcohol and give the aldehyde ethyl 4-(3-fluoro-4-hydroxyphenyl)-2,2-dimethyl-6-(3-oxopropyl)-3-oxabicyclo[3.3.1]non-6-ene-1-carboxylate. The Wittig reaction with the triphenylphosphonium salt of ethyl 2-bromoacetate gave the unsaturated ester product (E)-ethyl 6-(5-ethoxy-5-oxopent-3-en-1-yl)-4-(3-fluoro-4-hydroxyphenyl)-2,2-dimethyl-3-oxabicyclo[3.3.1]non-6-ene-1-carboxylate. Selective hydrolysis of the conjugated ester with cesium carbonate in methanol, followed by reduction of the ethyl ester with lithium aluminum hydride in diethyl ether gave the product AB-42F9496 ((E)-5-(4-(3-fluoro-4-hydroxyphenyl)-1-(hydroxymethyl)-2,2-dimethyl-3-oxabicyclo[3.3.1]non-6-en-6-yl)pent-2-enoic acid).

AB-1F9496: The compound was synthesized from the diol: (4-(4-methylpent-3-en-1-yl)cyclohex-3-ene-1,1-diyl)dimethanol, prepared as described previously, combined with 3-fluoro-4-hydroxybenzaldehyde, and catalyst hafnium(IV)trifluoromethylsulfonate in acetonitrile for the Prins-type cyclization to produce 2-fluoro-4-(5-(hydroxymethyl)-8-(4-methylpent-3-en-1-yl)-3-oxabicyclo[3.3.1]non-7-en-2-yl)phenol. Selective epoxidation of the exocyclic alkene with m-chloroperoxybenzoic acid provides the epoxide: 4-(8-(2-(3,3-dimethyloxiran-2-yl)ethyl)-5-(hydroxymethyl)-3-oxabicyclo[3.3.1]non-7-en-2-yl)-2-fluorophenol. Oxidative cleavage of the epoxide with sodium periodate in aqueous tetrahydrofuran gave the aldehyde: 3-(4-(3-fluoro- 4-hydroxyphenyl)-1-(hydroxymethyl)-3-oxabicyclo[3.3.1]non-6-en-6-yl)propanal. The Wittig reaction of the aldehyde with the triphenylphosphonium salt of ethyl bromoacetate produced the alkene: (E)-ethyl 5-(4-(3-fluoro-4-hydroxyphenyl)-1-(hydroxymethyl)-3-oxabicyclo[3.3.1]non-6-en-6-yl)pent-2-enoate. Selective hydrolysis of the unsaturated ester provided the carboxylic acid AB-1F9496 ((E)-5-(4-(3-fluoro-4-hydroxyphenyl)-1-(hydroxymethyl)-3-oxabicyclo[3.3.1]non-6-en-6-yl)pent-2-enoic acid).

AB-428F: The compound was synthesized starting from ABFM-4C2 ((2-fluoro-4-(5-(hydroxymethyl)-4,4-dimethyl-8-(4-methylpent-3-en-1-yl)-3-oxabicyclo[3.3.1]non-7-en-2-yl)phenol), prepared as described previously, combined with N-butyl-N-methyldece-9-enamide, HG(II) catalyst for cross metathesis to give the alkene: (E)-N-butyl-12-(4-(3-fluoro-4-hydroxyphenyl)-1-(hydroxymethyl)-2,2-dimethyl-3-oxabicyclo[3.3.1]non-6-en-6-yl)-N-methyldodec-9-enamide. Selective hydrogenation of the exocyclic alkene with $H_2$/Pd/C in ethanol gave the product AB-428F (N-butyl-12-(4-(3-fluoro-4-hydroxyphenyl)-1-(hydroxymethyl)-2,2-dimethyl-3-oxabicyclo[3.3.1]non-6-en-6-yl)-N-methyldodecanamide).

AB-42822F: The compound was synthesized by a hydrogenation of AB-428F, prepared as described previously, using Pd/C in ethanol to give the product AB-42822F (N-butyl-12-(4-(3-fluoro-4-hydroxyphenyl)-1-(hydroxymethyl)-2,2-dimethyl-3-oxabicyclo[3.3.1]nonan-6-yl)-N-methyldodecanamide).

The invention claimed is:

1. A compound of formula (I):

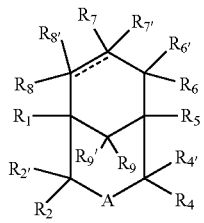

Where A is O;

$R_1$ is H;

$R_2$ is a phenyl group which is substituted with a hydroxyl group or a hydroxyl group and a fluoro group;

$R_{2'}$ is H;

$R_4$ and $R_{4'}$ are each independently H, or a methyl group;

$R_5$ is $CH_2OH$;

$R_6$ and $R_{6'}$ are each H;

$R_7$ is H;

$R_{7'}$ and $R_{8'}$ are absent;

$R_8$ is a —$(CH_2)_{11}CON(CH_3)CH_2CH_2CH_2CH_3$ group; and $R_9$ and $R_{9'}$ are each H, or A pharmaceutically acceptable salt or stereoisomer thereof.

2. The compound according to claim 1 wherein $R_2$ is a phenyl group substituted with a hydroxyl group in the para position or a hydroxyl group in the para position and a fluoro group in the meta position; and $R_4$ and $R_{4'}$ are both H or methyl.

3. The compound according to claim 1 wherein $R_2$ is a phenyl group substituted with a hydroxyl group in the para position; and $R_4$ and $R_{4'}$ are both H or methyl.

4. The compound according to claim 1 wherein $R_2$ is a phenyl group substituted with a hydroxyl group in the para position; and $R_4$ and $R_{4'}$ are both H.

5. A compound according to the chemical structure:

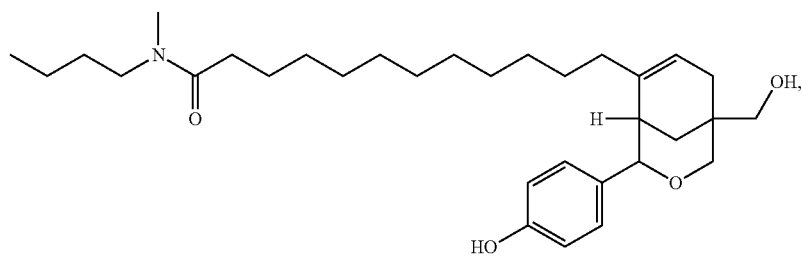

AB-82P

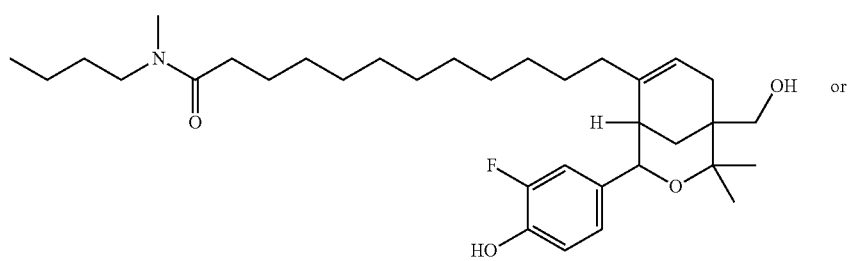

AB-428F or

-continued
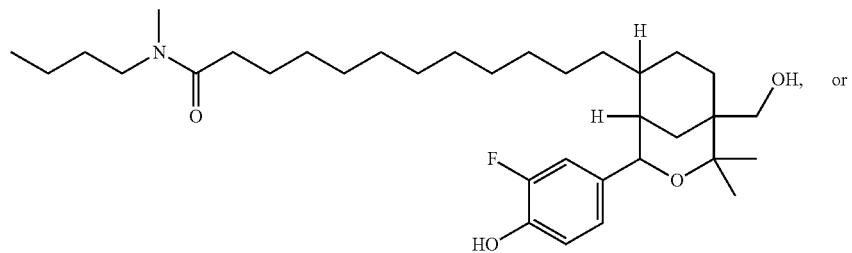
AB-42822F
A pharmaceutically acceptable salt or stereoisomer thereof.
6. The compound of claim 5 according to the chemical structure:
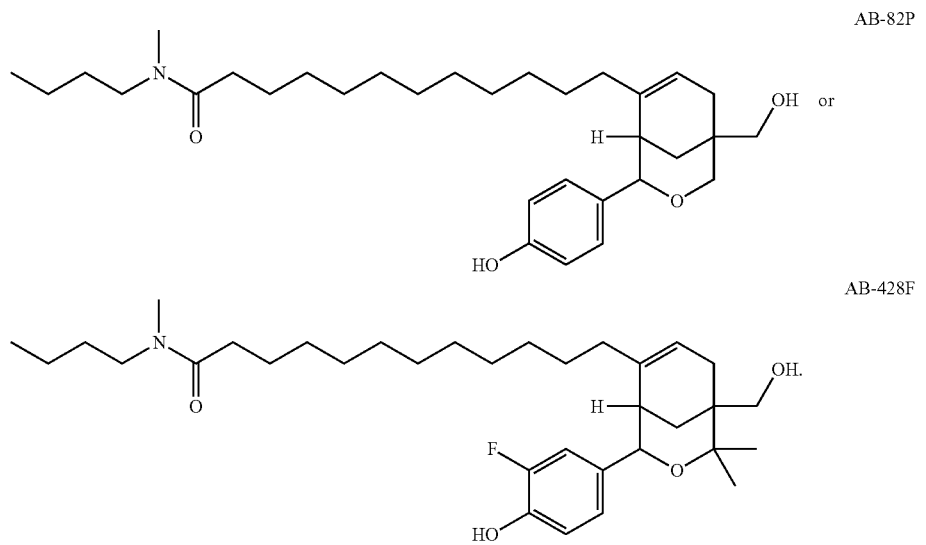
7. The compound of claim 5 which is
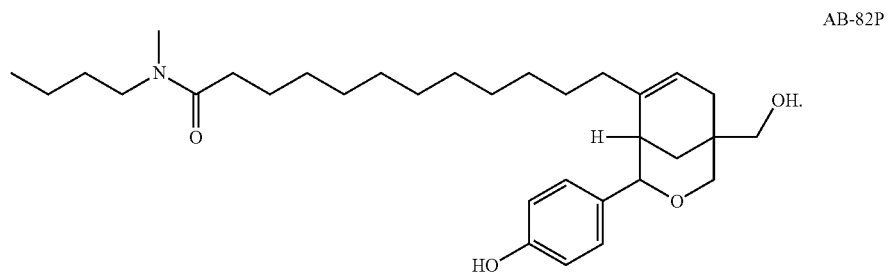 [SMILES: CCCCN(C)C(=O)CCCCCCCCCCCC1=CCC2(CO)COC(c3ccc(O)cc3)C1C2]
AB-82P
* * * * *